United States Patent
Han et al.

(10) Patent No.: US 12,466,829 B2
(45) Date of Patent: Nov. 11, 2025

(54) SPIROCYCLIC PIPERIDINE MELANOCORTIN SUBTYPE-2 RECEPTOR (MC2R) ANTAGONISTS AND USES THEREOF

(71) Applicant: Crinetics Pharmaceuticals, Inc., San Diego, CA (US)

(72) Inventors: Sangdon Han, San Diego, CA (US); Sun Hee Kim, San Diego, CA (US); Yunfei Zhu, San Diego, CA (US)

(73) Assignee: CRINETICS PHARMACEUTICALS, INC., San Diego, CA (US)

( * ) Notice: Subject to any disclaimer, the term of this patent is extended or adjusted under 35 U.S.C. 154(b) by 738 days.

(21) Appl. No.: 17/785,791

(22) PCT Filed: Dec. 10, 2020

(86) PCT No.: PCT/US2020/064252
§ 371 (c)(1),
(2) Date: Jun. 15, 2022

(87) PCT Pub. No.: WO2021/133563
PCT Pub. Date: Jul. 1, 2021

(65) Prior Publication Data
US 2023/0126662 A1    Apr. 27, 2023

Related U.S. Application Data

(60) Provisional application No. 62/953,001, filed on Dec. 23, 2019.

(51) Int. Cl.
C07D 471/10        (2006.01)
A61K 31/438        (2006.01)
C07D 471/20        (2006.01)

(52) U.S. Cl.
CPC ......... C07D 471/10 (2013.01); C07D 471/20 (2013.01)

(58) Field of Classification Search
CPC .. C07D 471/10; C07D 471/20; A61K 31/438; A61P 5/06; A61P 5/00
USPC ..................... 546/17, 18; 514/278
See application file for complete search history.

(56) References Cited

U.S. PATENT DOCUMENTS

| | | | |
|---|---|---|---|
| 5,284,956 A | 2/1994 | Buchecker et al. | |
| 6,664,273 B2 | 12/2003 | Burnett et al. | |
| 6,833,369 B2 | 12/2004 | Stokbroekx et al. | |
| 7,208,503 B2 | 4/2007 | Stokbroekx et al. | |
| 7,576,076 B2 | 8/2009 | Clark et al. | |
| 7,880,007 B2 | 2/2011 | Hurley et al. | |
| 8,772,288 B2 * | 7/2014 | Eastwood | C07D 209/34 544/70 |
| 10,562,884 B2 | 2/2020 | Han et al. | |
| 10,604,507 B2 | 3/2020 | Han et al. | |
| 10,766,877 B2 | 9/2020 | Han et al. | |
| 10,981,894 B2 | 4/2021 | Han et al. | |
| 11,414,429 B2 | 8/2022 | Yoshida et al. | |
| 2003/0158209 A1 | 8/2003 | Dyck et al. | |
| 2004/0053933 A1 | 3/2004 | Pontillo et al. | |
| 2004/0192676 A1 | 9/2004 | Chen et al. | |
| 2005/0119252 A1 | 6/2005 | Tucci et al. | |
| 2005/0192286 A1 | 9/2005 | Tran et al. | |
| 2006/0258672 A1 | 11/2006 | Barbosa et al. | |
| 2010/0016340 A1 | 1/2010 | Woodhead et al. | |
| 2013/0184285 A1 | 7/2013 | Brain et al. | |
| 2018/0078548 A1 | 3/2018 | Shoshan-Barmatz et al. | |
| 2018/0118700 A1 | 5/2018 | Shoshan-Barmatz et al. | |
| 2019/0367481 A1 | 12/2019 | Han et al. | |
| 2021/0238164 A1 | 8/2021 | Han et al. | |
| 2023/0015914 A1 | 1/2023 | Han et al. | |
| 2023/0135560 A1 | 5/2023 | Han et al. | |

FOREIGN PATENT DOCUMENTS

| | | |
|---|---|---|
| EP | 2448582 B1 | 4/2017 |
| EP | 3199156 A1 | 8/2017 |
| EP | 3480198 A1 | 5/2019 |
| JP | 2881750 B2 | 4/1999 |
| WO | WO-9858919 A1 | 12/1998 |
| WO | WO-9964002 A1 | 12/1999 |
| WO | WO-0074679 A1 | 12/2000 |
| WO | WO-03009847 A1 | 2/2003 |
| WO | WO-03009850 A1 | 2/2003 |
| WO | WO-03031410 A1 | 4/2003 |
| WO | WO-03045918 A1 | 6/2003 |
| WO | WO-03068738 A1 | 8/2003 |
| WO | WO-03094918 A1 | 11/2003 |
| WO | WO-2004058735 A2 | 7/2004 |
| WO | WO-2004083209 A1 | 9/2004 |
| WO | WO-2005014563 A1 | 2/2005 |

(Continued)

OTHER PUBLICATIONS

Arasasingham et al. Structure-activity relationship of (1-aryl-2-piperazinylethyl)piperazines: antagonists for the AGRP/melanocortin receptor binding. J Med Chem 46:9-11 (2003).

Berge et al. Pharmaceutical Salts. Journal of Pharmaceutical Sciences 66(1):1-19 (Jan. 1977).

Bundgaard. Design and Application of Prodrugs. Textbook of Drug Design and Development. Krosgaard-Larsen and Bundgaard. Chapter 5. pp. 113-191 (1991).

Bundgaard. Means to Enhance Penetration: Prodrugs as a Means to Improve the Delivery of Peptide Drugs. Advanced Drug Delivery Review 8:1-38 (1992).

(Continued)

*Primary Examiner* — Charanjit Aulakh
(74) *Attorney, Agent, or Firm* — WILSON SONSINI GOODRICH & ROSATI

(57) ABSTRACT

Described herein are compounds that are melanocortin subtype-2 receptor (MC2R) modulators, methods of making such compounds, pharmaceutical compositions and medicaments comprising such compounds, and methods of using such compounds in the treatment of conditions, diseases, or disorders that would benefit from modulation of MC2R activity.

19 Claims, No Drawings

(56) References Cited

FOREIGN PATENT DOCUMENTS

| | | | |
|---|---|---|---|
| WO | WO-2005023260 A1 | 3/2005 |
| WO | WO-2005040109 A1 | 5/2005 |
| WO | WO-2005040136 A1 | 5/2005 |
| WO | WO-2005042516 A2 | 5/2005 |
| WO | WO-2005047253 A1 | 5/2005 |
| WO | WO-2006113704 A2 | 10/2006 |
| WO | WO-2007047496 A2 | 4/2007 |
| WO | WO-2007076070 A2 | 7/2007 |
| WO | WO-2007125325 A1 | 11/2007 |
| WO | WO-2009124692 A1 | 10/2009 |
| WO | WO-2010026124 A1 | 3/2010 |
| WO | WO-2012163354 A1 | 12/2012 |
| WO | WO-2013047144 A1 | 4/2013 |
| WO | WO-2017046794 A1 | 3/2017 |
| WO | WO-2018116307 A1 | 6/2018 |
| WO | WO-2019014460 A1 | 1/2019 |
| WO | WO-2019079373 A1 | 4/2019 |
| WO | WO-2019236699 A1 | 12/2019 |
| WO | WO-2021091788 A1 | 5/2021 |
| WO | WO-2021126693 A1 | 6/2021 |
| WO | WO-2021133563 A1 | 7/2021 |

OTHER PUBLICATIONS

Chen et al. Identification and characterization of pyrrolidine diastereoisomers as potent functional agonists and antagonists of the human melanocortin-4 receptor. Bioorg Med Chem Lett 18:129-136 (2008).

Chen et al. Pharmacological and pharmacokinetic characterization of 2-piperazine-a-isopropyl benzylamine derivatives as melanocortin-4 receptor antagonists. Bioorg Med Chem 16:5606-5618 (2008).

Fukuoka et al. The Mechanisms Underlying Autonomous Adrenocorticotropic Hormone Secretion in Cushing's Disease. Int J Mol Sci. 21(23):9132 (2020).

Gantz et al. The melanocortin system. Am. J. Physiol. Endocrinol. Metab. 284:E468-E474 (2003).

PCT/US2020/064252 International Search Report and Written Opinion dated Apr. 6, 2021.

Richardson et al. Synthesis and structure-activity relationships of novel arylpiperazines as potent and selective agonists of the melanocortin subtype-4 receptor. J Med Chem 47:744-755 (2004).

Science IP Report dated Jun. 7, 2019 (135 pgs).

Science IP Report dated Mar. 29, 2018 (129 pgs).

Sebhat et al., Melanocortin subtype 4 receptor agonists: Structure-activity relationships about the 4-alkyl piperidine core. Bioorg. Med. Chem. Lett. 17:5720-5723 (2007).

Tian et al. Design, Synthesis, and Evaluation of Proline and Pyrrolidine Based Melanocortin Receptor Agonists. A Conformationally Restricted Dipeptide Mimic Approach. J Med Chem 49:4745-4761 (2006).

Tran et al. Syntheses of tetrahydrothiophenes and tetrahydrofurans and studies of their derivatives as melanocortin-4 receptor ligands. Bioorg Med Chem Lett 18:1124-1130 (2008).

Widder et al. Section III: Prodrugs Kinetics. Method in Enzymology. 112:309-396 (1985).

\* cited by examiner

SPIROCYCLIC PIPERIDINE MELANOCORTIN SUBTYPE-2 RECEPTOR (MC2R) ANTAGONISTS AND USES THEREOF

CROSS-REFERENCE TO RELATED APPLICATIONS

This application claims the benefit of U.S. Provisional Patent Application No. 62/953,001 filed on Dec. 23, 2019, which is herein incorporated by reference in its entirety.

FIELD OF THE INVENTION

Described herein are compounds that modulate the activity of one or more melanocortin receptors, methods of making such compounds, pharmaceutical compositions and medicaments comprising such compounds, and methods of using such compounds in the treatment of conditions, diseases, or disorders that would benefit from modulating melanocortin subtype-2 receptor (MC2R) activity.

BACKGROUND OF THE INVENTION

The melanocortin receptors form a family of G protein-coupled receptor (GPCRs) (MC1R, MC2R, MC3R, MC4R, and MC5R) that are selectively activated by different melanocortin peptides adrenocorticotropic hormone (ACTH), and the melanocortin peptides α-, β-, and γ-melanocyte-stimulating hormone (α-MSH, β-MSH, and γ-MSH) that are all derived proteolytically from proopiomelanocortin hormone, or POMC. ACTH is a 39 amino acid peptide that is the primary regulator of adrenal glucocorticoid synthesis and secretion and only has affinity for MC2R. As the central actor in this hypothalamic-pituitary-adrenal (HPA) axis, ACTH is secreted by the pituitary in response to stressful stimuli and acts at the adrenal gland to stimulate the synthesis and secretion of cortisol. Modulation of MC2R is attractive for the treatment of conditions, diseases, or disorders that would benefit from modulating melanocortin receptor activity.

SUMMARY OF THE INVENTION

Compounds described herein are melanocortin receptor modulator compounds. In some embodiments, compounds described herein modulate one or more of the subtype melanocortin receptor proteins. In some embodiments, compounds described herein modulate two or more of the subtype melanocortin receptor proteins. In some embodiments, compounds described herein modulate MC2R.

In one aspect, described herein is a compound of Formula (I), or a pharmaceutically acceptable salt, or solvate thereof:

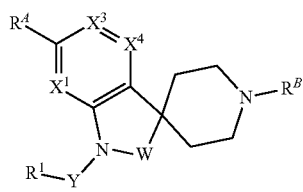

Formula (I)

wherein:
$R^A$ is unsubstituted or substituted aryl or unsubstituted or substituted heteroaryl, wherein if $R^A$ is substituted then $R^A$ is substituted with 1, 2, 3 or 4 groups selected from $R^a$, $R^b$, and $R^c$;

$R^a$, $R^b$, and $R^c$ are independently selected from the group consisting of hydrogen, halogen, —$OR^4$, —CN, —$N(R^4)_2$, —C(=O)$R^7$, unsubstituted or substituted $C_1$-$C_6$ alkyl, unsubstituted or substituted $C_1$-$C_6$ fluoroalkyl, unsubstituted or substituted $C_1$-$C_6$ heteroalkyl, unsubstituted or substituted $C_3$-$C_6$ cycloalkyl, unsubstituted or substituted $C_2$-$C_7$ heterocycloalkyl, unsubstituted or substituted phenyl, and unsubstituted or substituted heteroaryl, wherein any substituted group of $R^a$, $R^b$, and $R^c$ is substituted with one or more $R^6$ groups;

wherein, if $R^a$, $R^b$, or $R^c$ is attached to the N atom of a heteroaryl, then it is hydrogen, —C(=O)$R^7$, unsubstituted or substituted $C_1$-$C_6$ alkyl, unsubstituted or substituted $C_1$-$C_6$ fluoroalkyl, unsubstituted or substituted $C_1$-$C_6$ heteroalkyl, unsubstituted or substituted $C_3$-$C_6$ cycloalkyl, or unsubstituted or substituted $C_2$-$C_7$ heterocycloalkyl;

$R^B$ is unsubstituted or substituted aryl or unsubstituted or substituted heteroaryl, wherein if $R^B$ is substituted then $R^B$ is substituted with 1, 2, 3 or 4 groups selected from $R^d$, $R^e$, and $R^f$;

$R^d$, $R^e$, and $R^f$ are independently selected from the group consisting of hydrogen, halogen, —$OR^4$, —CN, —$N(R^4)_2$, —C(=O)$R^7$, —C(=O)$N(R^4)_2$, unsubstituted or substituted $C_1$-$C_6$ alkyl, unsubstituted or substituted $C_1$-$C_6$ fluoroalkyl, unsubstituted or substituted $C_1$-$C_6$ heteroalkyl, unsubstituted or substituted $C_3$-$C_6$ cycloalkyl, unsubstituted or substituted $C_2$-$C_7$ heterocycloalkyl, unsubstituted or substituted phenyl, and unsubstituted or substituted heteroaryl, wherein any substituted group of $R^d$, $R^e$, and $R^f$ is substituted with one or more $R^6$ groups;

wherein, if $R^d$, $R^e$, or $R^f$ is attached to the N atom of a heteroaryl, then it is hydrogen, —C(=O)$R^7$, unsubstituted or substituted $C_1$-$C_6$ alkyl, unsubstituted or substituted $C_1$-$C_6$ fluoroalkyl, unsubstituted or substituted $C_1$-$C_6$ heteroalkyl, unsubstituted or substituted $C_3$-$C_6$ cycloalkyl, or unsubstituted or substituted $C_2$-$C_7$ heterocycloalkyl;

$X^1$ is $CR^{11}$ or N;
$X^3$ is $CR^{13}$ or N;
$X^4$ is $CR^{14}$ or N;

$R^{11}$, $R^{13}$, and $R^{14}$ are each independently hydrogen, halogen, unsubstituted or substituted $C_1$-$C_6$ alkyl, unsubstituted or substituted $C_1$-$C_6$ fluoroalkyl, unsubstituted or substituted $C_1$-$C_6$ heteroalkyl, unsubstituted or substituted $C_3$-$C_6$cycloalkyl, —CN, —$OR^4$, —$SR^4$, —$CO_2R^4$, —C(=O)$N(R^4)_2$, or —$N(R^4)_2$;

W is absent, —C($R^3$)$_2$—, —C($R^3$)$_2$—C($R^3$)$_2$—, —C(=O)—, #—C(=O)—O—, #—C(=O)—C($R^3$)$_2$—, or #—C(=O)$NR^2$—; wherein # indicates the attachment point to the N atom of the ring;

Y is absent, —(C=O)—, *—O(C=O)—, *—$NR^2$—(C=O)—, —(SO$_2$)—, or *—$NR^2$—(SO$_2$)—; wherein * indicates the attachment point to $R^1$;

$R^1$ is unsubstituted or substituted $C_1$-$C_6$ alkyl, unsubstituted or substituted $C_1$-$C_6$ fluoroalkyl, unsubstituted or substituted $C_1$-$C_6$ heteroalkyl, unsubstituted or substituted $C_3$-$C_6$ cycloalkyl, unsubstituted or substituted $C_2$-$C_7$ heterocycloalkyl, unsubstituted or substituted —($C_1$-$C_6$ alkyl)-($C_3$-$C_6$ cycloalkyl), or unsubstituted or substituted —(C$_1$-C$_6$ alkyl)-(C$_2$-C$_7$ heterocycloalkyl), wherein any substituted group of R$^1$ is substituted with one or more halogen, unsubstituted or substituted C$_1$-C$_6$ alkyl, unsubstituted or substituted monocyclic heterocycle, —N(R$^4$)$_2$, —OR$^5$, —CN, —CO$_2$R$^5$, —C(=O)N(R$^4$)$_2$, —SR$^5$, —S(=O)R$^7$, —S(=O)$_2$R$^7$, —NR$^4$C(=O)R$^5$, —NR$^4$SO$_2$R$^7$, —SO$_2$R$^7$, or —SO$_2$N(R$^4$)$_2$;

each R$^2$ is independently hydrogen, unsubstituted or substituted C$_1$-C$_6$ alkyl, unsubstituted or substituted C$_3$-C$_6$ cycloalkyl, or unsubstituted or substituted C$_2$-C$_7$ heterocycloalkyl;

each R$^3$ is independently hydrogen, halogen, unsubstituted or substituted C$_1$-C$_6$ alkyl, unsubstituted or substituted C$_3$-C$_6$ cycloalkyl, or unsubstituted or substituted C$_2$-C$_7$ heterocycloalkyl;

each R$^4$ is independently selected from the group consisting of hydrogen, unsubstituted or substituted C$_1$-C$_6$ alkyl, unsubstituted or substituted C$_3$-C$_6$ cycloalkyl, unsubstituted or substituted C$_1$-C$_6$fluoroalkyl, unsubstituted or substituted aryl, and unsubstituted or substituted heteroaryl;

or two R$^4$ are taken together with the nitrogen atom to which they are attached to form an unsubstituted or substituted 3- to 6-membered monocyclic heterocycle;

each R$^5$ is independently selected from the group consisting of hydrogen, substituted C$_1$-C$_6$ alkyl, unsubstituted or substituted C$_3$-C$_6$ cycloalkyl, unsubstituted or substituted C$_1$-C$_6$fluoroalkyl, unsubstituted or substituted aryl, and unsubstituted or substituted heteroaryl;

each R$^6$ is independently hydrogen, halogen, unsubstituted or substituted C$_1$-C$_4$alkyl, unsubstituted or substituted C$_1$-C$_4$alkoxy, unsubstituted or substituted C$_1$-C$_4$fluoroalkyl, unsubstituted or substituted C$_1$-C$_4$fluoroalkoxy, unsubstituted or substituted monocyclic carbocycle, unsubstituted or substituted monocyclic heterocycle, —CN, —OH, —CO$_2$R$^5$, —CH$_2$CO$_2$R$^5$, —C(=O)N(R$^4$)$_2$, —C(=O)N(R$^4$)OR$^5$, —CH$_2$C(=O)N(R$^4$)$_2$, —N(R$^4$)$_2$, —CH$_2$N(R$^4$)$_2$, —C(R$^5$)$_2$N(R$^4$)$_2$, —NR$^4$C(=O)R$^5$, —CH$_2$NR$^4$C(=O)R$^5$, —NR$^4$C(=O)N(R$^5$)$_2$, —NR$^4$C(=O)N(R$^4$)$_2$, C(R$^5$)=N(R$^4$)—OR$^5$, —SR$^5$, —S(=O)R$^7$, —SO$_2$R$^7$, or —SO$_2$N(R$^4$)$_2$; and each R$^7$ is independently selected from the group consisting substituted C$_1$-C$_6$ alkyl, unsubstituted or substituted C$_3$-C$_6$ cycloalkyl, unsubstituted or substituted C$_1$-C$_6$fluoroalkyl, unsubstituted or substituted phenyl, and unsubstituted or substituted heteroaryl.

Also described herein is a pharmaceutical composition comprising a compound described herein, or a pharmaceutically acceptable salt, or solvate thereof, and at least one pharmaceutically acceptable excipient. In some embodiments, the pharmaceutical composition is formulated for administration to a mammal by intravenous administration, subcutaneous administration, oral administration, inhalation, nasal administration, dermal administration, or ophthalmic administration. In some embodiments, the pharmaceutical composition is formulated for administration to a mammal by oral administration. In some embodiments, the pharmaceutical composition is in the form of a tablet, a pill, a capsule, a liquid, a suspension, a gel, a dispersion, a solution, an emulsion, an ointment, or a lotion. In some embodiments, the pharmaceutical composition is in the form of a tablet, a pill, or a capsule.

In any of the aforementioned aspects are further embodiments in which the effective amount of the compound of Formula (I), or a pharmaceutically acceptable salt thereof, is: (a) systemically administered to the mammal; and/or (b) administered orally to the mammal; and/or (c) intravenously administered to the mammal; and/or (d) administered by inhalation; and/or (e) administered by nasal administration; or and/or (f) administered by injection to the mammal; and/or (g) administered topically to the mammal; and/or (h) administered by ophthalmic administration; and/or (i) administered rectally to the mammal; and/or (j) administered non-systemically or locally to the mammal.

In any of the aforementioned aspects are further embodiments comprising single administrations of the effective amount of the compound, including further embodiments in which the compound is administered once a day to the mammal or the compound is administered to the mammal multiple times over the span of one day. In some embodiments, the compound is administered on a continuous dosing schedule. In some embodiments, the compound is administered on a continuous daily dosing schedule.

In any of the embodiments disclosed herein, the mammal is a human.

In some embodiments, compounds provided herein are orally administered to a human.

Articles of manufacture, which include packaging material, a compound of Formula (I), or a pharmaceutically acceptable salt thereof, within the packaging material, and a label that indicates that the compound or composition, or pharmaceutically acceptable salt, tautomers, pharmaceutically acceptable N-oxide, pharmaceutically active metabolite, pharmaceutically acceptable prodrug, or pharmaceutically acceptable solvate thereof, is used for modulating one or more subtype melanocortin receptor proteins, or for the treatment, prevention or amelioration of one or more symptoms of a disease or condition that would benefit from modulating one or more subtype melanocortin receptor proteins, are provided.

Other objects, features and advantages of the compounds, methods and compositions described herein will become apparent from the following detailed description. It should be understood, however, that the detailed description and the specific examples, while indicating specific embodiments, are given by way of illustration only, since various changes and modifications within the spirit and scope of the instant disclosure will become apparent to those skilled in the art from this detailed description.

DETAILED DESCRIPTION OF THE INVENTION

Adrenocorticotropic hormone (ACTH) is a 39 amino acid peptide synthesized by anterior pituitary corticotropic cells by proteolytic cleavage of the proopiomelanocortin hormone (POMC). ACTH is the primary regulator of adrenal glucocorticoid (GC; cortisol in humans and most other species; corticosterone in rodents) synthesis and secretion. As the central actor in this hypothalamic-pituitary-adrenal (HPA) axis, ACTH is secreted by the pituitary in response to stressful stimuli and acts at the adrenal gland to stimulate the synthesis and secretion of cortisol. This stimulation is mediated through a highly specific G protein-coupled receptor (GPCR) which is expressed almost uniquely in the adrenal cortex. The receptor is the melanocortin 2 receptor (MC2R), and, along with ACTH, is part of the larger melanocortin system.

The melanocortin system comprises a family of five GPCRs (MC1R, MC2R, MC3R, MC4R, and MC5R); their natural agonists, the melanocortin peptides α-, β-, and γ-melanocyte-stimulating hormone (α-MSH, β-MSH, and γ-MSH) and ACTH; and endogenous melanocortin antagonists agouti and agouti-related protein (AGRP). The melanocortin receptors (MCRs) have different selectivities for endogenous agonist and antagonist peptides and are expressed in diverse tissues where they serve varied and discreet physiological functions (Gantz, I. and T. M. Fong, *Am. J Physiol. Endocrinol. Metab.,* 284: E468-E474, 2003).

It is possible to selectively modulate any one of the MCRs, or combinations thereof. In some embodiments, selectively modulating any one of the MCRs relative to the other MCRs, or combinations thereof, is useful in a variety of clinical applications. In some embodiments, selectively modulating any one of the MCRs relative to the other MCRs, or combinations thereof, reduces unwanted side effects in a variety of clinical applications. In one aspect, compounds described herein are antagonists of MC2R. In some embodiments, compounds described herein are selective antagonists for MC2R relative or other MCRs.

MC2R is a highly selective receptor for ACTH. Although ACTH can activate all five MCRs, at physiological levels, the sensitivity of the other receptors is not high enough to be activated, and ACTH selectively activates MC2R. Importantly, the other naturally occurring agonists α-MSH, R-MSH, and γ-MSH have no affinity for MC2R (Gantz, I. and T. M. Fong, *Am. J. Physiol. Endocrinol. Metab.,* 284: E468-E474, 2003). The major function of MC2R is to stimulate the fasciculata cells of the adrenal cortex to synthesize and secret cortisol. MC2R requires the GPCR accessory protein MRAP (melanocortin 2 receptor protein) to be successfully secreted to the cell surface and as well as to function. MRAP is a small protein with a single transmembrane domain that forms an antiparallel homodimer in stable complex with MC2R and is necessary for both cell surface expression of MC2R and its ability to bind ACTH. MRAP can bind to any of the MCRs and affect their activities, but is only essential for MC2R activity. Binding of ACTH to the MC2R/MRAP complex on adrenal cortical cells activates Gs to elevate intracellular cAMP levels which in turn stimulates cortisol synthesis and secretion by regulating multiple steps in the steroidogenic pathway.

Cushing's syndrome is a rare disorder characterized by chronic, excess glucocorticoid exposure. Clinical signs of Cushing's syndrome include growth of fat pads (collarbone, back of neck, face and trunk), excessive sweating, dilation of capillaries, thinning of the skin, muscle weakness, hirsutism, depression/anxiety, hypertension, osteoporosis, insulin resistance, hyperglycemia, heart disease, and a range of other metabolic disturbances resulting in high morbidity. If inadequately controlled in its severe forms, Cushing's syndrome is associated with high mortality. Although glucocorticoid excess can sometimes be ACTH independent, for example from excessive autonomous secretion of cortisol from a hyperfunctioning adrenal adenoma, carcinoma, or steroid abuse, about 60-80% of all cases are ACTH dependent Cushing's syndrome, known as Cushing's disease. Cushing's disease is caused by microadenomas of pituitary corticotropic cells that secrete excess ACTH. Corticotroph adenomas are small, usually slow growing, benign tumors that normally come to clinical attention as a result of the effects of glucocorticoid excess, rather than because of the physical effects of an expanding tumor. First line treatments for Cushing's disease are surgical and involve removal of either the ACTH-secreting tumor in the pituitary or the adrenal glands themselves. As surgery is often unsuccessful, contraindicated, or delayed, medical therapy for these patients becomes necessary. Current treatment options include inhibitors of steroid synthesis enzymes that can prevent the production of cortisol and improve symptoms, but these treatments also induce a host of unwanted side effects due to the accumulation of other steroid products. In one aspect, an MC2R antagonist is used in the treatment of Cushing's syndrome. In some embodiments, an MC2R antagonist is used in the treatment of Cushing's disease. In some embodiments, glucocorticoid excess is ACTH independent. In some embodiments, glucocorticoid excess is ACTH dependent.

Ectopic ACTH syndrome, or ectopic Cushing's syndrome or disease, is essentially the same as Cushing's disease, except that the underlying tumor expressing ACTH is outside the pituitary gland. In some embodiments, the tumors are small carcinoid tumors that occur anywhere in the lungs or gastrointestinal tract. In some embodiments, an MC2R antagonist is used in the treatment of ectopic ACTH syndrome.

Congenital adrenal hyperplasia (CAH) is characterized by a reduction or loss of cortisol synthesis and excessive ACTH and corticotropin-releasing hormone. CAH can result from a variety of genetic defects in the adrenal steroidal biosynthesis pathway. In some embodiments, CAH is due to a mutation in 21β-hydroxylase. The lack of cortisol removes the negative feedback to the pituitary which leads to excessive ACTH secretion. The resulting excessive adrenal stimulation causes overproduction of steroid precursors which also have negative consequences (e.g., hyperandrogenism). Administration of replacement glucocorticoids typically does not adequately suppress ACTH without also causing Cushing's-like symptoms. In some embodiments, an MC2R antagonist is used in the treatment of CAH.

In addition to Cushing's disease, Ectopic ACTH syndrome and CAH it has also been hypothesized that there might be a role for an MC2R antagonist in the treatment of ACTH driven adrenal tumors, Functional Adrenal Hyperandrogenism (FAH), stress disorders, psychiatric disorders, type 2 diabetes and septic shock. In some embodiments, an MC2R antagonist is used in the treatment of ACTH driven adrenal tumors. In some embodiments, an MC2R antagonist is used in the treatment of Functional Adrenal Hyperandrogenism. In some embodiments, an MC2R antagonist is used in the treatment of stress disorders. In some embodiments, an MC2R antagonist is used in the treatment of psychiatric disorders. In some embodiments, an MC2R antagonist is used in the treatment of type 2 diabetes. In some embodiments, an MC2R antagonist is used in the treatment of septic shock.

In some embodiments, an MC2R antagonist is used in the treatment of septic shock.

In some embodiments, compounds described herein are amenable to administration to a mammal in need of treatment with an MC2R antagonist.

Compounds

Compounds of Formula (I), including pharmaceutically acceptable salts, prodrugs, active metabolites and pharmaceutically acceptable solvates thereof, are melanocortin receptor modulators. In some embodiments, the compounds of Formula (I), including pharmaceutically acceptable salts, prodrugs, active metabolites and pharmaceutically acceptable solvates thereof, are MC2R modulators. In some embodiments, the MC2R modulators are MC2R antagonists.

In one aspect, provided herein is a compound of Formula (I), or a pharmaceutically acceptable salt, or solvate thereof:

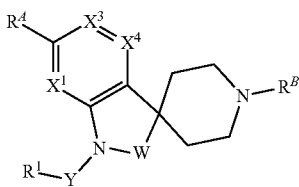

Formula (I)

wherein:
- $R^A$ is unsubstituted or substituted aryl or unsubstituted or substituted heteroaryl, wherein if $R^A$ is substituted then $R^A$ is substituted with 1, 2, 3 or 4 groups selected from $R^a$, $R^b$, and $R^c$;
- $R^a$, $R^b$, and $R^c$ are independently selected from the group consisting of hydrogen, halogen, —$OR^4$, —CN, —$N(R^4)_2$, —C(=O)$R^7$, unsubstituted or substituted $C_1$-$C_6$ alkyl, unsubstituted or substituted $C_1$-$C_6$ fluoroalkyl, unsubstituted or substituted $C_1$-$C_6$ heteroalkyl, unsubstituted or substituted $C_3$-$C_6$ cycloalkyl, unsubstituted or substituted $C_2$-$C_7$ heterocycloalkyl, unsubstituted or substituted phenyl, and unsubstituted or substituted heteroaryl, wherein any substituted group of $R^a$, $R^b$, and $R^c$ is substituted with one or more $R^6$ groups;
- wherein, if $R^a$, $R^b$, or $R^c$ is attached to the N atom of a heteroaryl, then it is hydrogen, —C(=O)$R^7$, unsubstituted or substituted $C_1$-$C_6$ alkyl, unsubstituted or substituted $C_1$-$C_6$ fluoroalkyl, unsubstituted or substituted $C_1$-$C_6$ heteroalkyl, unsubstituted or substituted $C_3$-$C_6$ cycloalkyl, or unsubstituted or substituted $C_2$-$C_7$ heterocycloalkyl;
- $R^B$ is unsubstituted or substituted aryl or unsubstituted or substituted heteroaryl, wherein if $R^B$ is substituted then $R^B$ is substituted with 1, 2, 3 or 4 groups selected from $R^d$, $R^e$, and $R^f$;
- $R^d$, $R^e$, and $R^f$ are independently selected from the group consisting of hydrogen, halogen, —$OR^4$, —CN, —$N(R^4)_2$, —C(=O)$R^7$, —C(=O)$N(R^4)_2$, unsubstituted or substituted $C_1$-$C_6$ alkyl, unsubstituted or substituted $C_1$-$C_6$ fluoroalkyl, unsubstituted or substituted $C_1$-$C_6$ heteroalkyl, unsubstituted or substituted $C_3$-$C_6$ cycloalkyl, unsubstituted or substituted $C_2$-$C_7$ heterocycloalkyl, unsubstituted or substituted phenyl, and unsubstituted or substituted heteroaryl, wherein any substituted group of $R^d$, $R^e$, and $R^f$ is substituted with one or more R groups;
- wherein, if $R^d$, $R^e$, or $R^f$ is attached to the N atom of a heteroaryl, then it is hydrogen, —C(=O)$R^7$, unsubstituted or substituted $C_1$-$C_6$ alkyl, unsubstituted or substituted $C_1$-$C_6$ fluoroalkyl, unsubstituted or substituted $C_1$-$C_6$ heteroalkyl, unsubstituted or substituted $C_3$-$C_6$ cycloalkyl, or unsubstituted or substituted $C_2$-$C_7$ heterocycloalkyl;
- $X^1$ is $CR^{11}$ or N;
- $X^3$ is $CR^{13}$ or N;
- $X^4$ is $CR^{14}$ or N;
- $R^{11}$, $R^{13}$, and $R^{14}$ are each independently hydrogen, halogen, unsubstituted or substituted $C_1$-$C_6$ alkyl, unsubstituted or substituted $C_1$-$C_6$ fluoroalkyl, unsubstituted or substituted $C_1$-$C_6$ heteroalkyl, unsubstituted or substituted $C_3$-$C_6$ cycloalkyl, —$OR^4$, —$SR^4$, —$CO_2R^4$, —C(=O)$N(R^4)_2$, or —$N(R^4)_2$;
- W is absent, —$C(R^3)_2$—, —$C(R^3)_2$—$C(R^3)_2$—, —C(=O)—, #—C(=O)—O—, #—C(=O)—$C(R^3)_2$—, or #—C(=O)N$R_2$—; wherein # indicates the attachment point to the N atom of the ring;
- Y is absent, —(C=O)—, *—O(C=O)—, *—$NR^2$—(C=O)—, —($SO_2$)—, or *—$NR^2$—($SO_2$)—; wherein * indicates the attachment point to $R^1$;
- $R^1$ is unsubstituted or substituted $C_1$-$C_6$ alkyl, unsubstituted or substituted $C_1$-$C_6$ fluoroalkyl, unsubstituted or substituted $C_1$-$C_6$ heteroalkyl, unsubstituted or substituted $C_3$-$C_6$ cycloalkyl, unsubstituted or substituted $C_2$-$C_7$ heterocycloalkyl, unsubstituted or substituted —($C_1$-$C_6$ alkyl)-($C_3$-$C_6$ cycloalkyl), or unsubstituted or substituted —($C_1$-$C_6$ alkyl)-($C_2$-$C_7$ heterocycloalkyl), wherein any substituted group of $R^1$ is substituted with one or more halogen, unsubstituted or substituted $C_1$-$C_6$ alkyl, unsubstituted or substituted monocyclic heterocycle, —$N(R^4)_2$, —$OR^5$, —CN, —$CO_2R^5$, —C(=O)$N(R^4)_2$, —$SR^5$, —S(=O)$R^7$, —S(=O)$_2R^7$, —$NR^4$C(=O)$R^5$, —$NR^4SO_2R^7$, —$SO_2R^7$, or —$SO_2N(R^4)_2$;
- each $R^2$ is independently hydrogen, unsubstituted or substituted $C_1$-$C_6$ alkyl, unsubstituted or substituted $C_3$-$C_6$ cycloalkyl, or unsubstituted or substituted $C_2$-$C_7$ heterocycloalkyl;
- each $R^3$ is independently hydrogen, halogen, unsubstituted or substituted $C_1$-$C_6$ alkyl, unsubstituted or substituted $C_3$-$C_6$ cycloalkyl, or unsubstituted or substituted $C_2$-$C_7$ heterocycloalkyl;
- each $R^4$ is independently selected from the group consisting of hydrogen, unsubstituted or substituted $C_1$-$C_6$ alkyl, unsubstituted or substituted $C_3$-$C_6$ cycloalkyl, unsubstituted or substituted $C_1$-$C_6$fluoroalkyl, unsubstituted or substituted aryl, and unsubstituted or substituted heteroaryl;
- or two $R^4$ are taken together with the nitrogen atom to which they are attached to form an unsubstituted or substituted 3- to 6-membered monocyclic heterocycle;
- each $R^5$ is independently selected from the group consisting of hydrogen, substituted $C_1$-$C_6$ alkyl, unsubstituted or substituted $C_3$-$C_6$ cycloalkyl, unsubstituted or substituted $C_1$-$C_6$fluoroalkyl, unsubstituted or substituted aryl, and unsubstituted or substituted heteroaryl;
- each $R^6$ is independently hydrogen, halogen, unsubstituted or substituted $C_1$-$C_4$alkyl, unsubstituted or substituted $C_1$-$C_4$alkoxy, unsubstituted or substituted $C_1$-$C_4$fluoroalkyl, unsubstituted or substituted $C_1$-$C_4$fluoroalkoxy, unsubstituted or substituted monocyclic carbocycle, unsubstituted or substituted monocyclic heterocycle, —CN, —OH, —$CO_2R^5$, —$CH_2CO_2R^5$, —C(=O)$N(R^4)_2$, —C(=O)$N(R^4)OR^5$, —$CH_2C(=O)N(R^4)_2$, —$N(R^4)_2$, —$CH_2N(R^4)_2$, —$C(R^5)_2N(R^4)_2$, —$NR^4C(=O)R^5$, —$CH_2NR^4C(=O)R^5$, —$NR^4C(=O)N(R^5)_2$, —$NR^4C(=O)N(R^4)_2$, $C(R^5)$=$N(R^4)$—$OR^5$, —$SR^5$, —S(=O)$R^7$, —$SO_2R^7$, or —$SO_2N(R^4)_2$; and
- each $R^7$ is independently selected from the group consisting substituted $C_1$-$C_6$ alkyl, unsubstituted or substituted $C_3$-$C_6$ cycloalkyl, unsubstituted or substituted $C_1$-$C_6$fluoroalkyl, unsubstituted or substituted phenyl, and unsubstituted or substituted heteroaryl.

In some embodiments, W is —$C(R^3)_2$—, —$C(R^3)_2$—$C(R^3)_2$—, —C(=O)—, #—C(=O)—O—, #—C(=O)—$C(R^3)_2$—, or #—C(=O)N$R^2$—; wherein # indicates the attachment point to the N atom of the ring. In some embodiments, W is —$C(R^3)_2$—, —$C(R^3)_2$—$C(R^3)_2$—, or —C(=O)—. In some embodiments, W is —$C(R^3)_2$— or —C(=O)—.

In some embodiments, W is —C(R$^3$)$_2$—. In some embodiments, W is —C(R$^3$)$_2$—; and each R$^3$ is the same. In some embodiments, W is —C(R$^3$)$_2$—; and each R$^3$ is different. In some embodiments, W is —CH(R$^3$)—. In some embodiments, W is —C(R$^3$)$_2$—; and each R$^3$ is independently hydrogen or unsubstituted or substituted C$_1$-C$_6$ alkyl. In some embodiments, W is —C(R$^3$)$_2$—; and each R$^3$ is independently hydrogen, —CH$_3$, —CH$_2$CH$_3$, —CH$_2$CH$_2$CH$_3$, or —CH(CH$_3$)$_2$. In some embodiments, W is —CH(R$^3$)—; and R$^3$ is hydrogen or unsubstituted or substituted C$_1$-C$_6$ alkyl. In some embodiments, W is —CH(R$^3$)—; and R$^3$ is hydrogen, —CH$_3$, —CH$_2$CH$_3$, —CH$_2$CH$_2$CH$_3$, or —CH(CH$_3$)$_2$. In some embodiments, W is —CH(R$^3$)—; and R$^3$ is unsubstituted or substituted C$_1$-C$_6$ alkyl. In some embodiments, W is —CH(R$^3$)—; and R$^3$ is —CH$_3$, —CH$_2$CH$_3$, —CH$_2$CH$_2$CH$_3$, or —CH(CH$_3$)$_2$. In some embodiments, W is —CH(CH$_3$)—.

In some embodiments, W is —CH$_2$—.
In some embodiments, W is —C(=O)—.
In some embodiments, W is —CH$_2$—, —CH(CH$_3$)— or —C(=O)—.
In some embodiments, W is absent.

In some embodiments, W is $^\#$—C(=O)—O—, $^\#$—C(=O)—C(R$^3$)$_2$—, or $^\#$—C(=O)NR$^2$—; wherein $^\#$ indicates the attachment point to the N atom of the ring. In some embodiments, W is $^\#$—C(=O)—C(R$^3$)$_2$—, or $^\#$—C(=O)NR$^2$—; wherein $^\#$ indicates the attachment point to the N atom of the ring.

In some embodiments, W is $^\#$—C(=O)—C(R$^3$)$_2$—; wherein $^\#$ indicates the attachment point to the N atom of the ring. In some embodiments, W is $^\#$—C(=O)—C(R$^3$)$_2$—; wherein $^\#$ indicates the attachment point to the N atom of the ring; and each R$^3$ is the same. In some embodiments, W is $^\#$—C(=O)—C(R$^3$)$_2$—; wherein $^\#$ indicates the attachment point to the N atom of the ring; and each R$^3$ is different. In some embodiments, W is $^\#$—C(=O)—C(R$^3$)$_2$—; wherein $^\#$ indicates the attachment point to the N atom of the ring; and each R$^3$ is independently hydrogen or unsubstituted or substituted C$_1$-C$_6$ alkyl. In some embodiments, W is $^\#$—C(=O)—C(R$^3$)$_2$—; wherein $^\#$ indicates the attachment point to the N atom of the ring; and each R$^3$ is independently hydrogen, —CH$_3$, —CH$_2$CH$_3$, —CH$_2$CH$_2$CH$_3$, or —CH(CH$_3$)$_2$. In some embodiments, W is $^\#$—C(=O)—CH$_2$—; wherein $^\#$ indicates the attachment point to the N atom of the ring.

In some embodiments, W is $^\#$—C(=O)NR$^2$—; wherein $^\#$ indicates the attachment point to the N atom of the ring. In some embodiments, W is $^\#$—C(=O)NR$^2$—; wherein $^\#$ indicates the attachment point to the N atom of the ring; and R$^2$ is hydrogen or unsubstituted or substituted C$_1$-C$_6$ alkyl. In some embodiments, W is $^\#$—C(=O)NR$^2$—; wherein $^\#$ indicates the attachment point to the N atom of the ring; and R$^2$ is hydrogen, —CH$_3$, —CH$_2$CH$_3$, —CH$_2$CH$_2$CH$_3$, or —CH(CH$_3$)$_2$. In some embodiments, W is $^\#$—C(=O)NR$^2$—; wherein $^\#$ indicates the attachment point to the N atom of the ring; and R$^2$ is hydrogen or —CH$_3$. In some embodiments, W is $^\#$—C(=O)NH—; wherein $^\#$ indicates the attachment point to the N atom of the ring.

In some embodiments, Y is absent, —(C=O)—, *—O(C=O)—, *—NR$^2$—(C=O)—, —(SO$_2$)—, or *—NR$^2$—(SO$_2$)—; wherein * indicates the attachment point to R$^1$. In some embodiments, Y is absent, —(C=O)—, *—NR$^2$—(C=O)—, or —(SO$_2$)—; wherein * indicates the attachment point to R$^1$.

In some embodiments, Y is absent.
In some embodiments, Y is —(C=O)—.
In some embodiments, Y is —(SO$_2$)—.

In some embodiments, Y is *—NR$^2$—(C=O)—; wherein * indicates the attachment point to R$^1$. In some embodiments, Y is *—NR$^2$—(C=O)—; wherein * indicates the attachment point to R$^1$; and R$^2$ is hydrogen or unsubstituted or substituted C$_1$-C$_6$ alkyl. In some embodiments, Y is *—NR$^2$—(C=O)—; wherein * indicates the attachment point to R$^1$; and R$^2$ is hydrogen, —CH$_3$, —CH$_2$CH$_3$, —CH$_2$CH$_2$CH$_3$, or —CH(CH$_3$)$_2$. In some embodiments, Y is *—NR$^2$—(C=O)—; wherein * indicates the attachment point to R$^1$; and R$^2$ is hydrogen or —CH$_3$. In some embodiments, Y is *—NH—(C=O)—; wherein * indicates the attachment point to R$^1$. In some embodiments, Y is *—N(CH$_3$)—(C=O)—; wherein * indicates the attachment point to R$^1$.

In some embodiments, Y is absent or —(C=O)—.

In some embodiments, each R$^2$ is independently hydrogen or unsubstituted or substituted C$_1$-C$_6$ alkyl. In some embodiments, each R$^2$ is independently hydrogen or C$_1$-C$_6$ alkyl. In some embodiments, each R$^2$ is independently hydrogen, —CH$_3$, —CH$_2$CH$_3$, —CH$_2$CH$_2$CH$_3$, or —CH(CH$_3$)$_2$. In some embodiments, each R$^2$ is independently hydrogen or —CH$_3$. In some embodiments, each R$^2$ is —CH$_3$. In some embodiments, each R$^2$ is hydrogen.

In some embodiments, each R$^3$ is independently hydrogen, halogen, or unsubstituted or substituted C$_1$-C$_6$ alkyl. In some embodiments, each R$^3$ is independently hydrogen or unsubstituted or substituted C$_1$-C$_6$ alkyl. In some embodiments, each R$^3$ is independently hydrogen or C$_1$-C$_6$ alkyl. In some embodiments, each R$^3$ is independently hydrogen, —F, —Cl, —CH$_3$, —CH$_2$CH$_3$, —CH$_2$CH$_2$CH$_3$, or —CH(CH$_3$)$_2$. In some embodiments, each R$^3$ is independently hydrogen, —CH$_3$, —CH$_2$CH$_3$, —CH$_2$CH$_2$CH$_3$, or —CH(CH$_3$)$_2$. In some embodiments, each R$^3$ is independently hydrogen or —CH$_3$. In some embodiments, each R$^3$ is —CH$_3$. In some embodiments, each R$^3$ is hydrogen.

In some embodiments, W is —C(R$^3$)$_2$— or —C(=O)—; Y is absent, —(C=O)—, *—NR$^2$—(C=O)—, or —(SO$_2$)—; wherein * indicates the attachment point to R$^1$; each R$^2$ is independently hydrogen, —CH$_3$, —CH$_2$CH$_3$, —CH$_2$CH$_2$CH$_3$, or —CH(CH$_3$)$_2$; and each R$^3$ is independently hydrogen, —CH$_3$, —CH$_2$CH$_3$, —CH$_2$CH$_2$CH$_3$, or —CH(CH$_3$)$_2$.

In some embodiments, W is —CH$_2$—, —CH(CH$_3$)—, or —C(=O)—; and Y is absent, —(C=O)—, *—NH—(C=O)—, or —(SO$_2$)—; wherein * indicates the attachment point to R$^1$.

In some embodiments, W is —CH$_2$— or —C(=O)—; and Y is absent or —(C=O)—.

In some embodiments, R$^A$ is unsubstituted or substituted monocyclic 5-membered heteroaryl, unsubstituted or substituted monocyclic 6-membered heteroaryl, or unsubstituted or substituted phenyl, wherein if R$^A$ is substituted then R$^A$ is substituted with 1, 2, 3 or 4 groups selected from R$^a$, R$^b$, and R$^c$. In some embodiments, R$^A$ is unsubstituted or substituted monocyclic 5-membered heteroaryl, unsubstituted or substituted monocyclic 6-membered heteroaryl, or unsubstituted or substituted phenyl, wherein if R$^A$ is substituted then R$^A$ is substituted with 1, 2, or 3 groups selected from R$^a$, R$^b$, and R$^c$. In some embodiments, R$^A$ is unsubstituted or substituted monocyclic 5-membered heteroaryl, unsubstituted or substituted monocyclic 6-membered heteroaryl, or unsubstituted or substituted phenyl, wherein if R$^A$ is substituted then R$^A$ is substituted with 1 or 2 groups selected from R$^a$, R$^b$, and R$^c$. In some embodiments, R$^A$ is unsubstituted or substituted monocyclic 5-membered heteroaryl, unsubstituted or substituted monocyclic 6-membered heteroaryl, or unsubstituted or substituted phenyl, wherein if $R^A$ is substituted then $R^A$ is substituted with 1 $R^a$, $R^b$, or $R^c$ group.

In some embodiments, $R^A$ is substituted with 1, 2, 3 or 4 groups selected from $R^a$, $R^b$, and $R^c$. In some embodiments, $R^A$ is substituted with 1, 2, or 3 groups selected from $R^a$, $R^b$, and $R^c$. In some embodiments, $R^A$ is substituted with 1 or 2 groups selected from $R^a$, $R^b$, and $R^c$. In some embodiments, $R^A$ is substituted with 1 group selected from $R^a$, $R^b$, and $R^c$. In some embodiments, $R^A$ is substituted with one $R^a$. In some embodiments, $R^A$ is substituted with one $R^c$.

In some embodiments, $R^A$ is unsubstituted or substituted phenyl, unsubstituted or substituted pyridinyl, unsubstituted or substituted pyrimidinyl, unsubstituted or substituted pyrazinyl, unsubstituted or substituted pyridazinyl, unsubstituted or substituted triazinyl, unsubstituted or substituted pyrrolyl, unsubstituted or substituted furanyl, unsubstituted or substituted thienyl, unsubstituted or substituted oxazolyl, unsubstituted or substituted thiazolyl, unsubstituted or substituted imidazolyl, unsubstituted or substituted pyrazolyl, unsubstituted or substituted triazolyl, unsubstituted or substituted tetrazolyl, unsubstituted or substituted isoxazolyl, unsubstituted or substituted isothiazolyl, unsubstituted or substituted oxadiazolyl, or unsubstituted or substituted thiadiazolyl, wherein if $R^A$ is substituted then $R^A$ is substituted with 1, 2, 3 or 4 groups selected from $R^a$, $R^b$, and $R^c$. In some embodiments, if $R^A$ is substituted then $R^A$ is substituted with 1, 2, or 3 groups selected from $R^a$, $R^b$, and $R^c$. In some embodiments, if $R^A$ is substituted then $R^A$ is substituted with 1 or 2 groups selected from $R^a$, $R^b$, and $R^c$. In some embodiments, if $R^A$ is substituted then $R^A$ is substituted with 1 $R^a$, $R^b$, or $R^c$ group.

In some embodiments, $R^A$ is unsubstituted or substituted phenyl, unsubstituted or substituted pyridinyl, unsubstituted or substituted pyrimidinyl, unsubstituted or substituted pyrazinyl, or unsubstituted or substituted pyridazinyl, wherein if $R^A$ is substituted then $R^A$ is substituted with 1, 2, 3 or 4 groups selected from $R^a$, $R^b$, and $R^c$. In some embodiments, if $R^A$ is substituted then $R^A$ is substituted with 1 or 2 groups selected from $R^a$, $R^b$, and $R^c$.

In some embodiments, $R^A$ is unsubstituted or substituted phenyl or unsubstituted or substituted pyridinyl, wherein if $R^A$ is substituted then $R^A$ is substituted with 1, 2, 3 or 4 groups selected from $R^a$, $R^b$, and $R^c$. In some embodiments, if $R^A$ is substituted then $R^A$ is substituted with 1 or 2 groups selected from $R^a$, $R^b$, and $R^c$.

In some embodiments, $R^A$ is

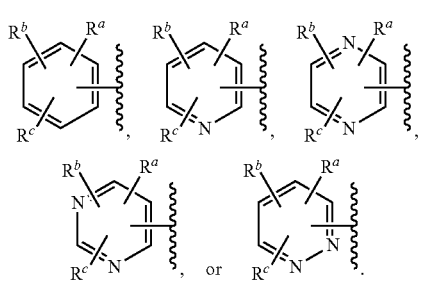

In some embodiments, $R^A$ is

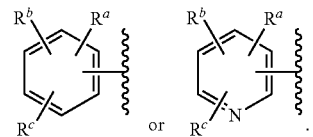

In some embodiments, $R^A$ is

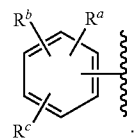

In some embodiments, $R^A$ is

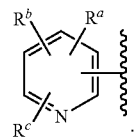

In some embodiments, $R^A$ is

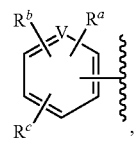

where V is CH, $CR^a$, $CR^b$, or N. In some embodiments, V is CH or N.

In some embodiments, $R^A$ is

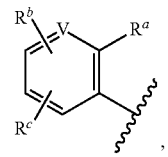

where V is CH, $CR^a$, $CR^b$, or N. In some embodiments, V is CH or N.

In some embodiments, the compound has the structure of Formula (II), or a pharmaceutically acceptable salt, or solvate thereof:

Formula (II)

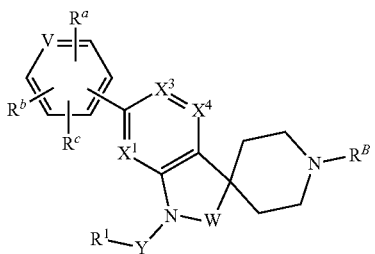

wherein V is CH, $CR^a$, $CR^b$, or N. In some embodiments, V is CH or N.

In some embodiments, the compound has the structure of Formula (IIa), (IIb), (IIc), or (IId), or a pharmaceutically acceptable salt, or solvate thereof:

Formula (IIa)

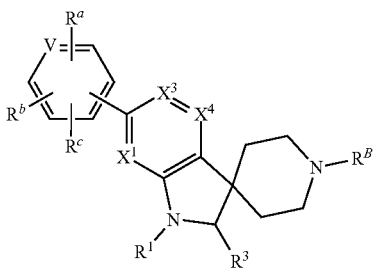

Formula (IIb)

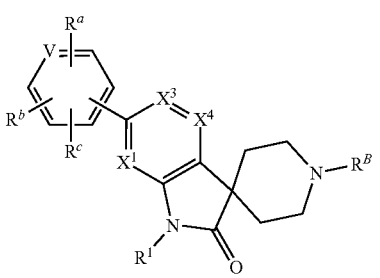

Formula (IIc)

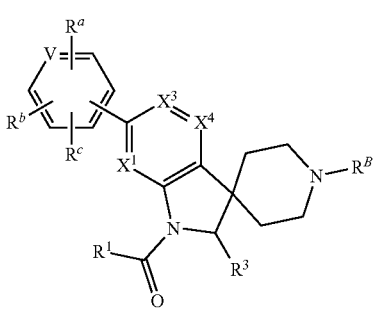

Formula (IId)

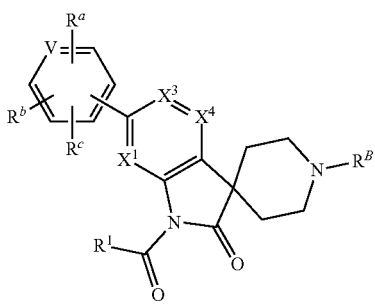

wherein V is CH, $CR^a$, $CR^b$, or N. In some embodiments, V is CH or N.

In some embodiments, the compound has the structure of Formula (IIa), or a pharmaceutically acceptable salt, or solvate thereof. In some embodiments, the compound has the structure of Formula (IIb), or a pharmaceutically acceptable salt, or solvate thereof. In some embodiments, the compound has the structure of Formula (IIc), or a pharmaceutically acceptable salt, or solvate thereof. In some embodiments, the compound has the structure of Formula (IId), or a pharmaceutically acceptable salt, or solvate thereof.

In some embodiments, $R^A$ is unsubstituted or substituted monocyclic 5-membered heteroaryl, wherein if $R^A$ is substituted then $R^A$ is substituted with 1 or 2 groups selected from $R^a$, $R^b$, and $R^c$. In some embodiments, $R^A$ is unsubstituted or substituted monocyclic 5-membered heteroaryl containing one heteroatom selected from N, O, and S, wherein if $R^A$ is substituted then $R^A$ is substituted with 1, 2, or 3 groups selected from $R^a$, $R^b$, and $R^c$. In some embodiments, $R^A$ is unsubstituted or substituted monocyclic 5-membered heteroaryl containing one heteroatom selected from N, O, and S, wherein if $R^A$ is substituted then $R^A$ is substituted with 1 or 2 groups selected from $R^a$, $R^b$, and $R^c$. In some embodiments, $R^A$ is unsubstituted or substituted monocyclic 5-membered heteroaryl containing one heteroatom selected from N, O, and S, wherein if $R^A$ is substituted then $R^A$ is substituted with 1 $R^a$, $R^b$, or $R^c$ group.

In some embodiments, $R^A$ is unsubstituted or substituted pyrrolyl, unsubstituted or substituted furanyl, unsubstituted or substituted thienyl, unsubstituted or substituted oxazolyl, unsubstituted or substituted thiazolyl, unsubstituted or substituted imidazolyl, unsubstituted or substituted pyrazolyl, unsubstituted or substituted triazolyl, unsubstituted or substituted tetrazolyl, unsubstituted or substituted isoxazolyl, unsubstituted or substituted isothiazolyl, unsubstituted or substituted oxadiazolyl, or unsubstituted or substituted thiadiazolyl, wherein if $R^A$ is substituted then $R^A$ is substituted with 1, 2, or 3 groups selected from $R^a$, $R^b$, and $R^c$. In some embodiments, if $R^A$ is substituted then $R^A$ is substituted with 1 or 2 groups selected from $R^a$, $R^b$, and $R^c$. In some embodiments, if $R^A$ is substituted then $R^A$ is substituted with 1 $R^a$, $R^b$, or $R^c$ group.

In some embodiments, $R^A$ is unsubstituted or substituted pyrrolyl, unsubstituted or substituted furanyl, unsubstituted or substituted thienyl, unsubstituted or substituted pyrazolyl, unsubstituted or substituted isoxazolyl, wherein if $R^A$ is substituted then $R^A$ is substituted with 1, 2, or 3 groups selected from $R^a$, $R^b$, and $R^c$. In some embodiments, if $R^A$ is substituted then $R^A$ is substituted with 1 or 2 groups selected from $R^a$, $R^b$, and $R^c$. In some embodiments, if $R^A$ is substituted then $R^A$ is substituted with 1 $R^a$, $R^b$, or $R^c$ group.

In some embodiments, $R^4$ is unsubstituted or substituted pyrrolyl, unsubstituted or substituted furanyl, or unsubstituted or substituted thienyl, wherein if $R^4$ is substituted then $R^4$ is substituted with 1, 2, or 3 groups selected from $R^a$, $R^b$, and $R^c$. In some embodiments, if $R^4$ is substituted then $R^4$ is substituted with 1 or 2 groups selected from $R^a$, $R^b$, and $R^c$. In some embodiments, if $R^4$ is substituted then $R^4$ is substituted with 1 $R^a$, $R^b$, or $R^c$ group.

In some embodiments, $R^4$ is

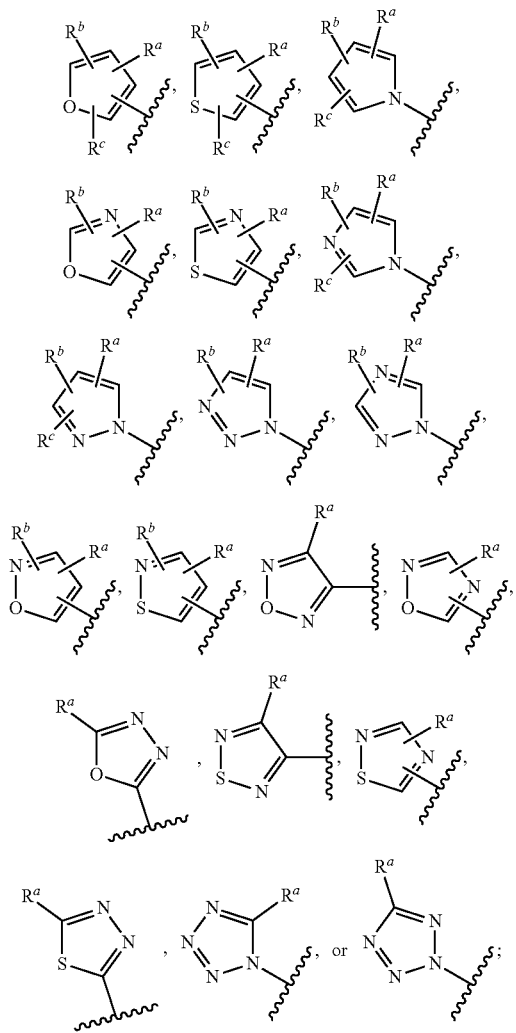

or $R^4$ is

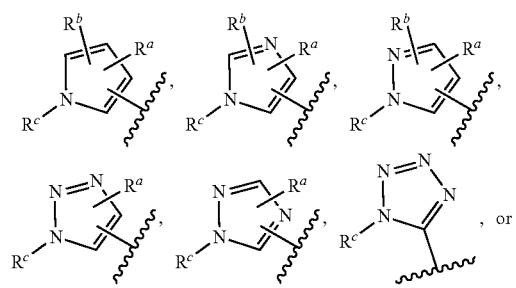

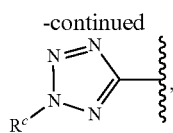

where $R^c$ is hydrogen, $—C(\!=\!O)R^7$, unsubstituted or substituted $C_1$-$C_6$ alkyl, unsubstituted or substituted $C_3$-$C_6$ cycloalkyl, or unsubstituted or substituted $C_2$-$C_7$ heterocycloalkyl.

In some embodiments, $R^4$ is

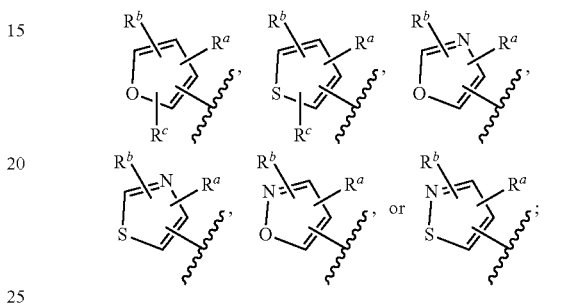

or $R^4$ is

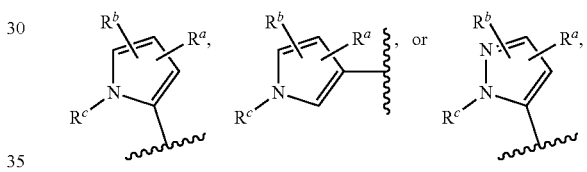

where $R^c$ is hydrogen, $—C(\!=\!O)R^7$, unsubstituted or substituted $C_1$-$C_1$ alkyl, unsubstituted or substituted $C_3$-$C_6$ cycloalkyl, or unsubstituted or substituted $C_2$-$C_7$ heterocycloalkyl.

In some embodiments, $R^4$ is

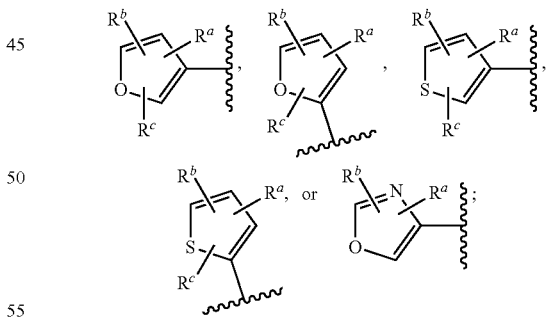

or $R^4$ is

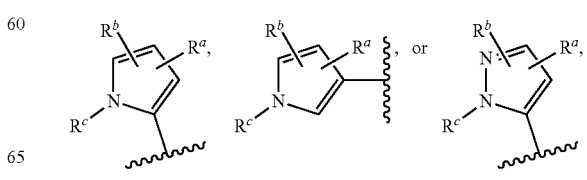

where $R^c$ is hydrogen, —C(=O)$R^7$, unsubstituted or substituted $C_1$-$C_6$ alkyl, unsubstituted or substituted $C_3$-$C_6$ cycloalkyl, or unsubstituted or substituted $C_2$-$C_7$ heterocycloalkyl.

In some embodiments, $R^A$ is

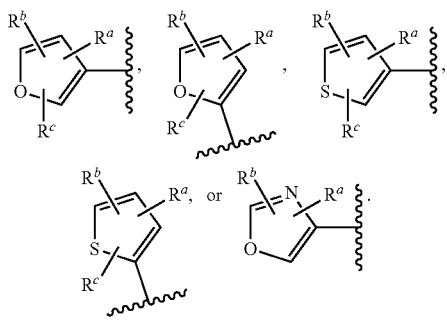

In some embodiments, $R^A$ is

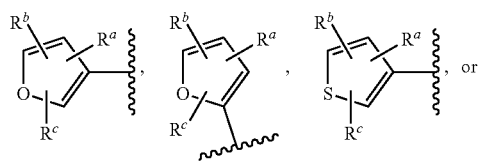

In some embodiments, $R^A$ is

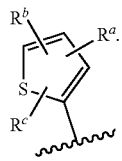

In some embodiments, $R^A$ is

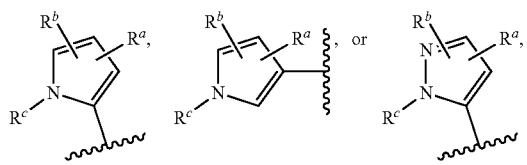

In some embodiments, $R^A$ is

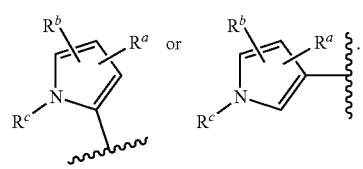

where $R^c$ is hydrogen, —C(=O)$R^7$, unsubstituted or substituted $C_1$-$C_6$ alkyl, unsubstituted or substituted $C_3$-$C_6$ cycloalkyl, or unsubstituted or substituted $C_2$-$C_7$ heterocycloalkyl. In some embodiments, $R^A$ is

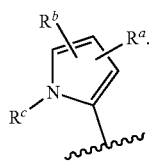

In some embodiments, $R^A$ is

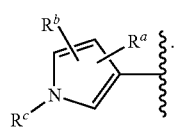

In some embodiments, $R^A$ is

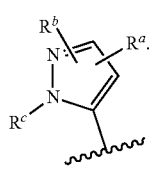

In some embodiments, $R^A$ is

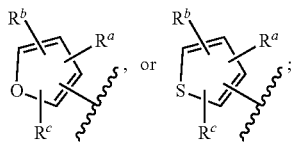

or $R^A$ is

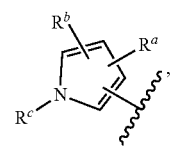

where $R^c$ is hydrogen, —C(=O)$R^7$, unsubstituted or substituted $C_1$-$C_6$ alkyl, unsubstituted or substituted $C_3$-$C_6$ cycloalkyl, or unsubstituted or substituted $C_2$-$C_7$ heterocycloalkyl.

In some embodiments, $R^A$ is

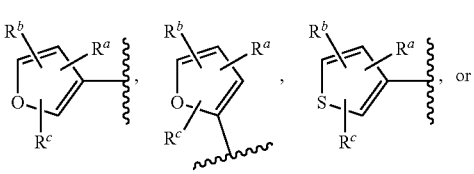

-continued

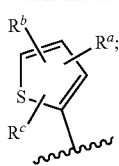

or R$^A$ is

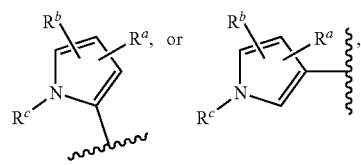

where R$^c$ is hydrogen, —C(=O)R$^7$, unsubstituted or substituted C$_1$-C$_6$ alkyl, unsubstituted or substituted C$_3$-C$_6$ cycloalkyl, or unsubstituted or substituted C$_2$-C$_7$ heterocycloalkyl.

In some embodiments, R$^A$ is

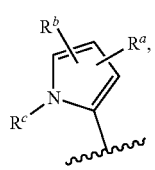

where R is hydrogen, —C(=O)R$^7$, unsubstituted or substituted C$_1$-C$_6$ alkyl, unsubstituted or substituted C$_3$-C$_6$ cycloalkyl, or unsubstituted or substituted C$_2$-C$_7$ heterocycloalkyl. In some embodiments, R$^c$ is hydrogen, unsubstituted or substituted C$_1$-C$_6$ alkyl, unsubstituted or substituted C$_3$-C$_6$ cycloalkyl, or unsubstituted or substituted C$_2$-C$_7$ heterocycloalkyl. In some embodiments, R$^c$ is hydrogen or unsubstituted or substituted C$_1$-C$_6$ alkyl. In some embodiments, R$^c$ is hydrogen or C$_1$-C$_6$ alkyl. In some embodiments, R$^c$ is hydrogen, —CH$_3$, —CH$_2$CH$_3$, —CH$_2$CH$_2$CH$_3$, —CH(CH$_3$)$_2$, —CH$_2$CH$_2$CH$_2$CH$_3$, —CH$_2$CH(CH$_3$)$_2$, —CH(CH$_3$)CH$_2$CH$_3$, —C(CH$_3$)$_3$, —CH$_2$CH$_2$CH$_2$CH$_2$CH$_3$, or —CH$_2$CH$_2$CH(CH$_3$)$_2$. In some embodiments, R$^c$ is hydrogen, —CH$_3$, —CH$_2$CH$_3$, —CH$_2$CH$_2$CH$_3$, or —CH(CH$_3$)$_2$. In some embodiments, R$^c$ is hydrogen or —CH$_3$. In some embodiments, R$^c$ is —CH$_3$. In some embodiments, R$^c$ is hydrogen. In some embodiments, R$^c$ is unsubstituted or substituted C$_1$-C$_6$ alkyl. In some embodiments, R$^c$ is C$_1$-C$_6$ alkyl. In some embodiments, R$^c$ is —CH$_3$, —CH$_2$CH$_3$, —CH$_2$CH$_2$CH$_3$, —CH(CH$_3$)$_2$, —CH$_2$CH$_2$CH$_2$CH$_3$, —CH$_2$CH(CH$_3$)$_2$, —CH(CH$_3$)CH$_2$CH$_3$, —C(CH$_3$)$_3$, —CH$_2$CH$_2$CH$_2$CH$_2$CH$_3$, or —CH$_2$CH$_2$CH(CH$_3$)$_2$. In some embodiments, R is —CH$_3$, —CH$_2$CH$_3$, —CH$_2$CH$_2$CH$_3$, or —CH(CH$_3$)$_2$. In some embodiments, R$^c$ is hydrogen, —CH$_3$, —CH$_2$CH$_3$, —CH$_2$CH$_2$CH$_3$, —CH(CH$_3$)$_2$, —CH$_2$CH$_2$CH$_2$CH$_3$, —CH$_2$CH(CH$_3$)$_2$, —CH(CH$_3$)CH$_2$CH$_3$, —C(CH$_3$)$_3$, —CH$_2$CH$_2$CH(CH$_3$)$_2$, or unsubstituted C$_3$-C$_6$ cycloalkyl.

In some embodiments, R$^A$ is

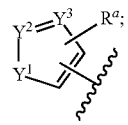

Y$^1$ is NR$^c$, O, or S; Y$^2$ and Y$^3$ are independently CH, CR$^a$, CR$^b$, or N; and R$^c$ is hydrogen, —C(=O)R$^7$, unsubstituted or substituted C$_1$-C$_6$ alkyl, unsubstituted or substituted C$_3$-C$_6$ cycloalkyl, or unsubstituted or substituted C$_2$-C$_7$ heterocycloalkyl. In some embodiments, R$^A$ is

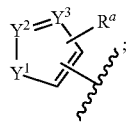

Y$^1$ is NR$^c$; Y$^2$ and Y$^3$ are independently CH, CR$^a$, CR$^b$, or N; and R$^c$ is hydrogen, —C(=O)R$^7$, unsubstituted or substituted C$_1$-C$_6$ alkyl, unsubstituted or substituted C$_3$-C$_6$ cycloalkyl, or unsubstituted or substituted C$_2$-C$_7$ heterocycloalkyl. In some embodiments, R$^A$ is

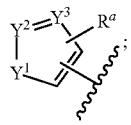

Y$^1$ is NR$^c$; Y$^2$ and Y$^3$ are independently CH, CR$^a$, or CR$^b$; and R$^c$ is hydrogen, —C(=O)R$^7$, unsubstituted or substituted C$_1$-C$_6$ alkyl, unsubstituted or substituted C$_3$-C$_6$ cycloalkyl, or unsubstituted or substituted C$_2$-C$_7$ heterocycloalkyl. In some embodiments, R$^A$ is

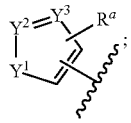

Y$^1$ is NR$^c$; Y$^2$ and Y$^3$ are each CH; and R$^c$ is hydrogen, —C(=O)R$^7$, unsubstituted or substituted C$_1$-C$_6$ alkyl, unsubstituted or substituted C$_3$-C$_6$ cycloalkyl, or unsubstituted or substituted C$_2$-C$_7$ heterocycloalkyl.

In some embodiments, R$^A$ is

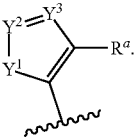

In some embodiments, $R^A$ is

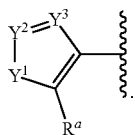

In some embodiments, $R^A$ is

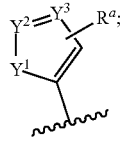

$Y^1$ is $NR^c$, O, or S; $Y^2$ and $Y^3$ are independently CH, $CR^a$, $CR^b$, or N; and $R^c$ is hydrogen, $-C(=O)R^7$, unsubstituted or substituted $C_1$-$C_6$ alkyl, unsubstituted or substituted $C_3$-$C_6$ cycloalkyl, or unsubstituted or substituted $C_2$-$C_7$ heterocycloalkyl. In some embodiments, $R^A$ is

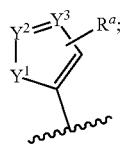

$Y^1$ is $NR^c$; $Y^2$ and $Y^3$ are independently CH, $CR^a$, $CR^b$, or N; and $R^c$ is hydrogen, $-C(=O)R^7$, unsubstituted or substituted $C_1$-$C_6$ alkyl, unsubstituted or substituted $C_3$-$C_6$ cycloalkyl, or unsubstituted or substituted $C_2$-$C_7$ heterocycloalkyl. In some embodiments, $R^A$ is

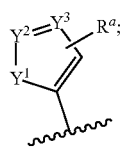

$Y^1$ is $NR^c$; $Y^2$ and $Y^3$ are independently CH, $CR^a$, or $CR^b$; and $R^c$ is hydrogen, $-C(=O)R^7$, unsubstituted or substituted $C_1$-$C_6$ alkyl, unsubstituted or substituted $C_3$-$C_6$ cycloalkyl, or unsubstituted or substituted $C_2$-$C_7$ heterocycloalkyl. In some embodiments, $R^A$ is

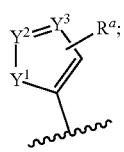

$Y^1$ is $NR^c$; $Y^2$ and $Y^3$ are each CH; and $R^c$ is hydrogen, $-C(=O)R^7$, unsubstituted or substituted $C_1$-$C_6$ alkyl, unsubstituted or substituted $C_3$-$C_6$ cycloalkyl, or unsubstituted or substituted $C_2$-$C_7$ heterocycloalkyl.

In some embodiments, the compound has the structure of Formula (III), or a pharmaceutically acceptable salt, or solvate thereof:

Formula (III)

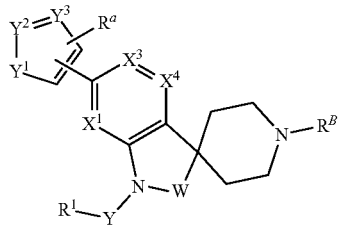

wherein:

$Y^1$ is $NR^c$, O, or S;

$Y^2$ and $Y^3$ are independently CH, $CR^a$, $CR^b$, or N; and $R^c$ is hydrogen, $-C(=O)R^7$, unsubstituted or substituted $C_1$-$C_6$ alkyl, unsubstituted or substituted $C_3$-$C_6$ cycloalkyl, or unsubstituted or substituted $C_2$-$C_7$ heterocycloalkyl.

In some embodiments, the compound has the structure of Formula (IIIa), (IIIb), (IIIc), or (IIId), or a pharmaceutically acceptable salt, or solvate thereof:

Formula (IIIa)

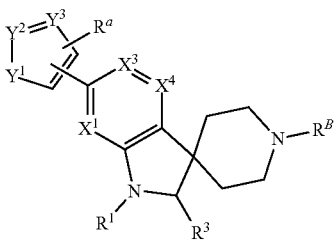

Formula (IIIb)

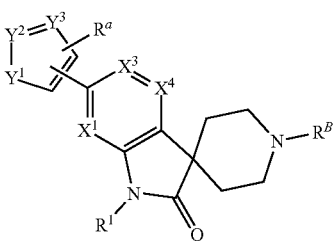

Formula (IIIc)

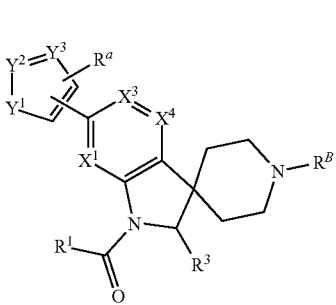

-continued

Formula (IIId)

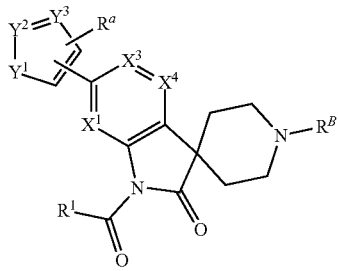

wherein:
Y$^1$ is NR$^c$, O, or S;
Y$^2$ and Y$^3$ are independently CH, CR$^a$, CR$^b$, or N; and
R$^c$ is hydrogen, —C(=O)R$^7$, unsubstituted or substituted C$_1$-C$_6$ alkyl, unsubstituted or substituted C$_3$-C$_6$ cycloalkyl, or unsubstituted or substituted C$_2$-C$_7$ heterocycloalkyl.

In some embodiments, the compound has the structure of Formula (IIIa), or a pharmaceutically acceptable salt, or solvate thereof. In some embodiments, the compound has the structure of Formula (IIIb), or a pharmaceutically acceptable salt, or solvate thereof. In some embodiments, the compound has the structure of Formula (IIIc), or a pharmaceutically acceptable salt, or solvate thereof. In some embodiments, the compound has the structure of Formula (IIId), or a pharmaceutically acceptable salt, or solvate thereof.

In some embodiments, R$^A$ is unsubstituted or substituted bicyclic 9- to 10-membered heteroaryl, wherein if R$^A$ is substituted then R$^A$ is substituted with 1, 2, 3 or 4 groups selected from R$^a$, R$^b$, and R$^c$. R$^A$ is unsubstituted or substituted bicyclic 9- to 10-membered heteroaryl, wherein if R$^A$ is substituted then R$^A$ is substituted with 1 or 2 groups selected from R$^a$, R$^b$, and R$^c$.

In some embodiments, R$^A$ is unsubstituted or substituted quinolinyl, unsubstituted or substituted isoquinolinyl, unsubstituted or substituted cinnolinyl, unsubstituted or substituted phthalazinyl, unsubstituted or substituted quinazolinyl, unsubstituted or substituted quinoxalinyl, unsubstituted or substituted naphthyridinyl, unsubstituted or substituted pteridinyl, unsubstituted or substituted indolizinyl, unsubstituted or substituted azaindolizinyl, unsubstituted or substituted indolyl, unsubstituted or substituted azaindolyl, unsubstituted or substituted indazolyl, unsubstituted or substituted azaindazolyl, unsubstituted or substituted benzimidazolyl, unsubstituted or substituted azabenzimidazolyl, unsubstituted or substituted benzotriazolyl, unsubstituted or substituted azabenzotriazolyl, unsubstituted or substituted benzoxazolyl, unsubstituted or substituted azabenzoxazolyl, unsubstituted or substituted benzisoxazolyl, unsubstituted or substituted azabenzisoxazolyl, unsubstituted or substituted benzofuranyl, unsubstituted or substituted azabenzofuranyl, unsubstituted or substituted benzothienyl, unsubstituted or substituted azabenzothienyl, unsubstituted or substituted benzothiazolyl, unsubstituted or substituted azabenzothiazolyl, or unsubstituted or substituted purinyl, wherein if R$^A$ is substituted then R$^A$ is substituted with 1, 2, 3 or 4 groups selected from R$^a$, R$^b$, and R$^c$. In some embodiments, if R$^A$ is substituted then R$^A$ is substituted with 1 or 2 groups selected from R$^a$, R$^b$, and R$^c$.

In some embodiments, R$^B$ is an unsubstituted or substituted phenyl, unsubstituted or substituted naphthyl, unsubstituted or substituted monocyclic 6-membered heteroaryl, unsubstituted or substituted monocyclic 5-membered heteroaryl, or unsubstituted or substituted bicyclic heteroaryl, wherein if R$^B$ is substituted then R$^B$ is substituted with 1, 2, 3 or 4 groups selected from R$^d$, R$^e$, and R$^f$. In some embodiments, if R$^B$ is substituted then R$^B$ is substituted with 1, 2, or 3 groups selected from R$^d$, R$^e$, and R$^f$.

In some embodiments, R$^B$ is an unsubstituted or substituted phenyl, unsubstituted or substituted naphthyl, unsubstituted or substituted furanyl, unsubstituted or substituted thienyl, unsubstituted or substituted pyrrolyl, unsubstituted or substituted oxazolyl, unsubstituted or substituted thiazolyl, unsubstituted or substituted imidazolyl, unsubstituted or substituted pyrazolyl, unsubstituted or substituted triazolyl, unsubstituted or substituted tetrazolyl, unsubstituted or substituted isoxazolyl, unsubstituted or substituted isothiazolyl, unsubstituted or substituted oxadiazolyl, unsubstituted or substituted thiadiazolyl, unsubstituted or substituted pyridinyl, unsubstituted or substituted pyrimidinyl, unsubstituted or substituted pyrazinyl, unsubstituted or substituted pyridazinyl, unsubstituted or substituted triazinyl, unsubstituted or substituted quinolinyl, unsubstituted or substituted isoquinolinyl, unsubstituted or substituted cinnolinyl, unsubstituted or substituted phthalazinyl, unsubstituted or substituted quinazolinyl, unsubstituted or substituted quinoxalinyl, unsubstituted or substituted naphthyridinyl, unsubstituted or substituted pteridinyl, unsubstituted or substituted indolizinyl, unsubstituted or substituted azaindolizinyl, unsubstituted or substituted indolyl, unsubstituted or substituted azaindolyl, unsubstituted or substituted indazolyl, unsubstituted or substituted azaindazolyl, unsubstituted or substituted benzimidazolyl, unsubstituted or substituted azabenzimidazolyl, unsubstituted or substituted benzotriazolyl, unsubstituted or substituted azabenzotriazolyl, unsubstituted or substituted benzoxazolyl, unsubstituted or substituted azabenzoxazolyl, unsubstituted or substituted benzisoxazolyl, unsubstituted or substituted azabenzisoxazolyl, unsubstituted or substituted benzofuranyl, unsubstituted or substituted azabenzofuranyl, unsubstituted or substituted benzothienyl, unsubstituted or substituted azabenzothienyl, unsubstituted or substituted benzothiazolyl, unsubstituted or substituted azabenzothiazolyl, or unsubstituted or substituted purinyl, wherein if R$^B$ is substituted then R$^B$ is substituted with 1, 2, 3 or 4 groups selected from R$^d$, R$^e$, and R$^f$. In some embodiments, if R$^B$ is substituted then R$^B$ is substituted with 1, 2, or 3 groups selected from R$^d$, R$^e$, and R$^f$.

In some embodiments, R$^B$ is unsubstituted or substituted phenyl, unsubstituted or substituted pyridinyl, unsubstituted or substituted pyrimidinyl, unsubstituted or substituted pyrazinyl, or unsubstituted or substituted pyridazinyl, wherein if R$^B$ is substituted then R$^B$ is substituted with 1, 2, 3 or 4 groups selected from R$^d$, R$^e$, and R$^f$. In some embodiments, if R$^B$ is substituted then R$^B$ is substituted with 1, 2, or 3 groups selected from R$^d$, R$^e$, and R$^f$.

In some embodiments, R$^B$ is unsubstituted or substituted phenyl or unsubstituted or substituted pyridinyl, wherein if R$^B$ is substituted then R$^B$ is substituted with 1, 2, 3 or 4 groups selected from R$^d$, R$^e$, and R$^f$. In some embodiments, if R$^B$ is substituted then R$^B$ is substituted with 1, 2, or 3 groups selected from R$^d$, R$^e$, and R$^f$.

In some embodiments, R$^B$ is

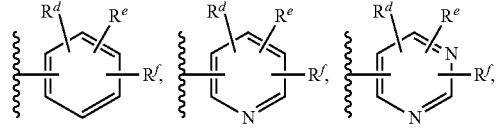

-continued

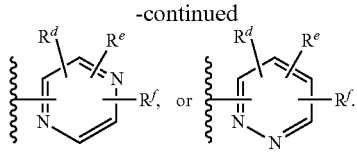

In some embodiments, $R^B$ is

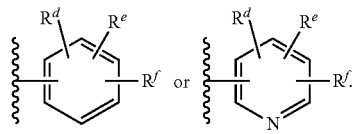

In some embodiments, $R^B$ is

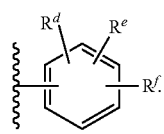

In some embodiments, $R^B$ is

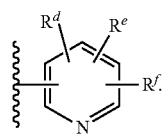

In some embodiments, $R^B$ is

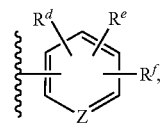

where Z is CH, $CR^d$, $CR^e$, or N. In some embodiments, Z is CH or N.

In some embodiments, the compound has the structure of Formula (IV), or a pharmaceutically acceptable salt, or solvate thereof:

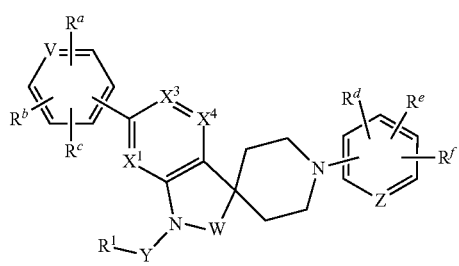

Formula (IV)

wherein V is CH, $CR^a$, $CR^b$, or N; and Z is CH, $CR^d$, $CR^e$, or N.

In some embodiments, V is CH or N. In some embodiments, Z is CH or N. In some embodiments, V is CH or N; and Z is CH or N.

In some embodiments, the compound has the structure of Formula (V), or a pharmaceutically acceptable salt, or solvate thereof:

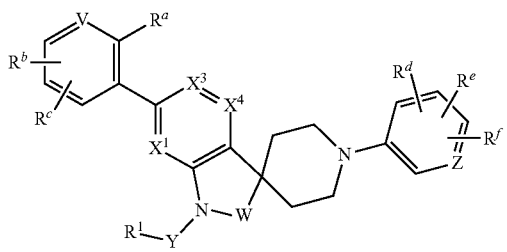

Formula (V)

wherein V is CH, $CR^a$, $CR^b$, or N; and Z is CH, $CR^d$, $CR^e$, or N.

In some embodiments, V is CH or N. In some embodiments, Z is CH or N. In some embodiments, V is CH or N; and Z is CH or N.

In some embodiments, the compound has the structure of Formula (VI), or a pharmaceutically acceptable salt, or solvate thereof:

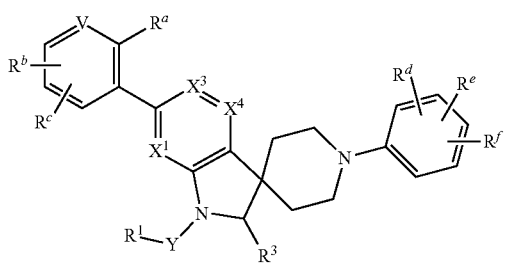

Formula (VI)

wherein V is CH, $CR^a$, $CR^b$, or N. In some embodiments, V is CH or N.

In some embodiments, the compound has the structure of Formula (VIa) or (VIb), or a pharmaceutically acceptable salt, or solvate thereof:

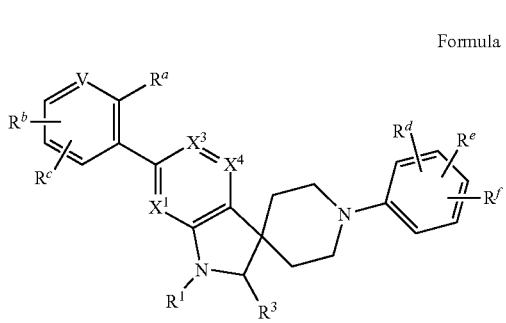

Formula (VIa)

Formula (VIb)

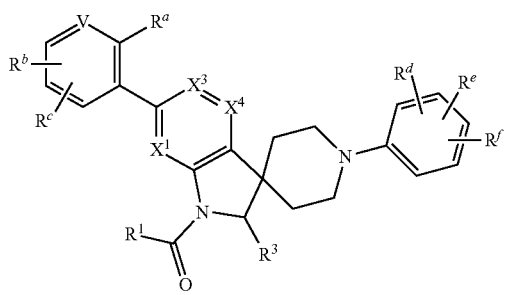

wherein V is CH, $CR^a$, $CR^b$, or N. In some embodiments, V is CH or N.

In some embodiments, the compound has the structure of Formula (VIa), or a pharmaceutically acceptable salt, or solvate thereof. In some embodiments, the compound has the structure of Formula (VIb), or a pharmaceutically acceptable salt, or solvate thereof.

In some embodiments, the compound has the structure of Formula (VIc), or a pharmaceutically acceptable salt, or solvate thereof:

Formula (VIc)

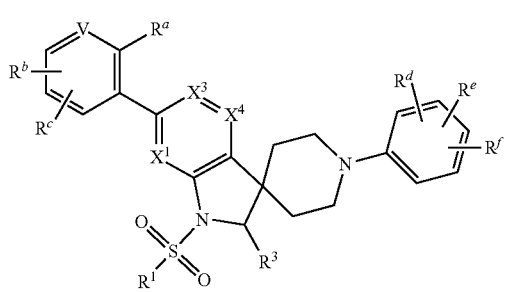

wherein V is CH, $CR^a$, $CR^b$, or N. In some embodiments, V is CH or N.

In some embodiments, the compound has the structure of Formula (VId), or a pharmaceutically acceptable salt, or solvate thereof:

Formula (VId)

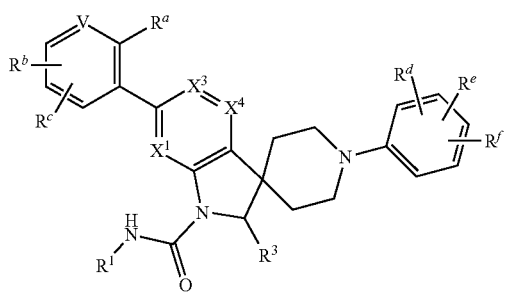

wherein V is CH, $CR^a$, $CR^b$, or N. In some embodiments, V is CH or N.

In some embodiments, the compound has the structure of Formula (VII), or a pharmaceutically acceptable salt, or solvate thereof:

Formula (VII)

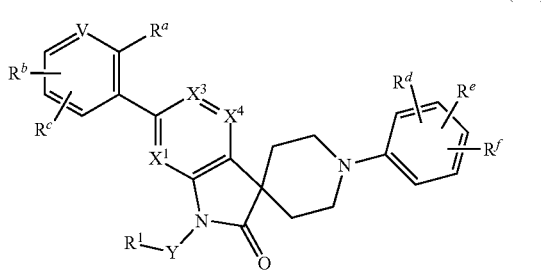

wherein V is CH, $CR^a$, $CR^b$, or N. In some embodiments, V is CH or N.

In some embodiments, the compound has the structure of Formula (VIIa) or (VIIb), or a pharmaceutically acceptable salt, or solvate thereof:

Formula (VIIa)

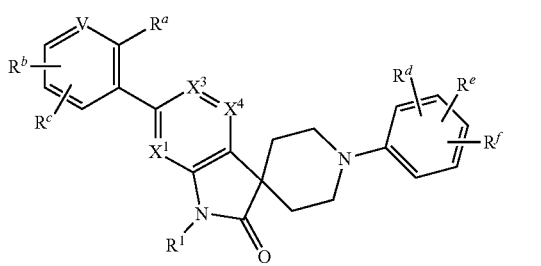

Formula (VIIb)

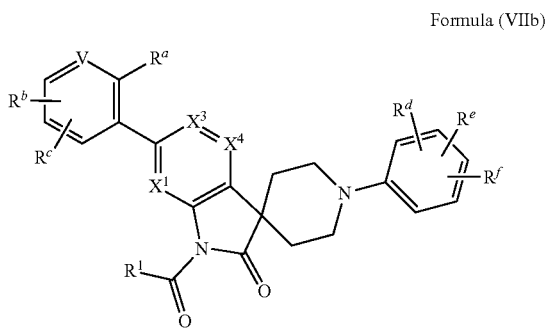

wherein V is CH, $CR^a$, $CR^b$, or N. In some embodiments, V is CH or N.

In some embodiments, the compound has the structure of Formula (VIIa), or a pharmaceutically acceptable salt, or solvate thereof. In some embodiments, the compound has the structure of Formula (VIIb), or a pharmaceutically acceptable salt, or solvate thereof.

In some embodiments, the compound has the structure of Formula (VIIc), or a pharmaceutically acceptable salt, or solvate thereof:

Formula (VIIc)

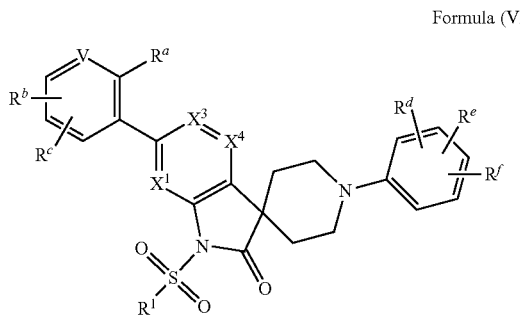

wherein V is CH, CR$^a$, CR$^b$, or N. In some embodiments, V is CH or N.

In some embodiments, the compound has the structure of Formula (VIId), or a pharmaceutically acceptable salt, or solvate thereof:

Formula (VIId)

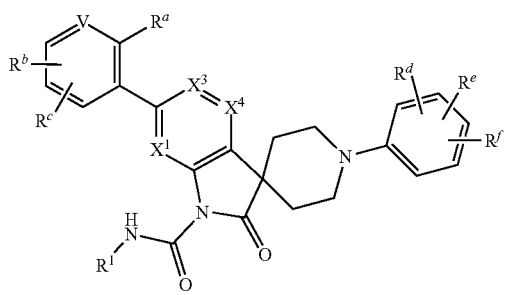

wherein V is CH, CR$^a$, CR$^b$, or N. In some embodiments, V is CH or N.

In some embodiments, the compound has the structure of Formula (VIII), or a pharmaceutically acceptable salt, or solvate thereof:

Formula (VIII)

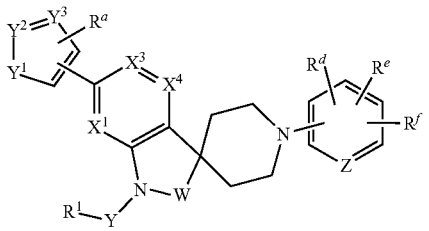

wherein:

Y$^1$ is NR$^c$, O, or S;

Y$^2$ and Y$^3$ are independently CH, CR$^a$, CR$^b$, or N;

R$^c$ is hydrogen, —C(=O)R$^7$, unsubstituted or substituted C$_1$-C$_6$ alkyl, unsubstituted or substituted C$_3$-C$_6$ cycloalkyl, or unsubstituted or substituted C$_2$-C$_7$ heterocycloalkyl; and Z is CH, CR$^d$, CR$^e$, or N.

In some embodiments, the compound of Formula (VIII) has one of the following structures, or a pharmaceutically acceptable salt, or solvate thereof:

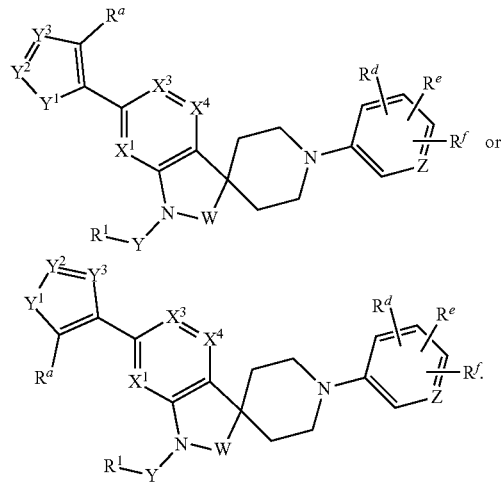

In some embodiments, Y is absent, —(C=O)—, *—NH—(C=O)—, or —(SO$_2$)—, wherein * indicates the attachment point to R$^1$. In some embodiments, Y is absent or —(C=O)—.

In some embodiments, W is —CH$_2$—, —CH(R$^3$), or —(C=O)—. In some embodiments, W is —CH$_2$— or —(C=O)—.

In some embodiments, Z is CH or N.

In some embodiments, Y$^1$ is NR$^c$; and Y$^2$ and Y$^3$ are independently CH, CR$^a$, CR$^b$, or N. In some embodiments, Y$^1$ is NR$^c$; Y$^2$ and Y$^3$ are independently CH, CR$^a$, or CR$^b$. In some embodiments; Y$^1$ is NR$^c$; Y$^2$ and Y$^3$ are each CH.

In some embodiments, the compound has the structure of Formula (IXa), or a pharmaceutically acceptable salt, or solvate thereof:

Formula (IXa)

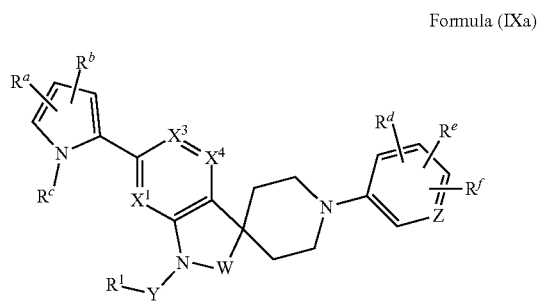

wherein:

R$^c$ is hydrogen, —C(=O)R$^7$, unsubstituted or substituted C$_1$-C$_6$ alkyl, unsubstituted or substituted C$_3$-C$_6$ cycloalkyl, or unsubstituted or substituted C$_2$-C$_7$ heterocycloalkyl; and Z is CH, CR$^d$, CR$^e$, or N.

In some embodiments, Y is absent, —(C=O)—, *—NH—(C=O)—, or —(SO$_2$)—, wherein * indicates the attachment point to R$^1$. In some embodiments, Y is absent or —(C=O)—.

In some embodiments, W is —CH$_2$—, —CH(R$^3$), or —(C=O)—. In some embodiments, W is —CH$_2$— or —(C=O)—.

In some embodiments, Z is CH or N.

In some embodiments, R$^c$ is hydrogen, unsubstituted or substituted C$_1$-C$_6$ alkyl, unsubstituted or substituted C$_3$-C$_6$ cycloalkyl, or unsubstituted or substituted C$_2$-C$_7$ heterocycloalkyl. In some embodiments, R$^c$ is hydrogen or unsubstituted or substituted C$_1$-C$_6$ alkyl. In some embodiments, R$^c$ is hydrogen or C$_1$-C$_6$ alkyl. In some embodiments, R$^c$ is unsubstituted or substituted C$_1$-C$_6$ alkyl. In some embodiments, R$^c$ is C$_1$-C$_6$ alkyl.

In some embodiments, the compound has the structure of Formula (IXb) or (IXc), or a pharmaceutically acceptable salt, or solvate thereof:

Formula (IXb)

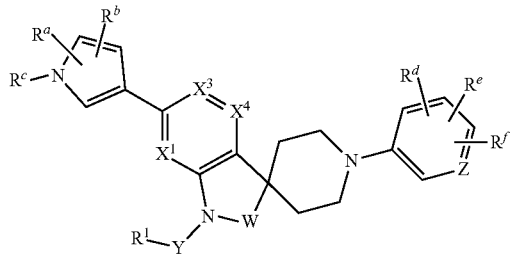

Formula (IXc)

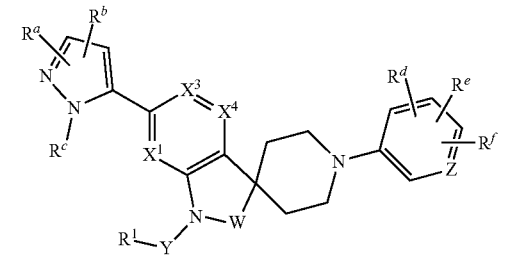

wherein:
R$^c$ is hydrogen, —C(=O)R$^7$, unsubstituted or substituted C$_1$-C$_6$ alkyl, unsubstituted or substituted C$_3$-C$_6$ cycloalkyl, or unsubstituted or substituted C$_2$-C$_7$ heterocycloalkyl; and
Z is CH, CR$^d$, CR$^e$, or N.

In some embodiments, the compound has the structure of Formula (IXb), or a pharmaceutically acceptable salt, or solvate thereof. In some embodiments, the compound has the structure of Formula (IXc), or a pharmaceutically acceptable salt, or solvate thereof.

In some embodiments, Y is absent, —(C=O)—, *—NH—(C=O)—, or —(SO$_2$)—, wherein * indicates the attachment point to R$^1$. In some embodiments, Y is absent or —(C=O)—.

In some embodiments, W is —CH$_2$—, —CH(R$^3$), or —(C=O)—. In some embodiments, W is —CH$_2$— or —(C=O)—.

In some embodiments, Z is CH or N.

In some embodiments, R$^c$ is hydrogen, unsubstituted or substituted C$_1$-C$_6$ alkyl, unsubstituted or substituted C$_3$-C$_6$ cycloalkyl, or unsubstituted or substituted C$_2$-C$_7$ heterocycloalkyl. In some embodiments, R$^c$ is hydrogen or unsubstituted or substituted C$_1$-C$_6$ alkyl. In some embodiments, R$^c$ is hydrogen or C$_1$-C$_6$ alkyl. In some embodiments, R$^c$ is unsubstituted or substituted C$_1$-C$_6$ alkyl. In some embodiments, R$^c$ is C$_1$-C$_6$ alkyl.

In some embodiments, the compound has the structure of Formula (IXd), (IXe), (IXf), or (IXg), or a pharmaceutically acceptable salt, or solvate thereof:

Formula (IXd)

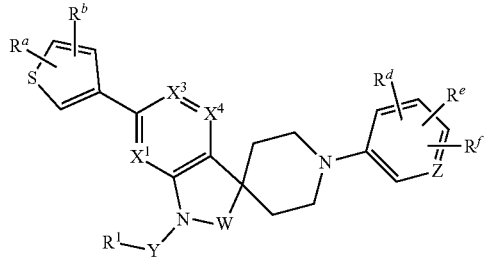

Formula (IXe)

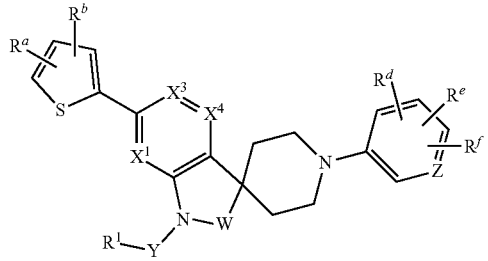

Formula (IXf)

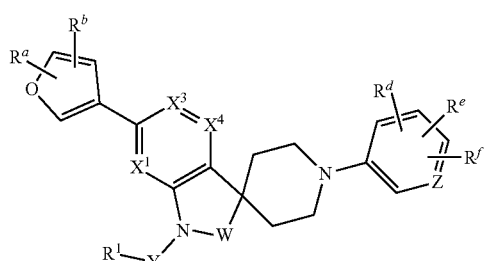

Formula (IXg)

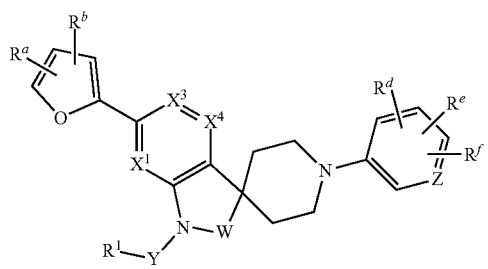

wherein Z is CH, CR$^d$, CR$^e$, or N.

In some embodiments, the compound has the structure of Formula (IXd), or a pharmaceutically acceptable salt, or solvate thereof. In some embodiments, the compound has the structure of Formula (IXe), or a pharmaceutically acceptable salt, or solvate thereof. In some embodiments, the compound has the structure of Formula (IXf), or a pharmaceutically acceptable salt, or solvate thereof. In some embodiments, the compound has the structure of Formula (IXg), or a pharmaceutically acceptable salt, or solvate thereof.

In some embodiments, Y is absent, —(C=O)—, *—NH—(C=O)—, or —(SO$_2$)—, wherein * indicates the attachment point to R$^1$. In some embodiments, Y is absent or —(C=O)—.

In some embodiments, W is —CH$_2$—, —CH(R$^3$), or —(C=O)—. In some embodiments, W is —CH$_2$— or —(C=O)—.

In some embodiments, Z is CH or N.

In some embodiments, the compound has the structure of Formula (X), or a pharmaceutically acceptable salt, or solvate thereof:

Formula (X)

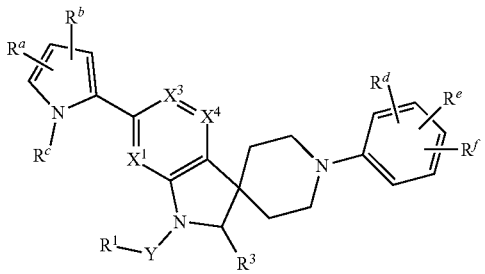

wherein:
R$^c$ is hydrogen, —C(=O)R$^7$, unsubstituted or substituted C$_1$-C$_6$ alkyl, unsubstituted or substituted C$_3$-C$_6$ cycloalkyl, or unsubstituted or substituted C$_2$-C$_7$ heterocycloalkyl.

In some embodiments, Y is absent, —(C=O)—, *—NH—(C=O)—, or —(SO$_2$)—, wherein * indicates the attachment point to R$^1$. In some embodiments, Y is absent or —(C=O)—.

In some embodiments, the compound has the structure of Formula (Xa) or (Xb), or a pharmaceutically acceptable salt, or solvate thereof:

Formula (Xa)

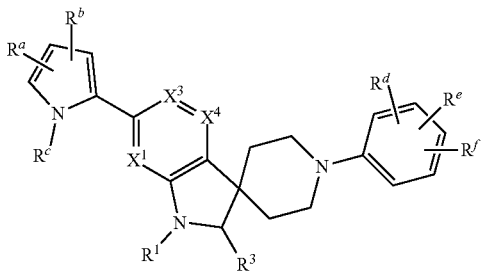

Formula (Xb)

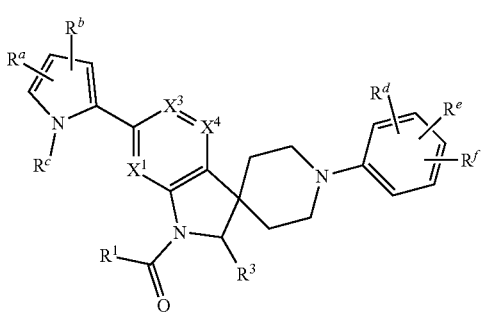

wherein:
R$^c$ is hydrogen, —C(=O)R$^7$, unsubstituted or substituted C$_1$-C$_6$ alkyl, unsubstituted or substituted C$_3$-C$_6$ cycloalkyl, or unsubstituted or substituted C$_2$-C$_7$ heterocycloalkyl.

In some embodiments, the compound has the structure of Formula (Xa), or a pharmaceutically acceptable salt, or solvate thereof. In some embodiments, the compound has the structure of Formula (Xb), or a pharmaceutically acceptable salt, or solvate thereof.

In some embodiments, the compound has the structure of Formula (Xc), or a pharmaceutically acceptable salt, or solvate thereof:

Formula (Xc)

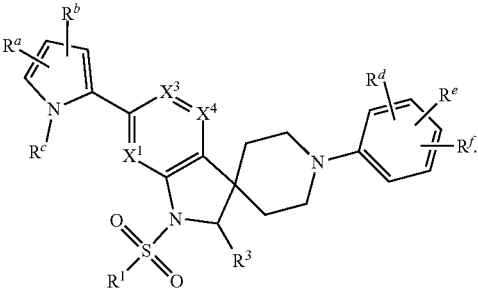

wherein:
R$^c$ is hydrogen, —C(=O)R$^7$, unsubstituted or substituted C$_1$-C$_6$ alkyl, unsubstituted or substituted C$_3$-C$_6$ cycloalkyl, or unsubstituted or substituted C$_2$-C$_7$ heterocycloalkyl.

In some embodiments, the compound has the structure of Formula (Xd), or a pharmaceutically acceptable salt, or solvate thereof:

Formula (Xd)

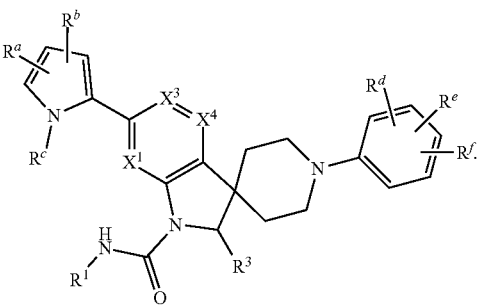

wherein:
R$^c$ is hydrogen, —C(=O)R$^7$, unsubstituted or substituted C$_1$-C$_6$ alkyl, unsubstituted or substituted C$_3$-C$_6$ cycloalkyl, or unsubstituted or substituted C$_2$-C$_7$ heterocycloalkyl.

In some embodiments, the compound has the structure of Formula (XI), or a pharmaceutically acceptable salt, or solvate thereof:

Formula (XI)

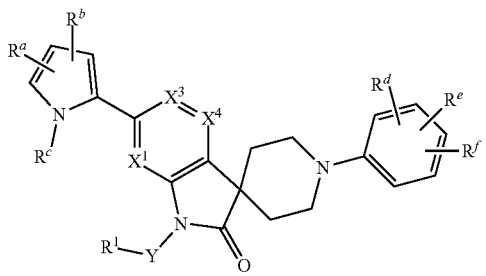

wherein:
$R^c$ is hydrogen, —C(=O)$R^7$, unsubstituted or substituted $C_1$-$C_6$ alkyl, unsubstituted or substituted $C_3$-$C_6$ cycloalkyl, or unsubstituted or substituted $C_2$-$C_7$ heterocycloalkyl.

In some embodiments, Y is absent, —(C=O)—, *—NH—(C=O)—, or —(SO$_2$)—, wherein * indicates the attachment point to $R^1$. In some embodiments, Y is absent or —(C=O)—.

In some embodiments, the compound has the structure of Formula (XIa) or (XIb), or a pharmaceutically acceptable salt, or solvate thereof:

Formula (XIa)

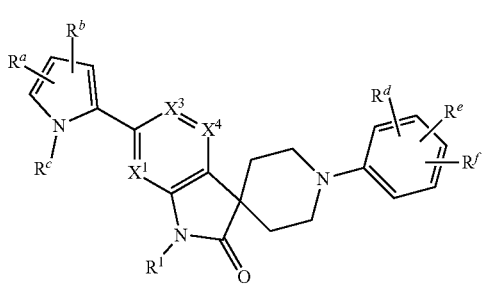

Formula (IXb)

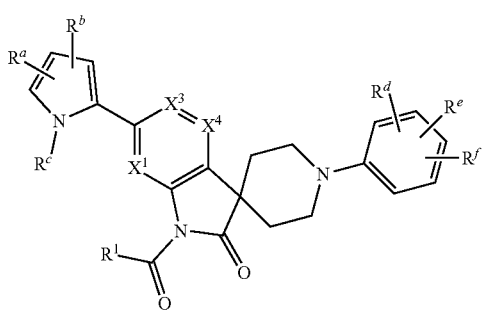

wherein:
$R^c$ is hydrogen, —C(=O)$R^7$, unsubstituted or substituted $C_1$-$C_6$ alkyl, unsubstituted or substituted $C_3$-$C_6$ cycloalkyl, or unsubstituted or substituted $C_2$-$C_7$ heterocycloalkyl.

In some embodiments, the compound has the structure of Formula (XIa), or a pharmaceutically acceptable salt, or solvate thereof. In some embodiments, the compound has the structure of Formula (XIb), or a pharmaceutically acceptable salt, or solvate thereof.

In some embodiments, the compound has the structure of Formula (XIc), or a pharmaceutically acceptable salt, or solvate thereof:

Formula (XIc)

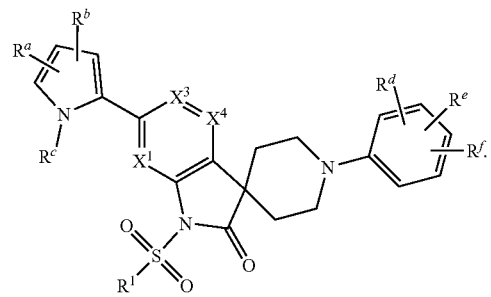

wherein:
$R^c$ is hydrogen, —C(=O)$R^7$, unsubstituted or substituted $C_1$-$C_6$ alkyl, unsubstituted or substituted $C_3$-$C_6$ cycloalkyl, or unsubstituted or substituted $C_2$-$C_7$ heterocycloalkyl.

In some embodiments, the compound has the structure of Formula (XId), or a pharmaceutically acceptable salt, or solvate thereof:

Formula (XId)

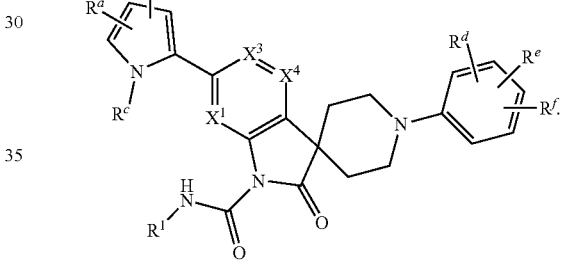

wherein:
$R^c$ is hydrogen, —C(=O)$R^7$, unsubstituted or substituted $C_1$-$C_6$ alkyl, unsubstituted or substituted $C_3$-$C_6$ cycloalkyl, or unsubstituted or substituted $C_2$-$C_7$ heterocycloalkyl.

In some embodiments, $R^B$ is unsubstituted or substituted furanyl, unsubstituted or substituted thienyl, unsubstituted or substituted pyrrolyl, unsubstituted or substituted oxazolyl, unsubstituted or substituted thiazolyl, unsubstituted or substituted imidazolyl, unsubstituted or substituted pyrazolyl, unsubstituted or substituted triazolyl, unsubstituted or substituted tetrazolyl, unsubstituted or substituted isoxazolyl, unsubstituted or substituted isothiazolyl, unsubstituted or substituted oxadiazolyl, or unsubstituted or substituted thiadiazolyl, wherein if $R^B$ is substituted then $R^B$ is substituted with 1, 2, or 3 groups selected from $R^d$, $R^e$, and $R^f$.

In some embodiments, $R^B$ is

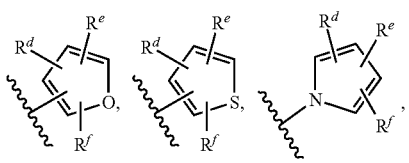

-continued

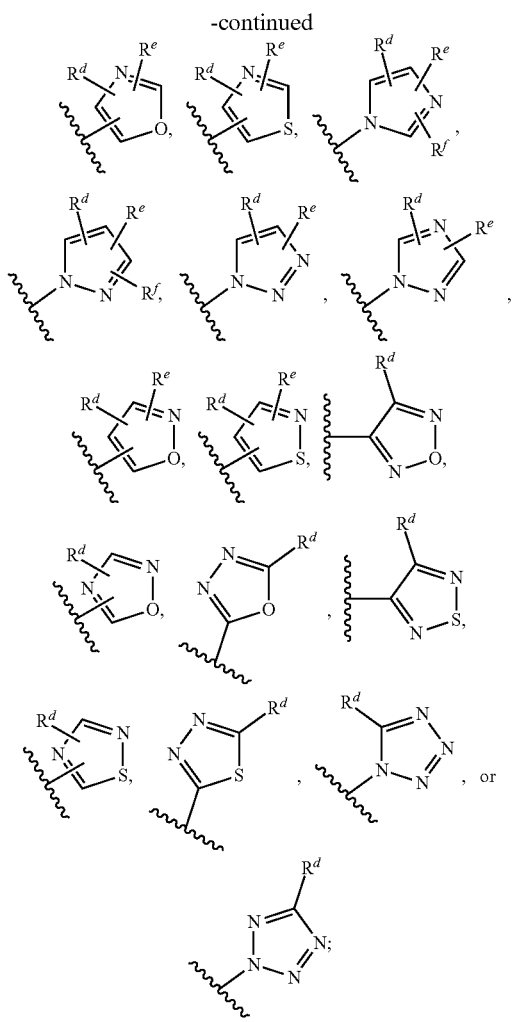

or $R^B$ is

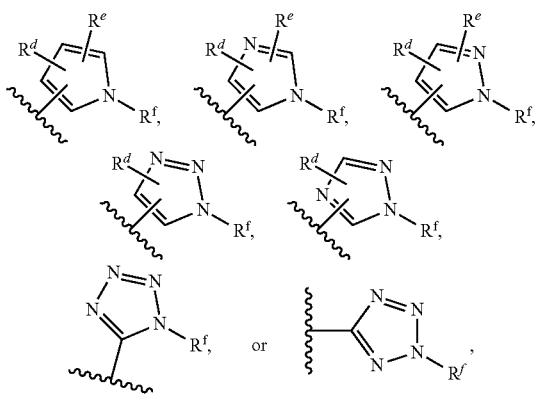

where $R^f$ is hydrogen, —C(=O)$R^7$, unsubstituted or substituted $C_1$-$C_6$ alkyl, unsubstituted or substituted $C_3$-$C_6$ cycloalkyl, or unsubstituted or substituted $C_2$-$C_7$ heterocycloalkyl.

In some embodiments, $R^1$ is unsubstituted or substituted $C_1$-$C_6$ alkyl, unsubstituted or substituted $C_1$-$C_6$ fluoroalkyl, unsubstituted or substituted $C_1$-$C_6$ heteroalkyl, unsubstituted or substituted $C_3$-$C_6$ cycloalkyl, unsubstituted or substituted $C_2$-$C_7$ heterocycloalkyl, unsubstituted or substituted —($C_1$-$C_6$ alkyl)-($C_3$-$C_6$ cycloalkyl), or unsubstituted or substituted —($C_1$-$C_6$ alkyl)-($C_2$-$C_7$ heterocycloalkyl), wherein any substituted group of $R^1$ is substituted with one or more halogen, unsubstituted or substituted $C_1$-$C_6$ alkyl, unsubstituted or substituted monocyclic heterocycle, —N($R^4$)$_2$, —O$R^5$, —CN, —CO$_2R^5$, —C(=O)N($R^4$)$_2$, —S$R^5$, —S(=O)$R^7$, —S(=O)$_2R^7$, —N$R^4$C(=O)$R^5$, —N$R^4$SO$_2R^7$, —SO$_2R^7$, or —SO$_2$N($R^4$)$_2$; wherein $R^1$ comprises a basic amine group.

In some embodiments, $R^1$ is unsubstituted or substituted $C_1$-$C_6$ alkyl, unsubstituted or substituted $C_1$-$C_6$ heteroalkyl containing 1 N atom, unsubstituted or substituted monocyclic 4-, 5- or 6-membered heterocycloalkyl containing 1-4 N atoms and 0 or 1 O or S atoms, unsubstituted or substituted bridged $C_2$-$C_7$ heterocycloalkyl containing 1-2 N atoms, or unsubstituted or substituted —($C_1$-$C_6$ alkyl)-($C_2$-$C_7$ heterocycloalkyl), wherein any substituted group of $R^1$ is substituted with one or more halogen, unsubstituted or substituted $C_1$-$C_6$ alkyl, unsubstituted or substituted monocyclic heterocycle, —N($R^4$)$_2$, —O$R^5$, —CN, —CO$_2R^5$, —C(=O)N($R^4$)$_2$, —S$R^5$, —S(=O)$R^7$, —S(=O)$_2R^7$, —N$R^4$C(=O)$R^5$, —N$R^4$SO$_2R^7$, —SO$_2R^7$, or —SO$_2$N($R^4$)$_2$.

In some embodiments, $R^1$ is unsubstituted or substituted $C_1$-$C_6$ alkyl, unsubstituted or substituted $C_1$-$C_6$ heteroalkyl containing 1 N atom, wherein any substituted group of $R^1$ is substituted with one or more halogen, unsubstituted or substituted $C_1$-$C_6$ alkyl, unsubstituted or substituted monocyclic heterocycle, —N($R^4$)$_2$, —O$R^5$, —CN, —CO$_2R^5$, —C(=O)N($R^4$)$_2$, —S$R^5$, —S(=O)$R^7$, —S(=O)$_2R^7$, —N$R^4$C(=O)$R^5$, —N$R^4$SO$_2R^7$, —SO$_2R^7$, or —SO$_2$N($R^4$)$_2$; or $R^1$ is unsubstituted or substituted monocyclic 4-, 5- or 6-membered heterocycle containing 1-4 N atoms and 0 or 1 O or S atoms; or $R^1$ is unsubstituted or substituted bridged $C_2$-$C_7$ heterocycloalkyl containing 1-2 N atoms; or $R^1$ is unsubstituted or substituted —($C_1$-$C_6$ alkyl)-($C_2$-$C_7$ heterocycloalkyl), wherein the heterocycloalkyl is an unsubstituted or substituted monocyclic 4-, 5- or 6-membered heterocycloalkyl containing 1-4 N atoms and 0 or 1 O or S atoms.

In some embodiments, $R^1$ is unsubstituted or substituted $C_1$-$C_6$ heteroalkyl containing 1 N atom; or $R^1$ is unsubstituted or substituted monocyclic 4-, 5- or 6-membered heterocycle containing 1-4 N atoms and 0 or 1 O or S atoms; or $R^1$ is unsubstituted or substituted —($C_1$-$C_6$ alkyl)-($C_2$-$C_7$ heterocycloalkyl), wherein the heterocycloalkyl is an unsubstituted or substituted monocyclic 4-, 5- or 6-membered heterocycloalkyl containing 1-4 N atoms and 0 or 1 O or S atoms.

In some embodiments, $R^1$ is unsubstituted or substituted $C_1$-$C_6$ alkyl, unsubstituted or substituted $C_1$-$C_6$ heteroalkyl containing 1 N atom, wherein any substituted group of $R^1$ is substituted with one or more halogen, unsubstituted or substituted $C_1$-$C_6$ alkyl, unsubstituted or substituted monocyclic heterocycle, —N($R^4$)$_2$, —O$R^5$, —CN, —CO$_2R^5$, —C(=O)N($R^4$)$_2$, —S$R^5$, —S(=O)$R^7$, —S(=O)$_2R^7$, —N$R^4$C(=O)$R^5$, —N$R^4$SO$_2R^7$, —SO$_2R^7$, or —SO$_2$N($R^4$)$_2$.

In some embodiments, $R^1$ is unsubstituted or substituted $C_1$-$C_6$ heteroalkyl containing 1 N atom. In some embodiments, $R^1$ is unsubstituted or substituted $C_1$-$C_6$ heteroalkyl containing 1 N atom; wherein any substituted group of $R^1$ is substituted with one or more halogen, unsubstituted or substituted $C_1$-$C_6$ alkyl, unsubstituted or substituted monocyclic heterocycle, —N($R^4$)$_2$, —O$R^5$, —CN, —CO$_2R^5$, —C(=O)N($R^4$)$_2$, —S$R^5$, —S(=O)$R^7$, —S(=O)$_2R^7$, —N$R^4$C(=O)$R^5$, —N$R^4$SO$_2R^7$, —SO$_2R^7$, or —SO$_2$N($R^4$)$_2$.

In some embodiments, $R^1$ is unsubstituted or substituted monocyclic 4-, 5- or 6-membered heterocycle containing 1-4 N atoms and 0 or 1 O or S atoms.

In some embodiments, $R^1$ is unsubstituted or substituted bridged $C_2$-$C_7$ heterocycloalkyl containing 1-2 N atoms.

In some embodiments, $R^1$ is unsubstituted or substituted —($C_1$-$C_6$ alkyl)-($C_2$-$C_7$ heterocycloalkyl), wherein the heterocycloalkyl is an unsubstituted or substituted monocyclic 4-, 5- or 6-membered heterocycloalkyl containing 1-4 N atoms and 0 or 1 O or S atoms.

In some embodiments, $R^1$ is unsubstituted or substituted $C_1$-$C_6$ heteroalkyl containing 1 N atom, wherein any substituted group of $R^1$ is substituted with one or more halogen, $C_1$-$C_4$ alkyl, —$N(R^4)_2$, or —$OR^5$; or $R^1$ is unsubstituted or substituted azetidinyl, unsubstituted or substituted pyrrolidinyl, or unsubstituted or substituted piperidinyl; or $R^1$ is unsubstituted or substituted —($C_1$-$C_6$ alkyl)-($C_2$-$C_7$ heterocycloalkyl), wherein the heterocycloalkyl is an unsubstituted or substituted azetidinyl, unsubstituted or substituted pyrrolidinyl, or unsubstituted or substituted piperidinyl.

In some embodiments, $R^1$ is unsubstituted or substituted azetidinyl, unsubstituted or substituted pyrrolidinyl, or unsubstituted or substituted piperidinyl.

In some embodiments, $R^1$ is unsubstituted or substituted $C_1$-$C_6$ heteroalkyl containing 1 N atom, wherein any substituted group of $R^1$ is substituted with one or more halogen, $C_1$-$C_4$ alkyl, —$N(R^4)_2$, or —$OR^5$.

In some embodiments, the compound has the structure of Formula (XIIa), (XIIb), (XIIc), or (XIId), or a pharmaceutically acceptable salt, or solvate thereof:

Formula (XIIa)
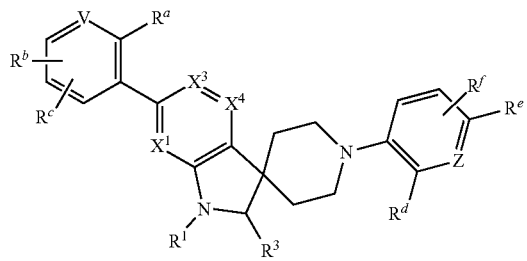

Formula (XIIb)
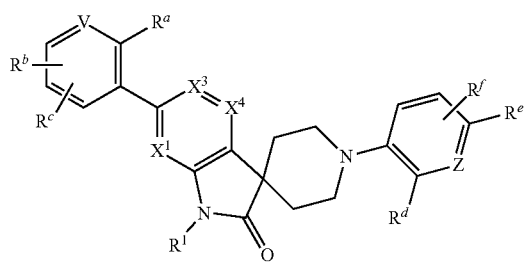

Formula (XIIc)
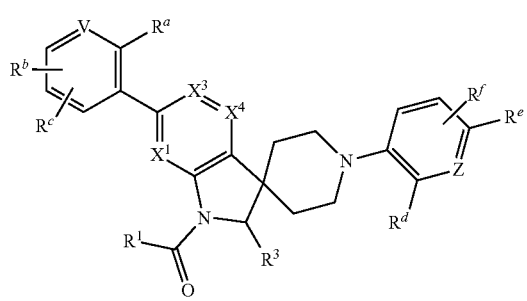

Formula (XIId)
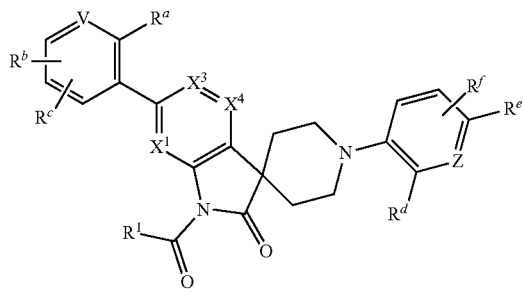

wherein V is CH, $CR^a$, $CR^b$, or N; and Z is CH, $CR^d$, $CR^e$, or N.

In some embodiments, the compound has the structure of Formula (XIIa), or a pharmaceutically acceptable salt, or solvate thereof. In some embodiments, the compound has the structure of Formula (XIIb), or a pharmaceutically acceptable salt, or solvate thereof. In some embodiments, the compound has the structure of Formula (XIIc), or a pharmaceutically acceptable salt, or solvate thereof. In some embodiments, the compound has the structure of Formula (XIId), or a pharmaceutically acceptable salt, or solvate thereof.

In some embodiments, V is CH or N. In some embodiments, Z is CH or N. In some embodiments, V is CH or N; and Z is CH or N.

In some embodiments, the compound has the structure of Formula (XIIIa), (XIIIb), (XIIIc), or (XIIId), or a pharmaceutically acceptable salt, or solvate thereof:

Formula (XIIIa)
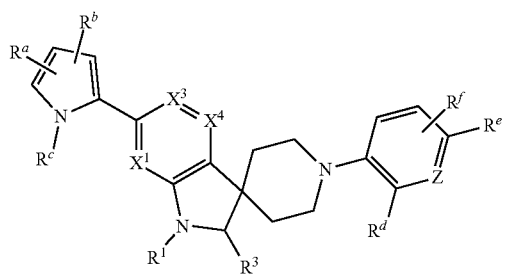

Formula (XIIIb)
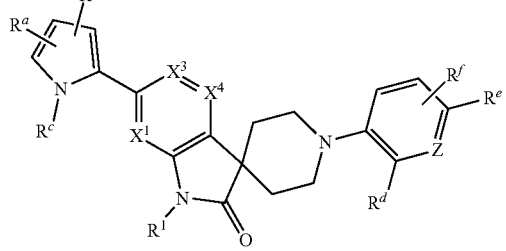

-continued

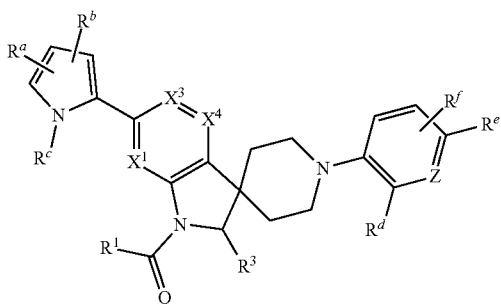

Formula (XIIIc)

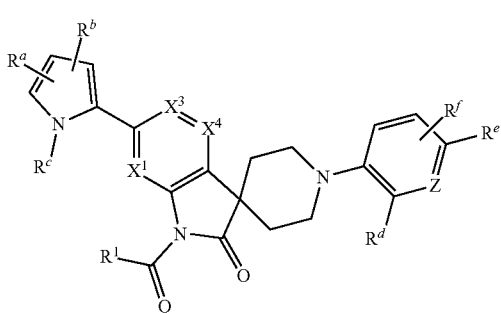

Formula (XIIId)

wherein Z is CH, CR$^d$, CR$^e$, or N.

In some embodiments, the compound has the structure of Formula (XIIIa), or a pharmaceutically acceptable salt, or solvate thereof. In some embodiments, the compound has the structure of Formula (XIIIb), or a pharmaceutically acceptable salt, or solvate thereof. In some embodiments, the compound has the structure of Formula (XIIIc), or a pharmaceutically acceptable salt, or solvate thereof. In some embodiments, the compound has the structure of Formula (XIIId), or a pharmaceutically acceptable salt, or solvate thereof.

In some embodiments, Z is CH or N.

In some embodiments, the compound has the structure of Formula (XIV), or a pharmaceutically acceptable salt, or solvate thereof:

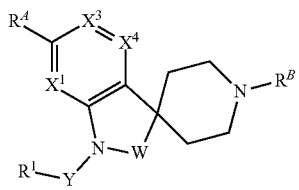

(Formula (XIV))

wherein:
R$^A$ is unsubstituted or substituted phenyl or unsubstituted or substituted pyridinyl, wherein if R$^A$ is substituted then R$^A$ is substituted with R$^a$, R$^b$, and R$^c$;
R$^B$ is unsubstituted or substituted phenyl or unsubstituted or substituted pyridinyl, wherein if R$^B$ is substituted then R$^B$ is substituted with R$^d$, R$^e$, and R$^f$;
W is —C(R$^3$)$_2$— or —C(=O)—; and
Y is absent, —(C=O)—, —(C=O)NR$^2$—*, or —(SO$_2$)—; wherein * indicates the attachment point to R$^1$.

In some embodiments, X$^1$ is CR$^{11}$; X$^3$ is CR$^{13}$; and X$^4$ is CR$^{14}$. In some embodiments, X$^1$ is N; X$^3$ is CR$^{13}$; and X$^4$ is CR$^{14}$. In some embodiments, X$^1$ is CR$^{11}$; X$^3$ is N; and X$^4$ is CR$^{14}$. In some embodiments, X$^1$ is N; X$^3$ is CR$^{13}$; and X$^4$ is N. In some embodiments, X$^1$ is N; X$^3$ is N; and X$^4$ is CR$^{14}$.

In some embodiments, X$^1$ is CR$^{11}$ or N; X$^3$ is CR$^{13}$; and X$^4$ is CR$^{14}$.

In some embodiments, R$^{11}$, R$^{13}$, and R$^{14}$ are each independently hydrogen, halogen, unsubstituted or substituted C$_1$-C$_6$ alkyl, unsubstituted or substituted C$_1$-C$_6$ fluoroalkyl, unsubstituted or substituted C$_3$-C$_6$cycloalkyl, —CN, or —OR$^4$. In some embodiments, R$^{11}$, R$^{13}$, and R$^{14}$ are each independently hydrogen, halogen, C$_1$-C$_6$ alkyl, fluoroalkyl, unsubstituted C$_3$-C$_6$cycloalkyl, —CN, or —OR$^4$. In some embodiments, R$^{11}$, R$^{13}$, and R$^{14}$ are each independently hydrogen, F, Cl, Br, —CN, —OCH$_3$, —OCH$_2$CH$_3$, —CH$_3$, —CH$_2$CH$_3$, —CH$_2$CH$_2$CH$_3$, —CH(CH$_3$)$_2$, —CH$_2$CH$_2$CH$_2$CH$_3$, —CH$_2$CH(CH$_3$)$_2$, —CH(CH$_3$)CH$_2$CH$_3$, —C(CH$_3$)$_3$, —CH$_2$F, —CHF$_2$, —CF$_3$, or cyclopropyl. In some embodiments, R$^{11}$, R$^{13}$, and R$^{14}$ are each independently hydrogen or F.

In some embodiments, X$^1$ is CH or CF; X$^3$ is CH or CF; and X$^4$ is CH or CF. In some embodiments, X$^1$ is N; X$^3$ is CH or CF; and X$^4$ is CH or CF. In some embodiments, X$^1$ is CH or CF; X$^3$ is N; and X$^4$ is CH or CF. In some embodiments, X$^1$ is N; X$^3$ is CH or CF; and X$^4$ is N. In some embodiments, X$^1$ is N; X$^3$ is N; and X$^4$ is CH or CF.

In some embodiments, X$^1$ is CH, CF or N; X$^3$ is CH or CF; and X$^4$ is CH or CF.

In some embodiments, X$^1$ is CH, CF or N; X$^3$ is CH; and X$^4$ is CH. In some embodiments, X$^1$ is CH or N; X$^3$ is CH; and X$^4$ is CH.

In some embodiments, the compound has the structure of Formula (XV), or a pharmaceutically acceptable salt, or solvate thereof:

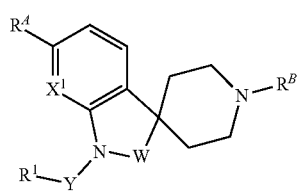

(Formula (XV))

wherein,
R$^A$ is unsubstituted or substituted 5- or 6-membered heteroaryl containing 1 or 2 N atoms or unsubstituted or substituted phenyl, wherein if R$^A$ is substituted then R$^A$ is substituted with 1 or 2 groups selected from R$^a$, R$^b$, and R$^c$;
R$^a$ is selected from the group consisting of hydrogen, halogen, —OR$^4$, —CN, —N(R$^4$)$_2$, —C(=O)R$^7$, unsubstituted or substituted C$_1$-C$_6$ alkyl, unsubstituted or substituted C$_1$-C$_6$ fluoroalkyl, unsubstituted or substituted C$_1$-C$_6$ heteroalkyl, and unsubstituted or substituted C$_3$-C$_6$ cycloalkyl, wherein any substituted group of R$^a$ is substituted with one or more R$^6$ groups; and
R$^b$ and R$^c$ are independently selected from the group consisting of hydrogen, halogen, —OR$^4$, —CN, —N(R$^4$)$_2$, —C(=O)R$^7$, unsubstituted or substituted C$_1$-C$_6$ alkyl, unsubstituted or substituted C$_1$-C$_6$ fluoroalkyl, and unsubstituted or substituted C$_1$-C$_6$ heteroalkyl, wherein any substituted group of R$^b$ and R$^c$ is substituted with one or more R$^6$ groups;
wherein, if R$^a$, R$^b$, or R$^c$ is attached to the N atom of a heteroaryl, then it is hydrogen, —C(=O)R$^7$, or unsubstituted or substituted C$_1$-C$_6$ alkyl;

$R^B$ is unsubstituted or substituted phenyl or unsubstituted or substituted 5- or 6-membered heteroaryl containing 1 or 2 N atoms, wherein if $R^B$ is substituted then $R^B$ is substituted with 1, 2, or 3 groups selected from $R^d$, $R^e$, and $R^f$;

$R^d$ is selected from the group consisting of hydrogen, halogen, —$OR^4$, —CN, —$N(R^4)_2$, unsubstituted or substituted $C_1$-$C_6$ alkyl, unsubstituted or substituted $C_1$-$C_6$ fluoroalkyl, unsubstituted or substituted $C_1$-$C_6$ heteroalkyl, unsubstituted or substituted $C_3$-$C_6$ cycloalkyl, unsubstituted or substituted $C_2$-$C_7$ heterocycloalkyl, unsubstituted or substituted phenyl, unsubstituted or substituted monocyclic heteroaryl, and unsubstituted or substituted bicyclic heteroaryl, wherein any substituted group of $R^d$ is substituted with one or more $R^6$ groups; and $R^e$ and $R^f$ are independently selected from the group consisting of hydrogen, halogen, —$OR^4$, —CN, —$N(R^4)_2$, unsubstituted or substituted $C_1$-$C_6$ alkyl, unsubstituted or substituted $C_1$-$C_6$ fluoroalkyl, and unsubstituted or substituted $C_1$-$C_6$ heteroalkyl;

wherein, if $R^d$, $R^e$, or $R^f$ is attached to the N atom of a heteroaryl, then it is hydrogen, —C(=O)$R^7$, or unsubstituted or substituted $C_1$-$C_6$ alkyl;

$X^1$ is $CR^{11}$ or N;

$R^{11}$ is hydrogen, halogen, $C_1$-$C_6$ alkyl, $C_1$-$C_6$ fluoroalkyl, or $C_1$-$C_6$ heteroalkyl, —CN, —$OR^4$, or —$N(R^4)_2$;

W is —$C(R^3)_2$— or —C(=O)—;

Y is absent, —(C=O)—, *—$NR^2$—(C=O)—, or —($SO_2$)—; wherein * indicates the attachment point to $R^1$; and $R^1$ is unsubstituted or substituted $C_1$-$C_6$ alkyl, unsubstituted or substituted $C_1$-$C_6$ heteroalkyl containing 1 N atom, wherein any substituted group of $R^1$ is substituted with one or more halogen, unsubstituted or substituted $C_1$-$C_6$ alkyl, unsubstituted or substituted monocyclic heterocycle, —$N(R^4)_2$, —$OR^5$, —CN, —$CO_2R^5$, —C(=O)$N(R^4)_2$, —$SR^5$, —S(=O)$R^7$, —S(=O)$_2R^7$, —$NR^4$C(=O)$R^5$, —$NR^4SO_2R^7$, —$SO_2R^7$, or —$SO_2N(R^4)_2$;

or $R^1$ is unsubstituted or substituted monocyclic 4-, 5- or 6-membered heterocycle containing 1-4 N atoms and 0 or 1 O or S atoms;

or $R^1$ is unsubstituted or substituted bridged $C_2$-$C_7$ heterocycloalkyl containing 1-2 N atoms;

or $R^1$ is unsubstituted or substituted —($C_1$-$C_6$ alkyl)-($C_2$-$C_7$ heterocycloalkyl), wherein the heterocycloalkyl is an unsubstituted or substituted monocyclic 4-, 5- or 6-membered heterocycloalkyl containing 1-2 N atoms.

In some embodiments, $R^A$ is unsubstituted or substituted pyrrolyl, unsubstituted or substituted pyridinyl, or unsubstituted or substituted phenyl, wherein if $R^A$ is substituted then $R^A$ is substituted with 1 or 2 groups selected from $R^a$, $R^b$, and $R^c$;

wherein, if $R^a$, $R^b$, or $R^c$ is attached to the N atom of a heteroaryl, then it is hydrogen, —C(=O)$R^7$, or unsubstituted or substituted $C_1$-$C_6$ alkyl;

$R^B$ is unsubstituted or substituted phenyl or unsubstituted or substituted pyridinyl, wherein if $R^B$ is substituted then $R^B$ is substituted with 1, 2, or 3 groups selected from $R^d$, $R^e$, and $R^f$;

$X^1$ is $CR^{11}$ or N;

$R^{11}$ is hydrogen, F, Cl, —$CH_3$, $CF_3$, —CN, —$OR^4$, or —$N(R^4)_2$; and $R^1$ is unsubstituted or substituted $C_1$-$C_6$ heteroalkyl containing 1 N atom, wherein any substituted group of $R^1$ is substituted with one or more halogen, $C_1$-$C_4$ alkyl, —$N(R^4)_2$, or —$OR^5$;

or $R^1$ is unsubstituted or substituted azetidinyl, unsubstituted or substituted pyrrolidinyl, or unsubstituted or substituted piperidinyl;

or $R^1$ is unsubstituted or substituted bridged $C_2$-$C_7$ heterocycloalkyl containing 1-2 N atoms;

or $R^1$ is unsubstituted or substituted —($C_1$-$C_6$ alkyl)-($C_2$-$C_7$ heterocycloalkyl), wherein the heterocycloalkyl is an unsubstituted or substituted monocyclic 4-, 5- or 6-membered heterocycloalkyl containing 1-2 N atoms.

In some embodiments, Y is absent or —(C=O)—.

In some embodiments, W is —$CH_2$—, —$CH(R^3)$, or —(C=O)—. In some embodiments, W is —$CH_2$— or —(C=O)—.

In some embodiments, $R^A$ is

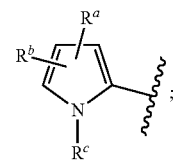

or $R^A$ is

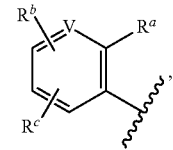

where V is CH or N; and $R^B$ is

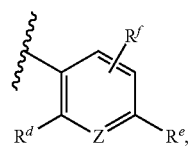

where Z is CH or N.

In some embodiments, $R^A$ is

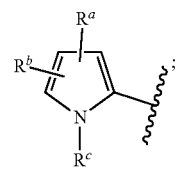

and $R^B$ is

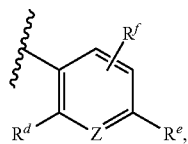

where Z is CH or N.

In some embodiments, $R^A$ is

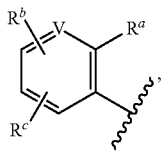

where V is CH or N; and $R^B$ is

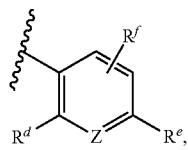

where Z is CH or N.

In some embodiments, the compound has the structure of Formula (XVIa) or (XVIb), or a pharmaceutically acceptable salt, or solvate thereof:

Formula (XVIa)

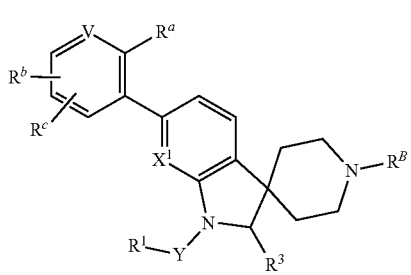

Formula (XVIb)

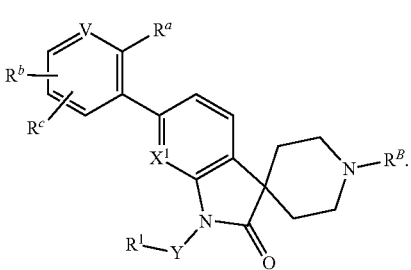

In some embodiments, the compound has the structure of Formula (XVIa), or a pharmaceutically acceptable salt, or solvate thereof. In some embodiments, the compound has the structure of Formula (XVIb), or a pharmaceutically acceptable salt, or solvate thereof.

In some embodiments, $R^a$ is selected from the group consisting of hydrogen, halogen, —$OR^4$, —CN, unsubstituted or substituted $C_1$-$C_6$ alkyl, unsubstituted or substituted $C_1$-$C_6$ fluoroalkyl, and unsubstituted or substituted $C_3$-$C_6$ cycloalkyl; $R^b$ and $R^c$ are independently selected from the group consisting of hydrogen, halogen, —$OR^4$, —CN, unsubstituted or substituted $C_1$-$C_6$ alkyl, and unsubstituted or substituted $C_1$-$C_6$ fluoroalkyl; and V is CH or N.

In some embodiments, $R^a$ is selected from the group consisting of hydrogen, F, Cl, Br, —CN, —$OCH_3$, —$OCH_2CH_3$, —$CH_3$, —$CH_2CH_3$, —$CH_2CH_2CH_3$, —$CH(CH_3)_2$, —$CH_2CH_2CH_2CH_3$, —$CH_2CH(CH_3)_2$, —$CH(CH_3)(CH_2CH_3)$, —$C(CH_3)_3$, —$CH_2F$, —$CHF_2$, and —$CF_3$; $R^b$ and $R^c$ are independently selected from the group consisting of hydrogen, F, Cl, —$CH_3$, —$CH_2F$, —$CHF_2$, —$CF_3$, —CN, and —$OCH_3$.

In some embodiments, the compound has the structure of Formula (XVIc) or (XVId), or a pharmaceutically acceptable salt, or solvate thereof:

Formula (XVIc)

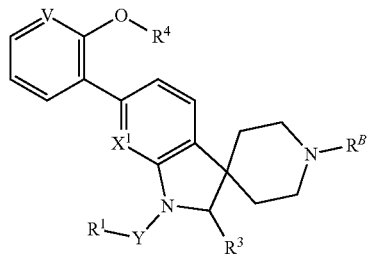

Formula (XVId)

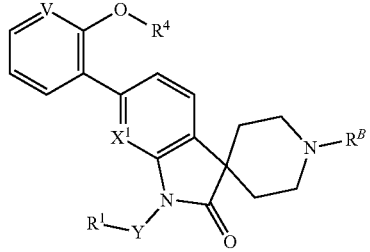

wherein V is CH or N.

In some embodiments, the compound has the structure of Formula (XVIc), or a pharmaceutically acceptable salt, or solvate thereof. In some embodiments, the compound has the structure of Formula (XVId), or a pharmaceutically acceptable salt, or solvate thereof.

In some embodiments, $X^1$ is N. In some embodiments, $X^1$ is CH.

In some embodiments, Y is absent, —(C=O)—, *—$NR^2$—(C=O)—, or —($SO_2$)—; wherein * indicates the attachment point to $R^1$. In some embodiments, Y is absent or —(C=O)—.

In some embodiments, the compound has the structure of Formula (XVIIa) or (XVIIb), or a pharmaceutically acceptable salt, or solvate thereof:

Formula (XVIIa)

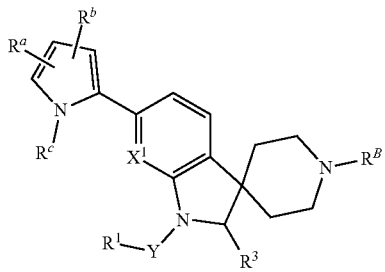

Formula (XVIIb)

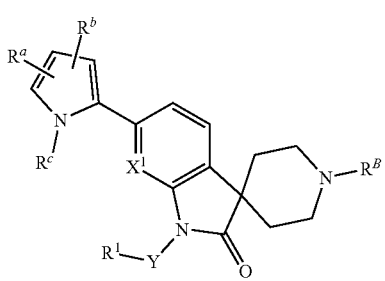

wherein:

$R^c$ is hydrogen, —C(=O)$R^7$, unsubstituted or substituted $C_1$-$C_6$ alkyl, unsubstituted or substituted $C_3$-$C_6$ cycloalkyl, or unsubstituted or substituted $C_2$-$C_7$ heterocycloalkyl In some embodiments, the compound has the structure of Formula (XVIIa), or a pharmaceutically acceptable salt, or solvate thereof. In some embodiments, the compound has the structure of Formula (XVIIb), or a pharmaceutically acceptable salt, or solvate thereof.

In some embodiments, $R^a$ and $R^b$ are independently selected from the group consisting of hydrogen, halogen, —O$R^4$, —CN, unsubstituted or substituted $C_1$-$C_6$ alkyl, unsubstituted or substituted $C_1$-$C_6$ fluoroalkyl, and unsubstituted or substituted $C_3$-$C_6$ cycloalkyl.

In some embodiments, $R^a$ and $R^b$ are independently selected from the group consisting of hydrogen, F, Cl, Br, —CN, —OCH$_3$, —OCH$_2$CH$_3$, —CH$_3$, —CH$_2$CH$_3$, —CH$_2$CH$_2$CH$_3$, —CH(CH$_3$)$_2$, —CH$_2$CH$_2$CH$_2$CH$_3$, —CH$_2$CH(CH$_3$)$_2$, —CH(CH$_3$)(CH$_2$CH$_3$), —C(CH$_3$)$_3$, —CH$_2$F, —CHF$_2$, —CF$_3$, and cyclopropyl; $R^c$ is hydrogen, —C(=O)$R^7$, unsubstituted or substituted $C_1$-$C_6$ alkyl, unsubstituted or substituted $C_3$-$C_6$ cycloalkyl.

In some embodiments, the compound has the structure of Formula (XVIIc) or (XVIId), or a pharmaceutically acceptable salt, or solvate thereof:

Formula (XVIIc)

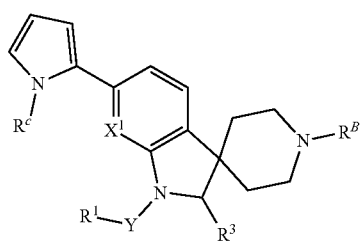

Formula (XVIId)

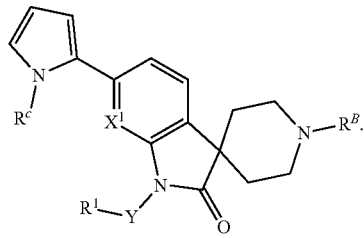

In some embodiments, the compound has the structure of Formula (XVIIc), or a pharmaceutically acceptable salt, or solvate thereof. In some embodiments, the compound has the structure of Formula (XVIId), or a pharmaceutically acceptable salt, or solvate thereof.

In some embodiments, $R^c$ is hydrogen, —CH$_3$, —CH$_2$CH$_3$, —CH$_2$CH$_2$CH$_3$, —CH(CH$_3$)$_2$, —CH$_2$CH$_2$CH$_2$CH$_3$, —CH$_2$CH(CH$_3$)$_2$, —CH(CH$_3$)(CH$_2$CH$_3$), —C(CH$_3$)$_3$, —CH$_2$CH$_2$CH(CH$_3$)$_2$, or unsubstituted $C_3$-$C_6$ cycloalkyl.

In some embodiments, $X^1$ is N. In some embodiments, $X^1$ is CH.

In some embodiments, Y is absent, —(C=O)—, *—NR$^2$—(C=O)—, or —(SO$_2$)—; wherein * indicates the attachment point to $R^1$. In some embodiments, Y is absent or —(C=O)—.

In some embodiments, the compound has the structure of Formula (XVIIIa) or (XVIIIb), or a pharmaceutically acceptable salt, or solvate thereof:

Formula (XVIIIa)

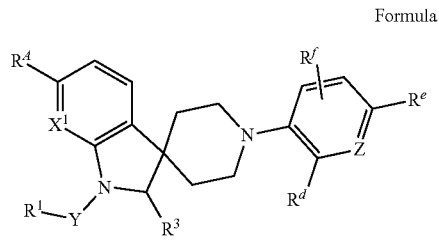

Formula (XVIIIb)

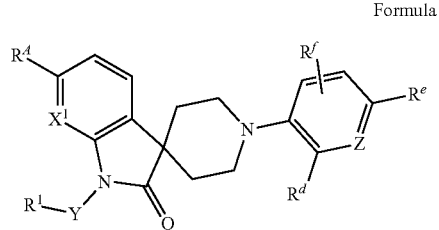

wherein Z is CH or N.

In some embodiments, the compound has the structure of Formula (XVIIIa), or a pharmaceutically acceptable salt, or solvate thereof. In some embodiments, the compound has the structure of Formula (XVIIIb), or a pharmaceutically acceptable salt, or solvate thereof.

In some embodiments, $R^d$ is selected from the group consisting of hydrogen, halogen, —O$R^4$, —CN, unsubstituted or substituted $C_1$-$C_6$ alkyl, unsubstituted or substituted $C_1$-$C_6$ fluoroalkyl, and unsubstituted or substituted $C_3$-$C_6$ cycloalkyl; and $R^e$ and $R^f$ are independently selected from the group consisting of hydrogen, halogen, —O$R^4$, —CN, unsubstituted or substituted $C_1$-$C_6$ alkyl, and unsubstituted or substituted $C_1$-$C_6$ fluoroalkyl.

In some embodiments, $R^d$ is selected from the group consisting of hydrogen, F, Cl, Br, —CN, —OCH$_3$, —OCH$_2$CH$_3$, —CH$_3$, —CH$_2$CH$_3$, —CH$_2$CH$_2$CH$_3$, —CH (CH$_3$)$_2$, —CH$_2$CH$_2$CH$_2$CH$_3$, —CH$_2$CH(CH$_3$)$_2$, —CH(CH$_3$)(CH$_2$CH$_3$), —C(CH$_3$)$_3$, —CH$_2$F, —CHF$_2$, and —CF$_3$; and $R^e$ and $R^f$ are independently selected from the group consisting of hydrogen, F, Cl, Br, —CH$_3$, —CH$_2$F, —CHF$_2$, —CF$_3$, —CN, —OH, and —OCH$_3$.

In some embodiments, the compound has the structure of Formula (XVIIIc) or (XVIIId), or a pharmaceutically acceptable salt, or solvate thereof.

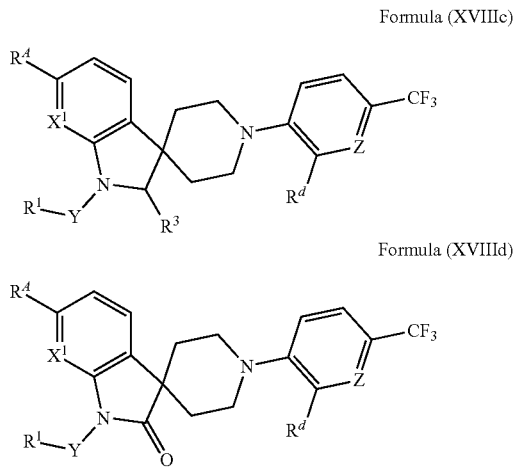

Formula (XVIIIc)

Formula (XVIIId)

wherein Z is CH or N.

In some embodiments, the compound has the structure of Formula (XVIIIc), or a pharmaceutically acceptable salt, or solvate thereof. In some embodiments, the compound has the structure of Formula (XVIIId), or a pharmaceutically acceptable salt, or solvate thereof.

In some embodiments $R^d$ is selected from the group consisting of F, Cl, —CN, —OCH$_3$, —CH$_3$, —CH$_2$F, —CHF$_2$, and —CF$_3$.

In some embodiments, $X^1$ is N. In some embodiments, $X^1$ is CH.

In some embodiments, Y is absent, —(C=O)—, *—NR$^2$—(C=O)—, or —(SO$_2$)—; wherein * indicates the attachment point to $R^1$. In some embodiments, Y is absent or —(C=O)—.

In some embodiments, $R^1$ is unsubstituted or substituted C$_1$-C$_6$ heteroalkyl containing 1 N atom, wherein any substituted group of $R^1$ is substituted with one or more halogen, C$_1$-C$_4$ alkyl, —N(R$^4$)$_2$, or —OR$^5$; or $R^1$ is unsubstituted or substituted azetidinyl, unsubstituted or substituted pyrrolidinyl, or unsubstituted or substituted piperidinyl; or $R^1$ is unsubstituted or substituted —(C$_1$-C$_6$ alkyl)-(C$_2$-C$_7$ heterocycloalkyl), wherein the heterocycloalkyl is an unsubstituted or substituted azetidinyl, unsubstituted or substituted pyrrolidinyl, or unsubstituted or substituted piperidinyl.

In some embodiments, $R^1$ is unsubstituted or substituted azetidinyl, unsubstituted or substituted pyrrolidinyl, or unsubstituted or substituted piperidinyl.

In some embodiments, $R^1$ is unsubstituted or substituted C$_1$-C$_6$ heteroalkyl containing 1 N atom, wherein any substituted group of $R^1$ is substituted with one or more halogen, C$_1$-C$_4$ alkyl, —N(R$^4$)$_2$, or —OR$^5$.

In some embodiments, $R^a$, $R^b$, and $R^c$ are independently selected from the group consisting of hydrogen, halogen, —OR$^4$, —CN, —N(R$^4$)$_2$, —C(=O)R$^7$, unsubstituted or substituted C$_1$-C$_6$ alkyl, unsubstituted or substituted C$_1$-C$_6$ fluoroalkyl, unsubstituted or substituted C$_1$-C$_6$ heteroalkyl, unsubstituted or substituted C$_3$-C$_6$ cycloalkyl, unsubstituted or substituted C$_2$-C$_7$ heterocycloalkyl, unsubstituted or substituted phenyl, unsubstituted or substituted monocyclic heteroaryl, and unsubstituted or substituted bicyclic heteroaryl, wherein any substituted group of $R^a$, $R^b$, and $R^c$ is substituted with one or more $R^6$ groups; or one $R^a$ and one $R^b$, when present on adjacent atoms of $R^A$, are taken together with the intervening atoms connecting $R^a$ to $R^b$ to form a 5- to 6-membered monocyclic carbocycle or 5- to 6-membered monocyclic heterocycle, wherein the carbocycle or heterocycle is unsubstituted or substituted with one or more $R^6$ groups; wherein, if $R^a$, $R^b$, or $R^c$ is attached to the N atom of a heteroaryl, then it is hydrogen, —C(=O)R$^7$, unsubstituted or substituted C$_1$-C$_6$ alkyl, unsubstituted or substituted C$_3$-C$_6$ cycloalkyl, or unsubstituted or substituted C$_2$-C$_7$ heterocycloalkyl; and $R^d$, $R^e$, and $R^f$ are independently selected from the group consisting of hydrogen, halogen, —OR$^4$, —CN, —N(R$^4$)$_2$, —C(=O)R$^7$, —C(=O)N(R$^4$)$_2$, unsubstituted or substituted C$_1$-C$_6$ alkyl, unsubstituted or substituted C$_1$-C$_6$ fluoroalkyl, unsubstituted or substituted C$_1$-C$_6$ heteroalkyl, unsubstituted or substituted C$_3$-C$_6$ cycloalkyl, unsubstituted or substituted C$_2$-C$_7$ heterocycloalkyl, unsubstituted or substituted phenyl, unsubstituted or substituted monocyclic heteroaryl, and unsubstituted or substituted bicyclic heteroaryl, wherein any substituted group of $R^d$, $R^e$, and $R^f$ is substituted with one or more $R^6$ groups; wherein, if $R^d$, $R^e$, or $R^f$ is attached to the N atom of a heteroaryl, then it is hydrogen, —C(=O)R$^7$, unsubstituted or substituted C$_1$-C$_6$ alkyl, unsubstituted or substituted C$_3$-C$_6$ cycloalkyl, or unsubstituted or substituted C$_2$-C$_7$ heterocycloalkyl.

In some embodiments, $R^a$ is selected from the group consisting of hydrogen, halogen, —OR$^4$, —CN, —N(R$^4$)$_2$, —C(=O)R$^7$, unsubstituted or substituted C$_1$-C$_6$ alkyl, unsubstituted or substituted C$_1$-C$_6$ fluoroalkyl, unsubstituted or substituted C$_1$-C$_6$ heteroalkyl, and unsubstituted or substituted C$_3$-C$_6$ cycloalkyl, wherein any substituted group of $R^a$ is substituted with one or more $R^6$ groups; and $R^b$ and $R^c$ are independently selected from the group consisting of hydrogen, halogen, —OR$^4$, —CN, —N(R$^4$)$_2$, —C(=O)R$^7$, unsubstituted or substituted C$_1$-C$_6$ alkyl, unsubstituted or substituted C$_1$-C$_6$ fluoroalkyl, and unsubstituted or substituted C$_1$-C$_6$ heteroalkyl, wherein any substituted group of $R^b$ and $R^c$ is substituted with one or more $R^6$ groups; wherein, if $R^a$, $R^b$, or $R^c$ is attached to the N atom of a heteroaryl, then it is hydrogen, —C(=O)R$^7$, or unsubstituted or substituted C$_1$-C$_6$ alkyl.

In some embodiments, $R^a$ is selected from the group consisting of hydrogen, F, Cl, Br, —CN, —OH, —OCH$_3$, —OCH$_2$CH$_3$, —C(O)CH$_3$, —C(O)CH$_2$CH$_3$, —CH$_3$, —CH$_2$CH$_3$, —CH$_2$CH$_2$CH$_3$, —CH(CH$_3$)$_2$, —CH$_2$CH$_2$CH$_2$CH$_3$, —CH$_2$CH(CH$_3$)$_2$, —CH(CH$_3$)(CH$_2$CH$_3$), —C(CH$_3$)$_3$, —CH$_2$CH$_2$CH(CH$_3$)$_2$, —CH$_2$OH, —CH$_2$CN, —CH$_2$F, —CHF$_2$, —CF$_3$, —CH$_2$CH$_2$OH, —CH$_2$CH$_2$CN, —CH$_2$CH$_2$F, —CH$_2$CHF$_2$, —CH$_2$CF$_3$, —CH$_2$OCH$_3$, —CH$_2$CH$_2$OCH$_3$, —CH$_2$NH$_2$, —CH$_2$NHCH$_3$, —CH$_2$N(CH$_3$)$_2$, —CH$_2$CH$_2$NH$_2$, —CH$_2$CH$_2$NHCH$_3$, —CH$_2$CH$_2$N(CH$_3$)$_2$, cyclopropyl, cyclobutyl, cyclopentyl, and cyclohexyl; and $R^b$ and $R^c$ are independently selected from the group consisting of hydrogen, F, Cl, Br, —CN, —OH, —OCH$_3$, —OCH$_2$CH$_3$, —C(O)CH$_3$, —C(O)CH$_2$CH$_3$, —CH$_3$, —CH$_2$CH$_3$, —CH$_2$CH$_2$CH$_3$, —CH(CH$_3$)$_2$, —CH$_2$CH$_2$CH$_2$CH$_3$, —CH$_2$CH(CH$_3$)$_2$, —CH(CH$_3$)(CH$_2$CH$_3$), —C(CH$_3$)$_3$, —CH$_2$CH$_2$CH(CH$_3$)$_2$, —CH$_2$OH, —CH$_2$CN, —CH$_2$F, —CHF$_2$, —CF$_3$, —CH$_2$CH$_2$OH, —CH$_2$CH$_2$CN, —CH$_2$CH$_2$F, —CH$_2$CHF$_2$, —CH$_2$CF$_3$, —CH$_2$OCH$_3$, —CH$_2$CH$_2$OCH$_3$, —CH$_2$NH$_2$, —CH$_2$NHCH$_3$, —CH$_2$N(CH$_3$)$_2$, —CH$_2$CH$_2$NH$_2$, —CH$_2$CH$_2$NHCH$_3$, and —CH$_2$CH$_2$N(CH$_3$)$_2$; wherein, if R$^a$, R$^b$, or R$^c$ is attached to the N atom of a heteroaryl, then it is hydrogen, —C(O)CH$_3$, —C(O)CH$_2$CH$_3$, —CH$_3$, —CH$_2$CH$_3$, —CH$_2$CH$_2$CH$_3$, —CH(CH$_3$)$_2$, —CH$_2$CH$_2$CH$_2$CH$_3$, —CH$_2$CH(CH$_3$)$_2$, —CH(CH$_3$)(CH$_2$CH$_3$), —C(CH$_3$)$_3$, —CH$_2$CH$_2$CH(CH$_3$)$_2$, —CH$_2$OH, —CH$_2$CN, —CH$_2$F, —CHF$_2$, —CF$_3$, —CH$_2$CH$_2$OH, —CH$_2$CH$_2$CN, —CH$_2$CH$_2$F, —CH$_2$CHF$_2$, —CH$_2$CF$_3$, —CH$_2$OCH$_3$, —CH$_2$CH$_2$OCH$_3$, —CH$_2$NH$_2$, —CH$_2$NHCH$_3$, —CH$_2$N(CH$_3$)$_2$, —CH$_2$CH$_2$NH$_2$, —CH$_2$CH$_2$NHCH$_3$, and —CH$_2$CH$_2$N(CH$_3$)$_2$.

In some embodiments, one R$^a$ and one R$^b$ on adjacent atoms of R$^A$ are taken together with the intervening atoms connecting R$^a$ to R$^b$ to form a 5- to 6-membered monocyclic cycloalkyl or 5- to 6-membered monocyclic heterocycloalkyl, wherein the cycloalkyl or heterocycloalkyl is unsubstituted or substituted with one or more R$^6$ groups. In some embodiments, one R$^a$ and one R$^b$ on adjacent atoms of R$^A$ are taken together with the intervening atoms connecting R$^a$ to R$^b$ to form a 5-membered monocyclic heterocycloalkyl, wherein the heterocycloalkyl is unsubstituted or substituted with one or more R$^6$ groups.

In some embodiments, R$^d$ is selected from the group consisting of hydrogen, halogen, —OR$^4$, —CN, —N(R$^4$)$_2$, unsubstituted or substituted C$_1$-C$_6$ alkyl, unsubstituted or substituted C$_1$-C$_6$ fluoroalkyl, unsubstituted or substituted C$_1$-C$_6$ heteroalkyl, unsubstituted or substituted C$_3$-C$_6$ cycloalkyl, unsubstituted or substituted C$_2$-C$_7$ heterocycloalkyl, unsubstituted or substituted phenyl, unsubstituted or substituted monocyclic heteroaryl, and unsubstituted or substituted bicyclic heteroaryl, wherein any substituted group of R$^d$ is substituted with one or more R$^6$ groups; and R$^e$ and R$^f$ are independently selected from the group consisting of hydrogen, halogen, —OR$^4$, —CN, —N(R$^4$)$_2$, unsubstituted or substituted C$_1$-C$_6$ alkyl, unsubstituted or substituted C$_1$-C$_6$ fluoroalkyl, and unsubstituted or substituted C$_1$-C$_6$ heteroalkyl; wherein, if R$^d$, R$^e$, or R$^f$ is attached to the N atom of a heteroaryl, then it is hydrogen, —C(═O)R$^7$, or unsubstituted or substituted C$_1$-C$_6$ alkyl.

In some embodiments, R$^d$ is selected from the group consisting of hydrogen, F, Cl, Br, —CN, —OH, —OCH$_3$, —OCH$_2$CH$_3$, —CH$_3$, —CH$_2$CH$_3$, —CH$_2$CH$_2$CH$_3$, —CH(CH$_3$)$_2$, —CH$_2$CH$_2$CH$_2$CH$_3$, —CH$_2$CH(CH$_3$)$_2$, —CH(CH$_3$)(CH$_2$CH$_3$), —C(CH$_3$)$_3$, —CH$_2$CH$_2$CH(CH$_3$)$_2$, —CH$_2$OH, —CH$_2$CN, —CH$_2$F, —CHF$_2$, —CF$_3$, —CH$_2$CH$_2$OH, —CH$_2$CH$_2$CN, —CH$_2$CH$_2$F, —CH$_2$CHF$_2$, —CH$_2$CF$_3$, —CH$_2$OCH$_3$, —CH$_2$CH$_2$OCH$_3$, —CH$_2$NH$_2$, —CH$_2$NHCH$_3$, —CH$_2$N(CH$_3$)$_2$, —CH$_2$CH$_2$NH$_2$, —CH$_2$CH$_2$NHCH$_3$, —CH$_2$CH$_2$N(CH$_3$)$_2$, unsubstituted or substituted cyclopropyl, unsubstituted or substituted cyclobutyl, unsubstituted or substituted cyclopentyl, unsubstituted or substituted cyclohexyl, unsubstituted or substituted C$_2$-C$_7$ heterocycloalkyl, unsubstituted or substituted phenyl, unsubstituted or substituted monocyclic heteroaryl, and unsubstituted or substituted bicyclic heteroaryl, wherein any substituted group of R$^d$ is substituted with one or more R$^6$ groups; and R$^e$ and R$^f$ are independently selected from the group consisting of hydrogen, F, Cl, Br, —CH$_3$, —CH$_2$CH$_3$, —CH$_2$CH$_2$CH$_3$, —CH(CH$_3$)$_2$, —CH$_2$CH$_2$CH$_2$CH$_3$, —CH$_2$CH(CH$_3$)$_2$, —CH(CH$_3$)(CH$_2$CH$_3$), —C(CH$_3$)$_3$, —CH$_2$CH$_2$CH(CH$_3$)$_2$, —CH$_2$OH, —CH$_2$CN, —CH$_2$F, —CHF$_2$, —CF$_3$, —CN, —OH, —OCH$_3$, and —OCH$_2$CH$_3$; wherein, if R$^d$, R$^e$, or R$^f$ is attached to the N atom of a heteroaryl, then it is hydrogen, —C(O)CH$_3$, —C(O)CH$_2$CH$_3$, —CH$_3$, —CH$_2$CH$_3$, —CH$_2$CH$_2$CH$_3$, —CH(CH$_3$)$_2$, —CH$_2$CH$_2$CH$_2$CH$_3$, —CH$_2$CH(CH$_3$)$_2$, —CH(CH$_3$)(CH$_2$CH$_3$), —C(CH$_3$)$_3$, —CH$_2$CH$_2$CH(CH$_3$)$_2$, —CH$_2$OH, —CH$_2$CN, —CH$_2$F, —CHF$_2$, —CF$_3$, —CH$_2$CH$_2$OH, —CH$_2$CH$_2$CN, —CH$_2$CH$_2$F, —CH$_2$CHF$_2$, —CH$_2$CF$_3$, —CH$_2$OCH$_3$, —CH$_2$CH$_2$OCH$_3$, —CH$_2$NH$_2$, —CH$_2$NHCH$_3$, —CH$_2$N(CH$_3$)$_2$, —CH$_2$CH$_2$NH$_2$, —CH$_2$CH$_2$NHCH$_3$, and —CH$_2$CH$_2$N(CH$_3$)$_2$.

In some embodiments, compounds described herein have the following structure:

In some embodiments, R$^A$, R$^B$, X$^1$, W, Y, and R$^1$ are as described herein.

In some embodiments, R$^A$, R$^B$, X$^1$, W, Y, and R$^1$ are as described in Table 1.

Any combination of the groups described above for the various variables is contemplated herein. Throughout the specification, groups and substituents thereof are chosen by one skilled in the field to provide stable moieties and compounds.

Exemplary compounds of Formula (I) include the compounds described in the following Tables:

TABLE 1

| Cpd No. | R$^A$ | R$^B$ | X$^1$ | W | Y | R$^1$ |
|---|---|---|---|---|---|---|
| 1-1 | (2-ethoxypyridin-3-yl) | (2-cyano-4-trifluoromethylphenyl) | CH | CH$_2$ | C(═O) | H$_2$N–CH$_2$CH$_2$– |

TABLE 1-continued

| Cpd No. | R⁴ | Rᴮ | X¹ | W | Y | R¹ |
|---|---|---|---|---|---|---|
| 1-2 | 2-ethoxyphenyl | 2-cyano-4-(trifluoromethyl)phenyl | CH | CH₂ | C(=O) | H₂N-CH₂- |
| 1-3 | 2-ethoxypyridin-3-yl | 2-cyano-4-(trifluoromethyl)phenyl | CH | CH₂ | C(=O) | H₂N-CH₂CH₂- |
| 1-4 | 2-ethoxyphenyl | 2-cyano-4-(trifluoromethyl)phenyl | CH | CH₂ | C(=O) | H₂N-CH₂CH₂- |
| 1-5 | 2-ethoxypyridin-3-yl | 2-cyano-4-(trifluoromethyl)phenyl | CH | CH₂ | C(=O) | (S)-H₂N-CH(CH₃)-CH₂- |
| 1-6 | 2-ethoxypyridin-3-yl | 2-cyano-4-(trifluoromethyl)phenyl | CH | CH₂ | C(=O) | (R)-H₂N-CH(CH₃)-CH₂- |
| 1-7 | 2-ethoxypyridin-3-yl | 2-cyano-4-(trifluoromethyl)phenyl | CH | CH₂ | C(=O) | H₂N-CH₂CH₂CH₂- |
| 1-8 | 2-ethoxypyridin-3-yl | 3-cyano-5-(trifluoromethyl)phenyl | CH | CH₂ | C(=O) | H₂N-CH₂CH₂- |
| 1-9 | 2-ethoxypyridin-3-yl | 2-cyano-4-(trifluoromethyl)phenyl | CH | CH₂ | C(=O) | (R)-pyrrolidin-3-yl |

TABLE 1-continued

| Cpd No. | R^A | R^B | X^1 | W | Y | R^1 |
|---|---|---|---|---|---|---|
| 1-10 | 2-ethoxypyridin-3-yl | 2-cyano-4-(trifluoromethyl)phenyl | CH | CH$_2$ | C(=O) | pyrrolidin-3-yl (NH) |
| 1-11 | 2-ethoxypyridin-3-yl | 2-cyano-4-(trifluoromethyl)phenyl | CH | CH$_2$ | C(=O) | H$_2$N-(CH$_2$)$_3$- |
| 1-12 | 2-ethoxypyridin-3-yl | 2-cyano-4-(trifluoromethyl)phenyl | CH | CH$_2$ | absent | H$_2$N-(CH$_2$)$_2$- |
| 1-13 | 2-ethoxypyridin-3-yl | 2-cyano-4-(trifluoromethyl)phenyl | CH | CH$_2$ | absent | (R or S)-H$_2$N-CH(CH$_3$)-CH$_2$- |
| 1-14 | 2-ethoxypyridin-3-yl | 2-cyano-4-(trifluoromethyl)phenyl | CH | CH$_2$ | absent | (S or R)-H$_2$N-CH(CH$_3$)-CH$_2$- |
| 1-15 | 2-ethoxypyridin-3-yl | 2-cyano-4-(trifluoromethyl)phenyl | CH | C=O | absent | CH$_3$NH-(CH$_2$)$_3$- |
| 1-16 | 2-ethoxypyridin-3-yl | 2-cyano-4-(trifluoromethyl)phenyl | CH | C=O | absent | H$_2$N-(CH$_2$)$_3$- |
| 1-17 | 2-ethoxypyridin-3-yl | 2-cyano-4-(trifluoromethyl)phenyl | CH | C=O | absent | (3S)-pyrrolidin-3-yl |

TABLE 1-continued

| Cpd No. | R⁴ | Rᴮ | X¹ | W | Y | R¹ |
|---|---|---|---|---|---|---|
| 1-18 | 2-ethoxypyridin-3-yl | 2-(CF₃),4-CN-phenyl | CH | C=O | absent | pyrrolidin-3-yl (HN) |
| 1-19 | 2-ethoxypyridin-3-yl | 4-CN,6-CF₃-pyridin-2-yl | CH | CH₂ | C(=O) | H₂N-CH₂-CH₂- |
| 1-20 | 2-ethoxypyridin-3-yl | 5-F,6-CF₃-pyridin-2-yl | CH | CH₂ | C(=O) | H₂N-CH₂-CH₂- |
| 1-21 | 2-ethoxypyridin-3-yl | 2-(CF₃),4-CN-phenyl | CH | C=O | absent | 1-methylpyrrolidin-3-yl |
| 1-22 | 2-ethoxypyridin-3-yl | 2-CF₃,4-Cl-phenyl | CH | CH₂ | C(=O) | H₂N-CH₂-CH₂- |
| 1-23 | 2-ethoxypyridin-3-yl | 6-CF₃,5-OEt-pyridin-2-yl | CH | CH₂ | C(=O) | H₂N-CH₂-CH₂- |
| 1-24 | 2-ethoxypyridin-3-yl | 4-CF₃,6-CN-pyridin-2-yl | CH | CH₂ | C(=O) | H₂N-CH₂-CH₂- |
| 1-25 | 2-ethoxypyridin-3-yl | 5-OEt,6-CF₃-pyridin-2-yl | CH | CH₂ | C(=O) | H₂N-CH₂-CH₂- |

TABLE 1-continued

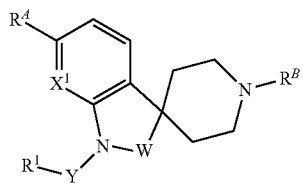

| Cpd No. | R$^A$ | R$^B$ | X$^1$ | W | Y | R$^1$ |
|---|---|---|---|---|---|---|
| 1-26 | 2-ethoxypyridin-3-yl | 2-cyano-4-(trifluoromethyl)phenyl | CH | CH(CH$_3$) | C(=O) | 3-aminopropyl |
| 1-27 | 2-ethoxypyridin-3-yl | 2-cyano-4-(trifluoromethyl)phenyl | CH | CH$_2$ | C(=O)NH* | 3-aminopropyl |
| 1-28 | 2-ethoxypyridin-3-yl | 2-cyano-4-(trifluoromethyl)phenyl | N | CH$_2$ | C(=O) | 3-aminopropyl |
| 1-29 | 2-ethoxypyridin-3-yl | 2-cyano-4-(trifluoromethyl)phenyl | N | CH$_2$ | absent | 3-aminopropyl |
| 1-30 | 2-ethoxypyridin-3-yl | 2-cyano-4-(trifluoromethyl)phenyl | CH | CH$_2$ | C(=O)NH* | (R)-3-aminobutyl |
| 1-31 | 2-ethoxypyridin-3-yl | 2-cyano-4-(trifluoromethyl)phenyl | CH | CH$_2$ | C(=O)NH* | (S)-3-aminobutyl |
| 1-32 | 2-ethoxypyridin-3-yl | 2-cyano-4-(trifluoromethyl)phenyl | CH | CH$_2$ | C(=O)NH* | (R)-pyrrolidin-3-yl |
| 1-33 | 2-ethoxypyridin-3-yl | 2-cyano-4-(trifluoromethyl)phenyl | CH | CH$_2$ | C(=O)NH* | (S)-pyrrolidin-3-yl |

TABLE 1-continued

| Cpd No. | R⁴ | Rᴮ | X¹ | W | Y | R¹ |
|---|---|---|---|---|---|---|
| 1-34 | 2-ethoxypyridin-3-yl | 2-cyano-4-chlorophenyl | CH | CH₂ | C(=O) | H₂N-CH₂CH₂- |
| 1-35 | 2-(hydroxymethyl)phenyl | 2-cyano-4-trifluoromethylphenyl | CH | CH | C(=O) | H₂N-CH₂CH₂- |
| 1-36 | 2-ethoxypyridin-3-yl | 4-methoxy-6-trifluoromethylpyridin-2-yl | CH | CH₂ | C(=O) | H₂N-CH₂CH₂- |
| 1-37 | 2-ethoxypyridin-3-yl | 2-cyano-4-trifluoromethylphenyl | CH | CH₂ | SO₂ | H₂N-CH₂CH₂- |
| 1-38 | 2-ethoxypyridin-3-yl | 2-cyano-4-trifluoromethylphenyl | CH | CH₂ | absent | azetidin-2-yl-methyl |
| 1-39 | 2-ethoxypyridin-3-yl | 2-cyano-4-trifluoromethylphenyl | CH | CH₂ | absent | azetidin-2-yl-methyl |
| 1-40 | 2-ethoxypyridin-3-yl | 2-cyano-4-trifluoromethylphenyl | CH | CH₂ | absent | H₂N-CH₂-CH(CH₃)- |
| 1-41 | 2-ethoxypyridin-3-yl | 2-cyano-4-trifluoromethylphenyl | CH | CH₂ | absent | H₂N-CH₂-CH(CH₃)- |

TABLE 1-continued
| Cpd No. | R^A | R^B | X^1 | W | Y | R^1 |
|---|---|---|---|---|---|---|
| 1-42 | 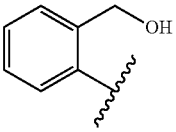 [SMILES: *c1ccccc1CO] | 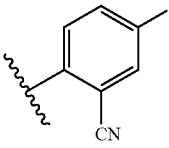 | CH | CH$_2$ | absent | 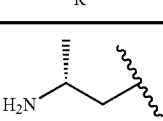 |
| 1-43 |  | 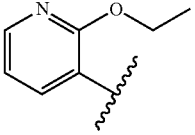 [SMILES: *c1cccnc1OCC] | CH | CH$_2$ | C(=O) | 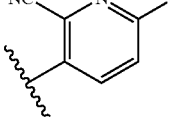 |
| 1-44 | 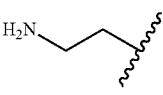 |  | CH | CH$_2$ | C(=O) | 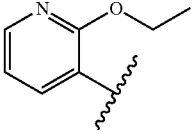 [SMILES: *c1cccnc1OCC] |
| 1-45 | 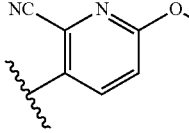 | 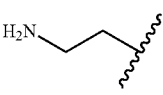 | CH | CH$_2$ | absent |  |
| 1-46 | 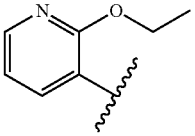 [SMILES: *c1cccnc1OCC] | 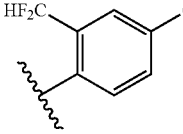 | N | CH$_2$ | absent | 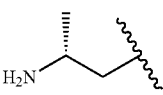 |
| 1-47 |  | 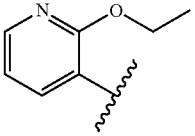 [SMILES: *c1cccnc1OCC] | N | CH$_2$ | C(=O) | 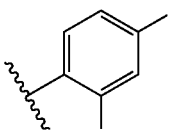 |
| 1-48 | 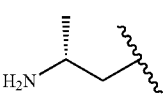 |  | N | CH$_2$ | C(=O) | 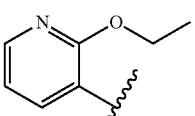 |
| 1-49 | 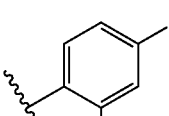 | 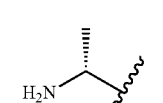 | N | CH$_2$ | C(=O) |  |

TABLE 1-continued

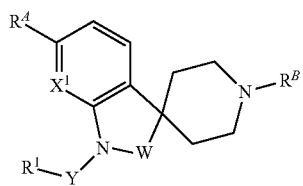

| Cpd No. | R^A | R^B | X^1 | W | Y | R^1 |
|---|---|---|---|---|---|---|
| 1-50 | 2-ethoxypyridin-3-yl | 4-CF3-2-CN-phenyl | N | CH2 | C(=O) | CH3NH-CH2CH2- |
| 1-51 | 2-ethoxypyridin-3-yl | 4-CF3-2-CN-phenyl | N | CH2 | absent | (S)-HOCH2-CH(NH2)-CH2- |
| 1-52 | 2-ethoxypyridin-3-yl | 4-CF3-2-CN-phenyl | N | CH2 | absent | (S)-pyrrolidin-3-yl |
| 1-53 | 2-ethoxypyridin-3-yl | 4-CF3-2-CN-phenyl | N | CH2 | absent | (R)-pyrrolidin-3-yl |
| 1-54 | 2-ethoxypyridin-3-yl | 4-CF3-2-CN-phenyl | N | CH2 | absent | H2N-(CH2)3- |
| 1-55 | 2-ethoxypyridin-3-yl | 4-CF3-2-CN-phenyl | N | CH2 | C(=O)NH* | H2N-CH2CH2- |
| 1-56 | 2-ethoxypyridin-3-yl | 4-CF3-2-CN-phenyl | N | CH2 | C(=O)NH* | (S)-CH3-CH(NH2)-CH2- |
| 1-57 | 2-ethoxypyridin-3-yl | 4-CF3-2-CN-phenyl | N | CH2 | C(=O)NH* | (S)-pyrrolidin-3-yl |

TABLE 1-continued

| Cpd No. | R⁴ | Rᴮ | X¹ | W | Y | R¹ |
|---|---|---|---|---|---|---|
| 1-58 | 2-ethoxypyridin-3-yl | 2-cyano-4-(trifluoromethyl)phenyl | N | CH₂ | C(=O) | (CH₃)₂N-CH₂CH₂- |
| 1-59 | 2-ethoxypyridin-3-yl | 2-cyano-4-(trifluoromethyl)phenyl | N | CH₂ | C(=O)NH* | CH₃NH-CH₂CH₂- |
| 1-60 | 2-ethoxypyridin-3-yl | 2-cyano-4-(trifluoromethyl)phenyl | N | C=O | absent | H₂N-CH₂CH₂CH₂- |
| 1-61 | 2-ethoxypyridin-3-yl | 2-cyano-4-(trifluoromethyl)phenyl | N | C=O | absent | H₂N-CH(CH₃)-CH₂- |
| 1-62 | 2-ethoxypyridin-3-yl | 2-cyano-4-(trifluoromethyl)phenyl | N | C=O | absent | (CH₃)₂N-CH₂CH₂- |
| 1-63 | 2-ethoxypyridin-3-yl | 2-cyano-4-(trifluoromethyl)phenyl | N | C=O | absent | CH₃NH-CH₂CH₂- |
| 1-64 | 2-ethoxypyridin-3-yl | 2-cyano-4-(trifluoromethyl)phenyl | CH | #C(=O)NH | absent | H₂N-CH₂- |
| 1-65 | 2-ethoxypyridin-3-yl | 2-cyano-4-(trifluoromethyl)phenyl | CH | #C(=O)NH | absent | CH₃NH-CH₂CH₂- |

TABLE 1-continued

| Cpd No. | R^A | R^B | X^1 | W | Y | R^1 |
|---|---|---|---|---|---|---|
| 1-66 | 2-ethoxypyridin-3-yl | 2-cyano-4-(trifluoromethyl)phenyl | CH | #C(=O)CH_2 | absent | H_2N-CH_2CH_2- |
| 1-67 | 2-ethoxypyridin-3-yl | 2-cyano-4-(trifluoromethyl)phenyl | CH | #C(=O)CH_2 | absent | H_2N-CH_2CH_2CH_2- |
| 1-68 | 2-ethoxypyridin-3-yl | 2-cyano-4-(trifluoromethyl)phenyl | CH | #C(=O)CH_2 | absent | H_2N-CH(CH_3)- (S) |
| 1-69 | 2-ethoxypyridin-3-yl | 2-cyano-4-(trifluoromethyl)phenyl | CH | #C(=O)CH_2 | absent | CH_3NH-CH_2CH_2- |
| 1-70 | 2-ethoxypyridin-3-yl | 2-cyano-4-(trifluoromethyl)phenyl | CH | #C(=O)CH_2 | absent | H_2N-CH(CH_3)- (R) |

*attachment point to R^1;
attachment point to N

Compounds in Table 1 are named:

1-1: 2-[1-(2-aminoacetyl)-6-(2-ethoxypyridin-3-yl)-1,2-dihydrospiro[indole-3,4'-piperidin]-1'-yl]-5-(trifluoromethyl)benzonitrile;

1-2: 2-[1-(2-aminoacetyl)-6-(2-ethoxyphenyl)-1,2-dihydrospiro[indole-3,4'-piperidin]-1'-yl]-5-(trifluoromethyl)benzonitrile;

1-3: 2-[1-(3-aminopropanoyl)-6-(2-ethoxypyridin-3-yl)-1,2-dihydrospiro[indole-3,4'-piperidin]-1'-yl]-5-(trifluoromethyl)benzonitrile;

1-4: 2-[1-(3-aminopropanoyl)-6-(2-ethoxyphenyl)-1,2-dihydrospiro[indole-3,4'-piperidin]-1'-yl]-5-(trifluoromethyl)benzonitrile;

1-5: 2-{1-[(3S)-3-aminobutanoyl]-6-(2-ethoxypyridin-3-yl)-1,2-dihydrospiro[indole-3,4'-piperidin]-1'-yl}-5-(trifluoromethyl)benzonitrile;

1-6: 2-{1-[(3R)-3-aminobutanoyl]-6-(2-ethoxypyridin-3-yl)-1,2-dihydrospiro[indole-3,4'-piperidin]-1'-yl}-5-(trifluoromethyl)benzonitrile;

1-7: 3-amino-1-{1'-[2-chloro-4-(trifluoromethyl)phenyl]-6-(2-ethoxypyridin-3-yl)-1,2-dihydrospiro[indole-3,4'-piperidin]-1-yl}propan-1-one;

1-8: 3-[1-(3-aminopropanoyl)-6-(2-ethoxypyridin-3-yl)-1,2-dihydrospiro[indole-3,4'-piperidin]-1'-yl]-5-(trifluoromethyl)benzonitrile;

1-9: 2-[6-(2-ethoxypyridin-3-yl)-1-[(3R)-pyrrolidine-3-carbonyl]-1,2-dihydrospiro[indole-3,4'-piperidin]-1'-yl]-5-(trifluoromethyl)benzonitrile;

1-10: 2-[6-(2-ethoxypyridin-3-yl)-1-[(3S)-pyrrolidine-3-carbonyl]-1,2-dihydrospiro[indole-3,4'-piperidin]-1'-yl]-5-(trifluoromethyl)benzonitrile;

1-11: 2-[1-(4-aminobutanoyl)-6-(2-ethoxypyridin-3-yl)-1,2-dihydrospiro[indole-3,4'-piperidin]-1'-yl]-5-(trifluoromethyl)benzonitrile;

1-12: 2-[1-(2-aminoethyl)-6-(2-ethoxypyridin-3-yl)-1,2-dihydrospiro[indole-3,4'-piperidin]-1'-yl]-5-(trifluoromethyl)benzonitrile;

1-13: 2-{1-[(2R)-2-aminopropyl]-6-(2-ethoxypyridin-3-yl)-1,2-dihydrospiro[indole-3,4'-piperidin]-1'-yl}-5-(trifluoromethyl)benzonitrile;

1-14: 2-{1-[(2S)-2-aminopropyl]-6-(2-ethoxypyridin-3-yl)-1,2-dihydrospiro[indole-3,4'-piperidin]-1'-yl}-5-(trifluoromethyl)benzonitrile;

1-15: 2-{6-(2-ethoxypyridin-3-yl)-1-[2-(methylamino)ethyl]-2-oxospiro[indoline-3,4'-piperidin]-1'-yl}-5-(trifluoromethyl)benzonitrile;

1-16: 2-[1-(2-aminoethyl)-6-(2-ethoxypyridin-3-yl)-2-oxo-1,2-dihydrospiro[indole-3,4'-piperidin]-1'-yl]-5-(trifluoromethyl)benzonitrile;

1-17: 2-[6-(2-ethoxypyridin-3-yl)-2-oxo-1-[(3S)-pyrrolidin-3-yl]-1,2-dihydrospiro[indole-3,4'-piperidin]-1'-yl]-5-(trifluoromethyl)benzonitrile;

1-18: 2-[6-(2-ethoxypyridin-3-yl)-2-oxo-1-[(3R)-pyrrolidin-3-yl]-1,2-dihydrospiro[indole-3,4'-piperidin]-1'-yl]-5-(trifluoromethyl)benzonitrile;

1-19: 2-[1-(3-aminopropanoyl)-6-(2-ethoxypyridin-3-yl)-1,2-dihydrospiro[indole-3,4'-piperidin]-1'-yl]-6-(trifluoromethyl)pyridine-4-carbonitrile;

1-20: 3-amino-1-[6-(2-ethoxypyridin-3-yl)-1'-[5-fluoro-6-(trifluoromethyl)pyridin-2-yl]-1,2-dihydrospiro[indole-3,4'-piperidin]-1-yl]propan-1-one;

1-21: 2-[6-(2-ethoxypyridin-3-yl)-1-[(3R)-1-methylpyrrolidin-3-yl]-2-oxo-1,2-dihydrospiro[indole-3,4'-piperidin]-1'-yl]-5-(trifluoromethyl)benzonitrile;

1-22: 3-amino-1-{1'-[4-chloro-2-(trifluoromethyl)phenyl]-6-(2-ethoxypyridin-3-yl)-1,2-dihydrospiro[indole-3,4'-piperidin]-1-yl}propan-1-one;

1-23: 3-amino-1-{1'-[6-ethoxy-2-(trifluoromethyl)pyridin-3-yl]-6-(2-ethoxypyridin-3-yl)-1,2-dihydrospiro[indole-3,4'-piperidin]-1-yl}propan-1-one;

1-24: 6-[1-(3-aminopropanoyl)-6-(2-ethoxypyridin-3-yl)-1,2-dihydrospiro[indole-3,4'-piperidin]-1'-yl]-4-(trifluoromethyl)pyridine-2-carbonitrile;

1-25: 3-amino-1-{1'-[5-ethoxy-6-(trifluoromethyl)pyridin-2-yl]-6-(2-ethoxypyridin-3-yl)-1,2-dihydrospiro[indole-3,4'-piperidin]-1-yl}propan-1-one;

1-26: 2-[1-(3-aminopropanoyl)-6-(2-ethoxypyridin-3-yl)-2-methyl-1,2-dihydrospiro[indole-3,4'-piperidin]-1'-yl]-5-(trifluoromethyl)benzonitrile;

1-27: N-(2-aminoethyl)-1'-[2-cyano-4-(trifluoromethyl)phenyl]-6-(2-ethoxypyridin-3-yl)-1,2-dihydrospiro[indole-3,4'-piperidine]-1-carboxamide;

1-28: 2-[1'-(3-aminopropanoyl)-6'-(2-ethoxypyridin-3-yl)-1',2'-dihydrospiro[piperidine-4,3'-pyrrolo[2,3-b]pyridin]-1-yl]-5-(trifluoromethyl)benzonitrile;

1-29: 2-[1'-(2-aminoethyl)-6'-(2-ethoxypyridin-3-yl)-1',2'-dihydrospiro[piperidine-4,3'-pyrrolo[2,3-b]pyridin]-1-yl]-5-(trifluoromethyl)benzonitrile;

1-30: N-[(2R)-2-aminopropyl]-1'-[2-cyano-4-(trifluoromethyl)phenyl]-6-(2-ethoxypyridin-3-yl)-1,2-dihydrospiro[indole-3,4'-piperidine]-1-carboxamide;

1-31: N-[(2S)-2-aminopropyl]-1'-[2-cyano-4-(trifluoromethyl)phenyl]-6-(2-ethoxypyridin-3-yl)-1,2-dihydrospiro[indole-3,4'-piperidine]-1-carboxamide;

1-32: 1'-[2-cyano-4-(trifluoromethyl)phenyl]-6-(2-ethoxypyridin-3-yl)-N-[(3R)-pyrrolidin-3-yl]-1,2-dihydrospiro[indole-3,4'-piperidine]-1-carboxamide;

1-33: 1'-[2-cyano-4-(trifluoromethyl)phenyl]-6-(2-ethoxypyridin-3-yl)-N-[(3S)-pyrrolidin-3-yl]-1,2-dihydrospiro[indole-3,4'-piperidine]-1-carboxamide;

1-34: 2-[1-(3-aminopropanoyl)-6-(2-ethoxypyridin-3-yl)-1,2-dihydrospiro[indole-3,4'-piperidin]-1'-yl]-5-chlorobenzonitrile;

1-35: 2-[1-(3-aminopropanoyl)-6-[2-(hydroxymethyl)phenyl]-1,2-dihydrospiro[indole-3,4'-piperidin]-1'-yl]-5-(trifluoromethyl)benzonitrile;

1-36: 3-amino-1-[6-(2-ethoxypyridin-3-yl)-1'-[4-methoxy-6-(trifluoromethyl)pyridin-2-yl]-1,2-dihydrospiro[indole-3,4'-piperidin]-1-yl]propan-1-one;

1-37: 2-[1-(2-aminoethanesulfonyl)-6-(2-ethoxypyridin-3-yl)-1,2-dihydrospiro[indole-3,4'-piperidin]-1'-yl]-5-(trifluoromethyl)benzonitrile;

1-38: 2-(1-{[(2R)-azetidin-2-yl]methyl}-6-(2-ethoxypyridin-3-yl)-1,2-dihydrospiro[indole-3,4'-piperidin]-1'-yl)-5-(trifluoromethyl)benzonitrile;

1-39: 2-(1-{[(2S)-azetidin-2-yl]methyl}-6-(2-ethoxypyridin-3-yl)-1,2-dihydrospiro[indole-3,4'-piperidin]-1'-yl)-5-(trifluoromethyl)benzonitrile;

1-40: 2-{1-[(2R)-1-aminopropan-2-yl]-6-(2-ethoxypyridin-3-yl)-1,2-dihydrospiro[indole-3,4'-piperidin]-1'-yl}-5-(trifluoromethyl)benzonitrile;

1-41: 2-{1-[(2S)-1-aminopropan-2-yl]-6-(2-ethoxypyridin-3-yl)-1,2-dihydrospiro[indole-3,4'-piperidin]-1'-yl}-5-(trifluoromethyl)benzonitrile;

1-42: 2-{1-[(2R)-2-aminopropyl]-6-[2-(hydroxymethyl)phenyl]-1,2-dihydrospiro[indole-3,4'-piperidin]-1'-yl}-5-(trifluoromethyl)benzonitrile;

1-43: 3-[1-(3-aminopropanoyl)-6-(2-ethoxypyridin-3-yl)-1,2-dihydrospiro[indole-3,4'-piperidin]-1'-yl]-6-methoxypyridine-2-carbonitrile;

1-44: 3-[1-(3-aminopropanoyl)-6-(2-ethoxypyridin-3-yl)-1,2-dihydrospiro[indole-3,4'-piperidin]-1'-yl]-6-ethoxypyridine-2-carbonitrile;

1-45: (2R)-1-{1'-[4-chloro-2-(difluoromethyl)phenyl]-6-(2-ethoxypyridin-3-yl)-1,2-dihydrospiro[indole-3,4'-piperidin]-1-yl}propan-2-amine;

1-46: 2-{1'-[(2R)-2-aminopropyl]-6'-(2-ethoxypyridin-3-yl)-1',2'-dihydrospiro[piperidine-4,3'-pyrrolo[2,3-b]pyridin]-1-yl}-5-(trifluoromethyl)benzonitrile;

1-47: 2-{1'-[(2R)-2-aminopropanoyl]-6'-(2-ethoxypyridin-3-yl)-1',2'-dihydrospiro[piperidine-4,3'-pyrrolo[2,3-b]pyridin]-1-yl}-5-(trifluoromethyl)benzonitrile;

1-48: 2-{1'-[(2S)-2-aminopropanoyl]-6'-(2-ethoxypyridin-3-yl)-1',2'-dihydrospiro[piperidine-4,3'-pyrrolo[2,3-b]pyridin]-1-yl}-5-(trifluoromethyl)benzonitrile;

1-49: 2-[6'-(2-ethoxypyridin-3-yl)-1'-[(3R)-pyrrolidine-3-carbonyl]-1',2'-dihydrospiro[piperidine-4,3'-pyrrolo[2,3-b]pyridin]-1-yl]-5-(trifluoromethyl)benzonitrile;

1-50: 2-[6'-(2-ethoxypyridin-3-yl)-1'-[3-(methylamino)propanoyl]-1',2'-dihydrospiro[piperidine-4,3'-pyrrolo[2,3-b]pyridin]-1-yl]-5-(trifluoromethyl)benzonitrile;

1-51: 2-{1'-[(2S)-2-amino-3-hydroxypropyl]-6'-(2-ethoxypyridin-3-yl)-1',2'-dihydrospiro[piperidine-4,3'-pyrrolo[2,3-b]pyridin]-1-yl}-5-(trifluoromethyl)benzonitrile;

1-52: 2-[6'-(2-ethoxypyridin-3-yl)-1'-[(3R)-pyrrolidin-3-yl]-1',2'-dihydrospiro[piperidine-4,3'-pyrrolo[2,3-b]pyridin]-1-yl]-5-(trifluoromethyl)benzonitrile;

1-53: 2-[6'-(2-ethoxypyridin-3-yl)-1'-[(3S)-pyrrolidin-3-yl]-1',2'-dihydrospiro[piperidine-4,3'-pyrrolo[2,3-b]pyridin]-1-yl]-5-(trifluoromethyl)benzonitrile;

1-54: 2-[1'-(3-aminopropyl)-6'-(2-ethoxypyridin-3-yl)-1',2'-dihydrospiro[piperidine-4,3'-pyrrolo[2,3-b]pyridin]-1-yl]-5-(trifluoromethyl)benzonitrile;

1-55: N-(2-aminoethyl)-1-[2-cyano-4-(trifluoromethyl)phenyl]-6'-(2-ethoxypyridin-3-yl)-1',2'-dihydrospiro[piperidine-4,3'-pyrrolo[2,3-b]pyridine]-1'-carboxamide;

1-56: N-[(2S)-2-aminopropyl]-1-[2-cyano-4-(trifluoromethyl)phenyl]-6'-(2-ethoxypyridin-3-yl)-1',2'-dihydrospiro[piperidine-4,3'-pyrrolo[2,3-b]pyridine]-1'-carboxamide;

1-57: 1-[2-cyano-4-(trifluoromethyl)phenyl]-6'-(2-ethoxypyridin-3-yl)-N-[(3R)-pyrrolidin-3-yl]-1',2'-dihydrospiro[piperidine-4,3'-pyrrolo[2,3-b]pyridine]-1'-carboxamide;

1-58: 2-{1'-[3-(dimethylamino)propanoyl]-6'-(2-ethoxypyridin-3-yl)-1',2'-dihydrospiro[piperidine-4,3'-pyrrolo[2,3-b]pyridin]-1-yl}-5-(trifluoromethyl)benzonitrile;

1-59: 1-[2-cyano-4-(trifluoromethyl)phenyl]-6'-(2-ethoxypyridin-3-yl)-N-[2-(methylamino)ethyl]-1',2'-dihydrospiro[piperidine-4,3'-pyrrolo[2,3-b]pyridine]-1'-carboxamide;

1-60: 2-[1'-(2-aminoethyl)-6'-(2-ethoxypyridin-3-yl)-2'-oxo-1',2'-dihydrospiro[piperidine-4,3'-pyrrolo[2,3-b]pyridin]-1-yl]-5-(trifluoromethyl)benzonitrile;

1-61: 2-{1'-[(2R)-2-aminopropyl]-6'-(2-ethoxypyridin-3-yl)-2'-oxo-1',2'-dihydrospiro[piperidine-4,3'-pyrrolo[2,3-b]pyridin]-1-yl}-5-(trifluoromethyl)benzonitrile;

1-62: 2-{1'-[2-(dimethylamino)ethyl]-6'-(2-ethoxypyridin-3-yl)-2'-oxo-1',2'-dihydrospiro[piperidine-4,3'-pyrrolo[2,3-b]pyridin]-1-yl}-5-(trifluoromethyl)benzonitrile;

1-63: 2-[6'-(2-ethoxypyridin-3-yl)-1'-[2-(methylamino)ethyl]-2'-oxo-1',2'-dihydrospiro[piperidine-4,3'-pyrrolo[2,3-b]pyridin]-1-yl]-5-(trifluoromethyl)benzonitrile;

1-64: 2-[1'-(2-aminoethyl)-7'-(2-ethoxypyridin-3-yl)-2'-oxo-2',3'-dihydro-1'H-spiro[piperidine-4,4'-quinazolin]-1-yl]-5-(trifluoromethyl)benzonitrile;

1-65: 2-[7'-(2-ethoxypyridin-3-yl)-1'-[2-(methylamino)ethyl]-2'-oxo-2',3'-dihydro-1'H-spiro[piperidine-4,4'-quinazolin]-1-yl]-5-(trifluoromethyl)benzonitrile;

1-66: 2-[1'-(2-aminoethyl)-7'-(2-ethoxypyridin-3-yl)-2'-oxo-2',3'-dihydro-1'H-spiro[piperidine-4,4'-quinolin]-1-yl]-5-(trifluoromethyl)benzonitrile;

1-67: 2-[1'-(3-aminopropyl)-7'-(2-ethoxypyridin-3-yl)-2'-oxo-2',3'-dihydro-1'H-spiro[piperidine-4,4'-quinolin]-1-yl]-5-(trifluoromethyl)benzonitrile;

1-68: 2-{1'-[(2S)-2-aminopropyl]-7'-(2-ethoxypyridin-3-yl)-2'-oxo-2',3'-dihydro-1'H-spiro[piperidine-4,4'-quinolin]-1-yl}-5-(trifluoromethyl)benzonitrile;

1-69: 2-[7'-(2-ethoxypyridin-3-yl)-1'-[2-(methylamino)ethyl]-2'-oxo-2',3'-dihydro-1'H-spiro[piperidine-4,4'-quinolin]-1-yl]-5-(trifluoromethyl)benzonitrile; and 1-70: 2-{1'-[(2R)-2-aminopropyl]-7'-(2-ethoxypyridin-3-yl)-2'-oxo-2',3'-dihydro-1'H-spiro[piperidine-4,4'-quinolin]-1-yl}-5-(trifluoromethyl)benzonitrile.

In one aspect, compounds described herein are in the form of pharmaceutically acceptable salts. As well, active metabolites of these compounds having the same type of activity are included in the scope of the present disclosure. In addition, the compounds described herein can exist in unsolvated as well as solvated forms with pharmaceutically acceptable solvents such as water, ethanol, and the like. The solvated forms of the compounds presented herein are also considered to be disclosed herein.

"Pharmaceutically acceptable," as used herein, refers a material, such as a carrier or diluent, which does not abrogate the biological activity or properties of the compound, and is relatively nontoxic, i.e., the material is administered to an individual without causing undesirable biological effects or interacting in a deleterious manner with any of the components of the composition in which it is contained.

The term "pharmaceutically acceptable salt" refers to a form of a therapeutically active agent that consists of a cationic form of the therapeutically active agent in combination with a suitable anion, or in alternative embodiments, an anionic form of the therapeutically active agent in combination with a suitable cation. Handbook of Pharmaceutical Salts: Properties, Selection and Use. International Union of Pure and Applied Chemistry, Wiley-VCH 2002. S. M. Berge, L. D. Bighley, D. C. Monkhouse, J. Pharm. Sci. 1977, 66, 1-19. P. H. Stahl and C. G. Wermuth, editors, *Handbook of Pharmaceutical Salts: Properties, Selection and Use*, Weinheim/Zürich:Wiley-VCH/VHCA, 2002. Pharmaceutical salts typically are more soluble and more rapidly soluble in stomach and intestinal juices than non-ionic species and so are useful in solid dosage forms. Furthermore, because their solubility often is a function of pH, selective dissolution in one or another part of the digestive tract is possible and this capability can be manipulated as one aspect of delayed and sustained release behaviours. Also, because the salt-forming molecule can be in equilibrium with a neutral form, passage through biological membranes can be adjusted.

In some embodiments, pharmaceutically acceptable salts are obtained by reacting a compound of Formula (I) with an acid. In some embodiments, the compound of Formula (I) (i.e. free base form) is basic and is reacted with an organic acid or an inorganic acid. Inorganic acids include, but are not limited to, hydrochloric acid, hydrobromic acid, sulfuric acid, phosphoric acid, nitric acid, and metaphosphoric acid. Organic acids include, but are not limited to, 1-hydroxy-2-naphthoic acid; 2,2-dichloroacetic acid; 2-hydroxyethanesulfonic acid; 2-oxoglutaric acid; 4-acetamidobenzoic acid; 4-aminosalicylic acid; acetic acid; adipic acid; ascorbic acid (L); aspartic acid (L); benzenesulfonic acid; benzoic acid; camphoric acid (+); camphor-10-sulfonic acid (+); capric acid (decanoic acid); caproic acid (hexanoic acid); caprylic acid (octanoic acid); carbonic acid; cinnamic acid; citric acid; cyclamic acid; dodecylsulfuric acid; ethane-1,2-disulfonic acid; ethanesulfonic acid; formic acid; fumaric acid; galactaric acid; gentisic acid; glucoheptonic acid (D); gluconic acid (D); glucuronic acid (D); glutamic acid; glutaric acid; glycerophosphoric acid; glycolic acid; hippuric acid; isobutyric acid; lactic acid (DL); lactobionic acid; lauric acid; maleic acid; malic acid (–L); malonic acid; mandelic acid (DL); methanesulfonic acid; naphthalene-1,5-disulfonic acid; naphthalene-2-sulfonic acid; nicotinic acid; oleic acid; oxalic acid; palmitic acid; pamoic acid; phosphoric acid; proprionic acid; pyroglutamic acid (–L); salicylic acid; sebacic acid; stearic acid; succinic acid; sulfuric acid; tartaric acid (+L); thiocyanic acid; toluenesulfonic acid (p); and undecylenic acid.

In some embodiments, a compound of Formula (I) is prepared as a chloride salt, sulfate salt, bromide salt, mesylate salt, maleate salt, citrate salt or phosphate salt.

In some embodiments, pharmaceutically acceptable salts are obtained by reacting a compound of Formula (I) with a base. In some embodiments, the compound of Formula (I) is acidic and is reacted with a base. In such situations, an acidic proton of the compound of Formula (I) is replaced by a metal ion, e.g., lithium, sodium, potassium, magnesium, calcium, or an aluminum ion. In some cases, compounds described herein coordinate with an organic base, such as, but not limited to, ethanolamine, diethanolamine, triethanolamine, tromethamine, meglumine, N-methylglucamine, dicyclohexylamine, tris(hydroxymethyl)methylamine. In other cases, compounds described herein form salts with amino acids such as, but not limited to, arginine, lysine, and the like. Acceptable inorganic bases used to form salts with compounds that include an acidic proton, include, but are not limited to, aluminum hydroxide, calcium hydroxide, potassium hydroxide, sodium carbonate, potassium carbonate, sodium hydroxide, lithium hydroxide, and the like. In some embodiments, the compounds provided herein are prepared as a sodium salt, calcium salt, potassium salt, magnesium salt, meglumine salt, N-methylglucamine salt or ammonium salt.

It should be understood that a reference to a pharmaceutically acceptable salt includes the solvent addition forms. In some embodiments, solvates contain either stoichiometric or non-stoichiometric amounts of a solvent, and are formed during the process of crystallization with pharmaceutically acceptable solvents such as water, ethanol, and the like. Hydrates are formed when the solvent is water, or alcoholates are formed when the solvent is alcohol. Solvates of compounds described herein are conveniently prepared or formed during the processes described herein. In addition, the compounds provided herein optionally exist in unsolvated as well as solvated forms.

The methods and formulations described herein include the use of N-oxides (if appropriate), or pharmaceutically acceptable salts of compounds having the structure of Formula (I), as well as active metabolites of these compounds having the same type of activity.

In some embodiments, sites on the organic radicals (e.g. alkyl groups, aromatic rings) of compounds of Formula (I) are susceptible to various metabolic reactions. Incorporation of appropriate substituents on the organic radicals will reduce, minimize or eliminate this metabolic pathway. In specific embodiments, the appropriate substituent to decrease or eliminate the susceptibility of the aromatic ring to metabolic reactions is, by way of example only, a halogen, deuterium, an alkyl group, a haloalkyl group, or a deuteroalkyl group.

In another embodiment, the compounds described herein are labeled isotopically (e.g. with a radioisotope) or by another other means, including, but not limited to, the use of chromophores or fluorescent moieties, bioluminescent labels, or chemiluminescent labels.

Compounds described herein include isotopically-labeled compounds, which are identical to those recited in the various formulae and structures presented herein, but for the fact that one or more atoms are replaced by an atom having an atomic mass or mass number different from the atomic mass or mass number usually found in nature. Examples of isotopes that can be incorporated into the present compounds include isotopes of hydrogen, carbon, nitrogen, oxygen, sulfur, fluorine chlorine, iodine, phosphorus, such as, for example, $^2H$, $^3H$, $^{13}C$, $^{14}C$, $^{15}N$, $^{18}O$, $^{17}O$, $^{35}S$ $^{18}F$, $^{36}Cl$, $^{124}I$, $^{125}I$, $^{131}I$, $^{32}P$ and $^{33}P$. In one aspect, isotopically-labeled compounds described herein, for example those into which radioactive isotopes such as $^3H$ and $^{14}C$ are incorporated, are useful in drug and/or substrate tissue distribution assays. In one aspect, substitution with isotopes such as deuterium affords certain therapeutic advantages resulting from greater metabolic stability, such as, for example, increased in vivo half-life or reduced dosage requirements.

In some embodiments, the compounds of Formula (I) possess one or more stereocenters and each stereocenter exists independently in either the R or S configuration. In some embodiments, the compound of Formula (I) exists in the R configuration. In some embodiments, the compound of Formula (I) exists in the S configuration. The compounds presented herein include all diastereomeric, individual enantiomers, atropisomers, and epimeric forms as well as the appropriate mixtures thereof. The compounds and methods provided herein include all cis, trans, syn, anti, entgegen (E), and zusammen (Z) isomers as well as the appropriate mixtures thereof.

Individual stereoisomers are obtained, if desired, by methods such as, stereoselective synthesis and/or the separation of stereoisomers by chiral chromatographic columns or the separation of diastereomers by either non-chiral or chiral chromatographic columns or crystallization and recrystallization in a proper solvent or a mixture of solvents. In certain embodiments, compounds of Formula (I) are prepared as their individual stereoisomers by reacting a racemic mixture of the compound with an optically active resolving agent to form a pair of diastereoisomeric compounds/salts, separating the diastereomers and recovering the optically pure individual enantiomers. In some embodiments, resolution of individual enantiomers is carried out using covalent diastereomeric derivatives of the compounds described herein. In another embodiment, diastereomers are separated by separation/resolution techniques based upon differences in solubility. In other embodiments, separation of steroisomers is performed by chromatography or by the forming diastereomeric salts and separation by recrystallization, or chromatography, or any combination thereof. Jean Jacques, Andre Collet, Samuel H. Wilen, "Enantiomers, Racemates and Resolutions", John Wiley And Sons, Inc., 1981. In some embodiments, stereoisomers are obtained by stereoselective synthesis.

In some embodiments, compounds described herein are prepared as prodrugs. A "prodrug" refers to an agent that is converted into the parent drug in vivo. Prodrugs are often useful because, in some situations, they are easier to administer than the parent drug. They are, for instance, bioavailable by oral administration whereas the parent is not. Further or alternatively, the prodrug also has improved solubility in pharmaceutical compositions over the parent drug. In some embodiments, the design of a prodrug increases the effective water solubility. An example, without limitation, of a prodrug is a compound described herein, which is administered as an ester (the "prodrug") but then is metabolically hydrolyzed to provide the active entity. A further example of a prodrug is a short peptide (polyaminoacid) bonded to an acid group where the peptide is metabolized to reveal the active moiety. In certain embodiments, upon in vivo administration, a prodrug is chemically converted to the biologically, pharmaceutically or therapeutically active form of the compound. In certain embodiments, a prodrug is enzymatically metabolized by one or more steps or processes to the biologically, pharmaceutically or therapeutically active form of the compound.

Prodrugs of the compounds described herein include, but are not limited to, esters, ethers, carbonates, thiocarbonates, N-acyl derivatives, N-acyloxyalkyl derivatives, N-alkyloxyacyl derivatives, quaternary derivatives of tertiary amines, N-Mannich bases, Schiff bases, amino acid conjugates, phosphate esters, and sulfonate esters. See for example Design of Prodrugs, Bundgaard, A. Ed., Elseview, 1985 and Method in Enzymology, Widder, K. et al., Ed.; Academic, 1985, vol. 42, p. 309-396; Bundgaard, H. "Design and Application of Prodrugs" in A Textbook of Drug Design and Development, Krosgaard-Larsen and H. Bundgaard, Ed., 1991, Chapter 5, p. 113-191; and Bundgaard, H., Advanced Drug Delivery Review, 1992, 8, 1-38, each of which is incorporated herein by reference. In some embodiments, a hydroxyl group in the compounds disclosed herein is used to form a prodrug, wherein the hydroxyl group is incorporated into an acyloxyalkyl ester, alkoxycarbonyloxyalkyl ester, alkyl ester, aryl ester, phosphate ester, sugar ester, ether, and the like. In some embodiments, a hydroxyl group in the compounds disclosed herein is a prodrug wherein the hydroxyl is then metabolized in vivo to provide a carboxylic acid group. In some embodiments, a carboxyl group is used to provide an ester or amide (i.e. the prodrug), which is then metabolized in vivo to provide a carboxylic acid group. In some embodiments, compounds described herein are prepared as alkyl ester prodrugs.

Prodrug forms of the herein described compounds, wherein the prodrug is metabolized in vivo to produce a compound of Formula (I) as set forth herein are included within the scope of the claims. In some cases, some of the herein-described compounds is a prodrug for another derivative or active compound.

In some embodiments, any one of the hydroxyl group(s), amino group(s) and/or carboxylic acid group(s) are functionalized in a suitable manner to provide a prodrug moiety. In some embodiments, the prodrug moiety is as described above.

In additional or further embodiments, the compounds described herein are metabolized upon administration to an organism in need to produce a metabolite that is then used to produce a desired effect, including a desired therapeutic effect.

A "metabolite" of a compound disclosed herein is a derivative of that compound that is formed when the compound is metabolized. The term "active metabolite" refers to a biologically active derivative of a compound that is formed when the compound is metabolized. The term "metabolized," as used herein, refers to the sum of the processes (including, but not limited to, hydrolysis reactions and reactions catalyzed by enzymes) by which a particular substance is changed by an organism. Thus, enzymes may produce specific structural alterations to a compound. For example, cytochrome P450 catalyzes a variety of oxidative and reductive reactions while uridine diphosphate glucuronyltransferases catalyze the transfer of an activated glucuronic-acid molecule to aromatic alcohols, aliphatic alcohols, carboxylic acids, amines and free sulphydryl groups. Metabolites of the compounds disclosed herein are optionally identified either by administration of compounds to a host and analysis of tissue samples from the host, or by incubation of compounds with hepatic cells in vitro and analysis of the resulting compounds.

Synthesis of Compounds

Compounds of Formula (I) described herein are synthesized using standard synthetic techniques or using methods known in the art in combination with methods described herein.

Unless otherwise indicated, conventional methods of mass spectroscopy, NMR, HPLC, protein chemistry, biochemistry, recombinant DNA techniques and pharmacology are employed.

Compounds are prepared using standard organic chemistry techniques such as those described in, for example, March's Advanced Organic Chemistry, 6$^{th}$ Edition, John Wiley and Sons, Inc. Alternative reaction conditions for the synthetic transformations described herein may be employed such as variation of solvent, reaction temperature, reaction time, as well as different chemical reagents and other reaction conditions.

In some embodiments, compounds described herein are prepared as described in Scheme A.

Scheme A

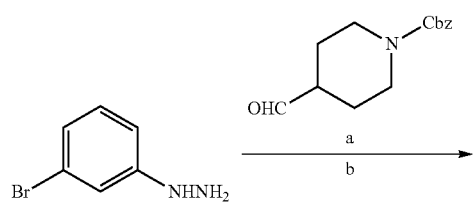

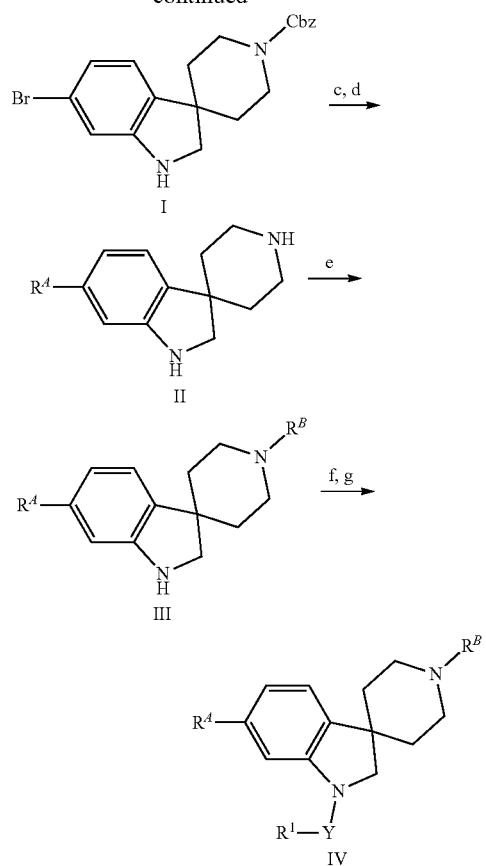

a) TFA, DCM; b) NaBH$_4$; c) R$^A$B(OH)$_2$, Pd(DtBPF)Cl$_2$, K$_2$CO$_3$, Dioxane/H$_2$O; d) TFA; e) R$^B$X, DIEA; f) R$^1$CO$_2$H, HATU, TEA, or R$^1$NH$_2$, triphosgene, R$^1$CHO, NaBH$_3$CN, or R$^1$SO$_3$H, triphosgene, TEA; g) deprotection if R1 contains protecting group The spiro[indoline-3,4'-piperidine] I is obtained by Fischer-indole synthesis with (3-bromophenyl)hydrazine and benzyl 4-formylpiperidine-1-carboxylate in the presence of TFA, and reduction of the indole intermediate. Compound I is subjected to an organometallic coupling reaction such as Suzuki-Miyaura reaction with R$^A$B(OH)$_2$ or its corresponding ester and is followed by a standard deprotection to generate compound II. Compound II is converted to the intermediate III by reacting with R$^B$X in the presence of an organic base. Subsequently, HATU-activated amide coupling with R$^1$CO$_2$H, triphosgene activated urea formation with R$^1$NH$_2$, reductive amination with R$^1$CHO, or triphosgene activated sulfonylation with R$^1$SO$_3$H yields the final compound IV. In some cases, an additional deprotection from R$^1$ is required to obtain compound IV after the amide formation.

In some embodiments, compounds described herein are prepared as described in Scheme B.

Scheme B

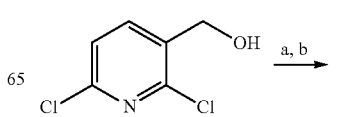

-continued

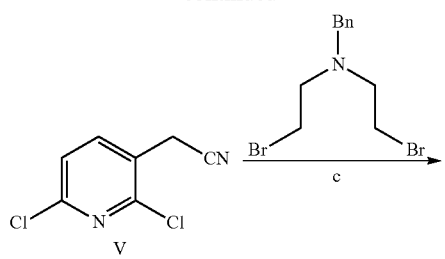

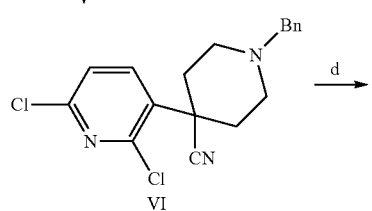

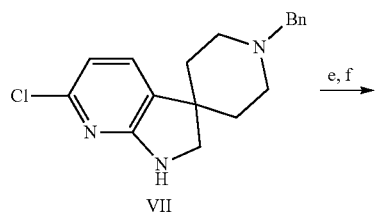

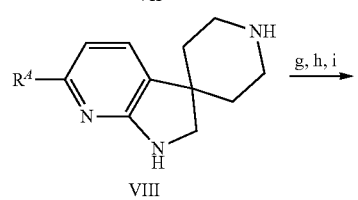

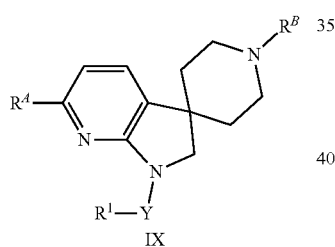

a) MsCl, DIEA; b) NaCN; c) KOH, DMSO; d) LiAl(t-BuO)₃H, dioxane;
e) R^A B(OH)₂, Pd(DtBPF)Cl₂, K₂CO₃, Dioxane/H₂O; f) Pd(OH)₂, Pd/C;
g) R^B X, DIEA; h) R¹CO₂H, HATU, TEA, or R¹NH₂, triphosgene, or R¹CHO, NaBH₃CN; i) deprotection Starting from (2,6-dichloropyridin-3-yl)methanol, the acetonitrile V is obtained by treating the mesyl intermediate with sodium cyanide. A one-pot condensation of the bis(2-bromoethyl)amine and compound V in the presence of a strong inorganic base such as KOH efficiently produce the piperidinyl intermediate VI. The primary amine from cyano group reduction smoothly undergoes an intramolecular cyclization to yield the azaspiroindoline VII, which is subjected to an organometallic coupling reaction such as Suzuki-Miyaura reaction with $R^A B(OH)_2$ or its corresponding ester, and then a standard de-benzylation to produce compound VIII. Subsequently, the final compound IX is obtained from a similar manner as described in step e & f in Scheme A. In some cases, an additional deprotection from $R^1$ is required to obtain compound IX after the urea formation.

In some embodiments, compounds described herein are prepared as described in Scheme C.

Scheme C

a) NaOH, H₂O₂, DMSO; b) KOH, DMSO; c) R^A B(OH)₂, Pd(DtBPF)Cl₂, K₂CO₃, Dioxane/H₂O; d) Pd(OH)₂, Pd/C; e) R^B X, DIEA; f) R¹X, K₂CO₃; g) deprotection Hydrolysis of the cyano yields the amide intermediate X, which is subjected to an intramolecular cyclization in the presence of a strong inorganic base such as KOH to produce the azaspiroindolinone XI. An organometallic coupling reaction such as Suzuki-Miyaura reaction with $R^A B(OH)_2$ or its corresponding ester and then a standard de-benzylation yield compound XII. It is converted to compound XIII by reacting with $R^B X$ in the presence of an organic base. Subsequently, N-alkylation with $R^1 X$ yields compound XIV. If $R^1$ contains a protecting group, then an additional deprotection step takes place to produce XIV.

In some embodiments, compounds described herein are prepared as described in Scheme D.

Scheme D

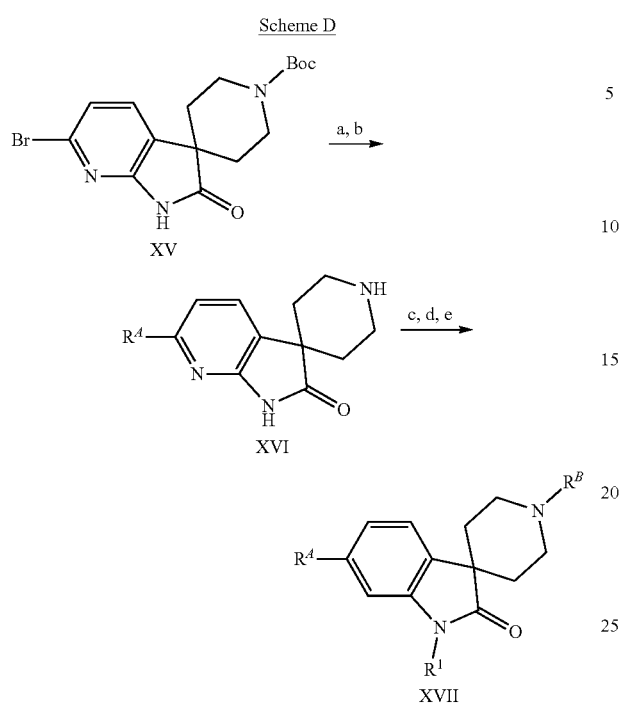

a) $R^AB(OH)_2$, Pd(DtBPF)Cl$_2$, K$_2$CO$_3$, Dioxane/H$_2$O; b) TFA, DCM;
c) $R^BX$, DIEA; d) $R^1X$, K$_2$CO$_3$; e) deprotection Compound XV from a commercial source is subjected to Suzuki-Miyaura coupling reaction with $R^AB(OH)_2$ and deprotection, yielding the intermediate XVI. The conversion to XVII is achieved by a similar manner as described by step e & f in Scheme C. If $R^1$ contains a protecting group, then an additional deprotection step takes place to produce XVII.

In some embodiments, compounds described herein are prepared as described in Scheme E.

Scheme E

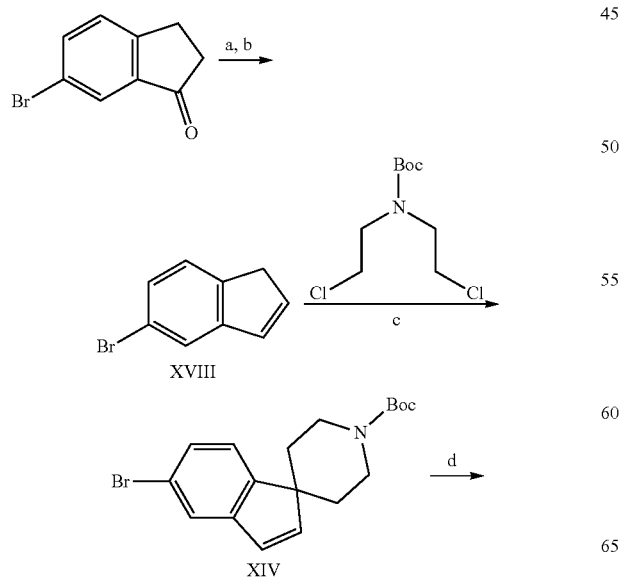

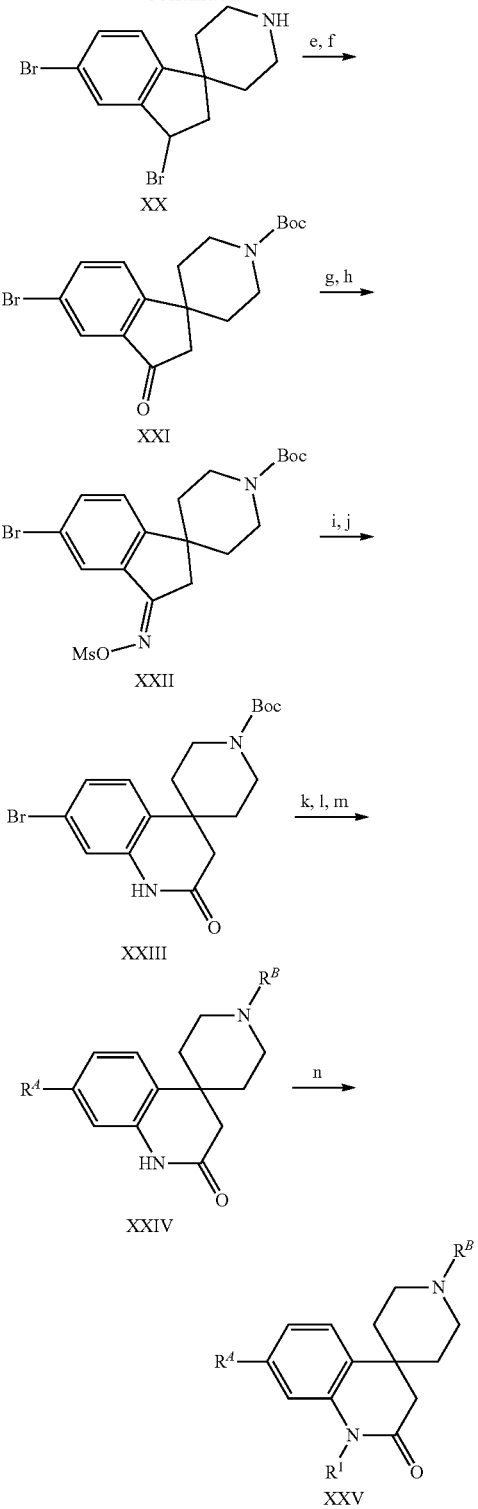

a) NaBH$_4$, EtOH; b) 40% H$_2$SO$_4$ (aq); c) LiHMDS, THF; d) 35% HBr/AcOH, DCM; e) Boc$_2$O, 40% NaOH (aq); (f) Dess-Martin periodinane, DCM; g) NH$_2$OH•HCl, NaOAc, EtOH; h) MsCl, TEA, DCM; i) AlCl$_3$, DCE; j) Boc$_2$O, NaHCO$_3$; k) TFA, DCM; l) $R^BX$, DIEA; m) $R^AB(OH)_2$, or $R^AB(OR)_2$, Pd(dtbpf)Cl$_2$, K$_2$CO$_3$, dioxane/H$_2$O; n) $R^1X$, NaH, DMF.

The starting material, indanone was reduced by NaBH$_4$ to give the corresponding alcohol and followed by dehydration of the alcohol in the presence of sulfuric acid to give indene, XVIII. Next, spiro-piperidinyl ring formation was occurred at the benzylic position of indene to give XIV. Alkene, XIV can be converted to ketone, XXI by hydrobromination of alkene, hydroxylation of alkyl bromide, and Dess-Martin oxidation of alcohol. $AlCl_3$-catalyzed ring expansion of O-mesylated indanone oxime affords dihydroquinolinone, XXIII. Next, deprotection was set for $S_NAr$ reaction with $R^BX$. Following Suzuki-Miyaura reaction with $R^AB(OH)_2$ or its corresponding ester provides XXIV. Subsequently, the final compound XXV is obtained from $S_N2$ reaction with $R^BX$ in the presence of an organic base.

In some embodiments, compounds described herein are synthesized as outlined in the Examples.

Certain Terminology

Unless otherwise stated, the following terms used in this application have the definitions given below. The use of the term "including" as well as other forms, such as "include", "includes," and "included," is not limiting. The section headings used herein are for organizational purposes only and are not to be construed as limiting the subject matter described.

As used herein, $C_1$-$C_x$ includes $C_1$-$C_2$, $C_1$-$C_3$ ... $C_1$-$C_x$. By way of example only, a group designated as "$C_1$-$C_6$" indicates that there are one to six carbon atoms in the moiety, i.e. groups containing 1 carbon atom, 2 carbon atoms, 3 carbon atoms or 4 carbon atoms. Thus, by way of example only, "$C_1$-$C_4$ alkyl" indicates that there are one to four carbon atoms in the alkyl group, i.e., the alkyl group is selected from among methyl, ethyl, propyl, iso-propyl, n-butyl, iso-butyl, sec-butyl, and t-butyl.

An "alkyl" group refers to an aliphatic hydrocarbon group. The alkyl group is branched or straight chain. In some embodiments, the "alkyl" group has 1 to 10 carbon atoms, i.e. a $C_1$-$C_{10}$alkyl. Whenever it appears herein, a numerical range such as "1 to 10" refers to each integer in the given range; e.g., "1 to 10 carbon atoms" means that the alkyl group consist of 1 carbon atom, 2 carbon atoms, 3 carbon atoms, etc., up to and including 10 carbon atoms, although the present definition also covers the occurrence of the term "alkyl" where no numerical range is designated. In some embodiments, an alkyl is a $C_1$-$C_6$alkyl. In one aspect the alkyl is methyl, ethyl, propyl, iso-propyl, n-butyl, iso-butyl, sec-butyl, or t-butyl. Typical alkyl include, but are in no way limited to, methyl, ethyl, propyl, isopropyl, butyl, isobutyl, sec-butyl, tertiary butyl, pentyl, neopentyl, or hexyl.

An "alkylene" group refers to a divalent alkyl radical. Any of the above mentioned monovalent alkyl groups may be an alkylene by abstraction of a second hydrogen atom from the alkyl. In some embodiments, an alkelene is a $C_1$-$C_6$alkylene. In other embodiments, an alkylene is a $C_1$-$C_4$alkylene. Typical alkylene groups include, but are not limited to, —$CH_2$—, —$CH_2CH_2$—, —$CH_2CH_2CH_2$—, —$CH_2CH_2CH_2CH_2$—, and the like. In some embodiments, an alkylene is —$CH_2$—.

An "alkoxy" group refers to a (alkyl)O— group, where alkyl is as defined herein.

The term "alkylamine" refers to the —$N(alkyl)_xH_y$ group, where x is 0 and y is 2, or where x is 1 and y is 1, or where x is 2 and y is 0.

An "hydroxyalkyl" refers to an alkyl in which one hydrogen atom is replaced by a hydroxyl. In some embodiments, a hydroxyalkyl is a $C_1$-$C_4$hydroxyalkyl. Typical hydroxyalkyl groups include, but are not limited to, —$CH_2OH$, —$CH_2CH_2OH$, —$CH_2CH_2CH_2OH$, —$CH_2CH_2CH_2CH_2OH$, and the like.

An "aminoalkyl" refers to an alkyl in which one hydrogen atom is replaced by an amino. In some embodiments, aminoalkyl is a $C_1$-$C_4$aminoalkyl. Typical aminoalkyl groups include, but are not limited to, —$CH_2NH_2$, —$CH_2CH_2NH_2$, —$CH_2CH_2CH_2NH_2$, —$CH_2CH_2CH_2CH_2NH_2$, and the like.

The term "alkenyl" refers to a type of alkyl group in which at least one carbon-carbon double bond is present. In one embodiment, an alkenyl group has the formula —$C(R)$=$CR_2$, wherein R refers to the remaining portions of the alkenyl group, which may be the same or different. In some embodiments, R is H or an alkyl. In some embodiments, an alkenyl is selected from ethenyl (i.e., vinyl), propenyl (i.e., allyl), butenyl, pentenyl, pentadienyl, and the like. Non-limiting examples of an alkenyl group include —$CH$=$CH_2$, —$C(CH_3)$=$CH_2$, —$CH$=$CHCH_3$, —$C(CH_3)$=$CHCH_3$, and —$CH_2CH$=$CH_2$.

The term "alkynyl" refers to a type of alkyl group in which at least one carbon-carbon triple bond is present. In one embodiment, an alkenyl group has the formula —$C{\equiv}C$—$R$, wherein R refers to the remaining portions of the alkynyl group. In some embodiments, R is H or an alkyl. In some embodiments, an alkynyl is selected from ethynyl, propynyl, butynyl, pentynyl, hexynyl, and the like. Non-limiting examples of an alkynyl group include —$C{\equiv}CH$, —$C{\equiv}CCH_3$—, $C{\equiv}CCH_2CH_3$, —$CH_2C{\equiv}CH$.

The term "heteroalkyl" refers to an alkyl group in which one or more skeletal atoms of the alkyl are selected from an atom other than carbon, e.g., oxygen, nitrogen (e.g. —NH—, —N(alkyl)-, sulfur, or combinations thereof. A heteroalkyl is attached to the rest of the molecule at a carbon atom of the heteroalkyl. In one aspect, a heteroalkyl is a $C_1$-$C_6$heteroalkyl.

The term "aromatic" refers to a planar ring having a delocalized π-electron system containing $4n+2\pi$ electrons, where n is an integer. The term "aromatic" includes both carbocyclic aryl ("aryl", e.g., phenyl) and heterocyclic aryl (or "heteroaryl" or "heteroaromatic") groups (e.g., pyridine). The term includes monocyclic or fused-ring polycyclic (i.e., rings which share adjacent pairs of carbon atoms) groups.

The term "carbocyclic" or "carbocycle" refers to a ring or ring system where the atoms forming the backbone of the ring are all carbon atoms. The term thus distinguishes carbocyclic from "heterocyclic" rings or "heterocycles" in which the ring backbone contains at least one atom which is different from carbon. In some embodiments, a carbocycle is a monocyclic carbocycle or a bicyclic carbocycle. In some embodiments, a carbocycle is a monocyclic carbocycle. Carbocycles are non-aromatic or aromatic. Non-aromatic carbocycles are saturated or partially unsaturated. In some embodiments, a carbocycle is a bicyclic carbocycle. In some embodiments, at least one of the two rings of a bicyclic carbocycle is aromatic. In some embodiments, both rings of a bicyclic carbocycle are aromatic. Carbocycles include aryls and cycloalkyls.

As used herein, the term "aryl" refers to an aromatic ring wherein each of the atoms forming the ring is a carbon atom. In one aspect, aryl is phenyl or a naphthyl. In some embodiments, an aryl is a phenyl. In some embodiments, an aryl is a phenyl, naphthyl, indanyl, indenyl, or tetrahydronaphthyl. In some embodiments, an aryl is a $C_6$-$C_{10}$aryl. Depending on the structure, an aryl group is a monoradical or a diradical (i.e., an arylene group).

The term "cycloalkyl" refers to a monocyclic, bicyclic or polycyclic aliphatic, non-aromatic radical, wherein each of the atoms forming the ring (i.e. skeletal atoms) is a carbon atom. In some embodiments, cycloalkyls are spirocyclic or bridged compounds. In some embodiments, cycloalkyls are optionally fused with an aromatic ring, and the point of attachment is at a carbon that is not an aromatic ring carbon atom. Cycloalkyl groups include groups having from 3 to 10 ring atoms. In some embodiments, cycloalkyl groups are selected from among cyclopropyl, cyclobutyl, cyclopentyl, cyclopentenyl, cyclohexyl, cyclohexenyl, cycloheptyl, cyclooctyl, spiro[2.2]pentyl, norbornyl, norbornenyl, bicycle[1.1.1]pentyl, adamantyl, norbornyl, norbornenyl, decalinyl, or 7,7-dimethyl-bicyclo[2.2.1]heptanyl. In some embodiments, a cycloalkyl is a $C_3$-$C_6$cycloalkyl. In some embodiments, a cycloalkyl is a monocyclic cycloalkyl. Monocyclic cycloalkyls include, but are not limited to, cyclopropyl, cyclobutyl, cyclopentyl, cyclohexyl, cycloheptyl, and cyclooctyl. Polycyclic cycloalkyls include, for example, adamantyl, norbornyl (i.e., bicyclo[2.2.1]heptanyl), norbornenyl, decalinyl, 7,7-dimethyl-bicyclo[2.2.1]heptanyl, and the like.

The term "halo" or, alternatively, "halogen" or "halide" means fluoro, chloro, bromo or iodo. In some embodiments, halo is fluoro, chloro, or bromo.

The term "fluoroalkyl" refers to an alkyl in which one or more hydrogen atoms are replaced by a fluorine atom. In one aspect, a fluoroalkyl is a $C_1$-$C_6$fluoroalkyl.

The term "heterocycle" or "heterocyclic" refers to heteroaromatic rings (also known as heteroaryls) and heterocycloalkyl rings containing one to four heteroatoms in the ring(s), where each heteroatom in the ring(s) is selected from O, S and N, wherein each heterocyclic group has from 3 to 10 atoms in its ring system, and with the proviso that any ring does not contain two adjacent O or S atoms. Non-aromatic heterocyclic groups (also known as heterocycloalkyls) include rings having 3 to 10 atoms in its ring system and aromatic heterocyclic groups include rings having 5 to 10 atoms in its ring system. The heterocyclic groups include benzo-fused ring systems. Examples of non-aromatic heterocyclic groups are pyrrolidinyl, tetrahydrofuranyl, dihydrofuranyl, tetrahydrothienyl, oxazolidinonyl, tetrahydropyranyl, dihydropyranyl, tetrahydrothiopyranyl, piperidinyl, morpholinyl, thiomorpholinyl, thioxanyl, piperazinyl, aziridinyl, azetidinyl, oxetanyl, thietanyl, homopiperidinyl, oxepanyl, thiepanyl, oxazepinyl, diazepinyl, thiazepinyl, 1,2,3,6-tetrahydropyridinyl, pyrrolin-2-yl, pyrrolin-3-yl, indolinyl, 2H-pyranyl, 4H-pyranyl, dioxanyl, 1,3-dioxolanyl, pyrazolinyl, dithianyl, dithiolanyl, dihydropyranyl, dihydrothienyl, dihydrofuranyl, pyrazolidinyl, imidazolinyl, imidazolidinyl, 3-azabicyclo[3.1.0]hexanyl, 3-azabicyclo[4.1.0]heptanyl, 3H-indolyl, indolin-2-onyl, isoindolin-1-onyl, isoindoline-1,3-dionyl, 3,4-dihydroisoquinolin-1(2H)-onyl, 3,4-dihydroquinolin-2(1H)-onyl, isoindoline-1,3-dithionyl, benzo[d]oxazol-2(3H)-onyl, 1H-benzo[d]imidazol-2(3H)-onyl, benzo[d]thiazol-2(3H)-onyl, and quinolizinyl. Examples of aromatic heterocyclic groups are pyridinyl, imidazolyl, pyrimidinyl, pyrazolyl, triazolyl, pyrazinyl, tetrazolyl, furyl, thienyl, isoxazolyl, thiazolyl, oxazolyl, isothiazolyl, pyrrolyl, quinolinyl, isoquinolinyl, indolyl, benzimidazolyl, benzofuranyl, cinnolinyl, indazolyl, indolizinyl, phthalazinyl, pyridazinyl, triazinyl, isoindolyl, pteridinyl, purinyl, oxadiazolyl, thiadiazolyl, furazanyl, benzofurazanyl, benzothiophenyl, benzothiazolyl, benzoxazolyl, quinazolinyl, quinoxalinyl, naphthyridinyl, and furopyridinyl. The foregoing groups are either C-attached (or C-linked) or N-attached where such is possible. For instance, a group derived from pyrrole includes both pyrrol-1-yl (N-attached) or pyrrol-3-yl (C-attached). Further, a group derived from imidazole includes imidazol-1-yl or imidazol-3-yl (both N-attached) or imidazol-2-yl, imidazol-4-yl or imidazol-5-yl (all C-attached). The heterocyclic groups include benzo-fused ring systems. Non-aromatic heterocycles are optionally substituted with one or two oxo (=O) moieties, such as pyrrolidin-2-one. In some embodiments, at least one of the two rings of a bicyclic heterocycle is aromatic. In some embodiments, both rings of a bicyclic heterocycle are aromatic.

The terms "heteroaryl" or, alternatively, "heteroaromatic" refers to an aryl group that includes one or more ring heteroatoms selected from nitrogen, oxygen and sulfur. Illustrative examples of heteroaryl groups include monocyclic heteroaryls and bicyclcic heteroaryls. Monocyclic heteroaryls include pyridinyl, imidazolyl, pyrimidinyl, pyrazolyl, triazolyl, pyrazinyl, tetrazolyl, furyl, thienyl, isoxazolyl, thiazolyl, oxazolyl, isothiazolyl, pyrrolyl, pyridazinyl, triazinyl, oxadiazolyl, thiadiazolyl, and furazanyl. Monocyclic heteroaryls include indolizine, indole, benzofuran, benzothiophene, indazole, benzimidazole, purine, quinolizine, quinoline, isoquinoline, cinnoline, phthalazine, quinazoline, quinoxaline, 1,8-naphthyridine, and pteridine. In some embodiments, a heteroaryl contains 0-4 N atoms in the ring. In some embodiments, a heteroaryl contains 1-4 N atoms in the ring. In some embodiments, a heteroaryl contains 0-4 N atoms, 0-1 O atoms, and 0-1 S atoms in the ring. In some embodiments, a heteroaryl contains 1-4 N atoms, 0-1 O atoms, and 0-1 S atoms in the ring. In some embodiments, heteroaryl is a $C_1$-$C_9$heteroaryl. In some embodiments, monocyclic heteroaryl is a $C_1$-$C_5$heteroaryl. In some embodiments, monocyclic heteroaryl is a 5-membered or 6-membered heteroaryl. In some embodiments, bicyclic heteroaryl is a $C_6$-$C_9$heteroaryl.

A "heterocycloalkyl" group refers to a cycloalkyl group that includes at least one heteroatom selected from nitrogen, oxygen and sulfur. In some embodiments, a heterocycloalkyl is fused with an aryl or heteroaryl. In some embodiments, the heterocycloalkyl is oxazolidinonyl, pyrrolidinyl, tetrahydrofuranyl, tetrahydrothienyl, tetrahydropyranyl, tetrahydrothiopyranyl, piperidinyl, morpholinyl, thiomorpholinyl, piperazinyl, piperidin-2-onyl, pyrrolidine-2,5-dithionyl, pyrrolidine-2,5-dionyl, pyrrolidinonyl, imidazolidinyl, imidazolidin-2-onyl, or thiazolidin-2-onyl. The term heterocycloalkyl also includes all ring forms of the carbohydrates, including but not limited to the monosaccharides, the disaccharides and the oligosaccharides. In one aspect, a heterocycloalkyl is a $C_2$-$C_{10}$heterocycloalkyl. In another aspect, a heterocycloalkyl is a $C_4$-$C_{10}$heterocycloalkyl. In some embodiments, a heterocycloalkyl contains 0-2 N atoms in the ring. In some embodiments, a heterocycloalkyl contains 0-2 N atoms, 0-2 O atoms and 0-1 S atoms in the ring.

The term "bond" or "single bond" refers to a chemical bond between two atoms, or two moieties when the atoms joined by the bond are considered to be part of larger substructure. In one aspect, when a group described herein is a bond, the referenced group is absent thereby allowing a bond to be formed between the remaining identified groups.

The term "moiety" refers to a specific segment or functional group of a molecule. Chemical moieties are often recognized chemical entities embedded in or appended to a molecule.

The term "optionally substituted" or "substituted" means that the referenced group is optionally substituted with one or more additional group(s) individually and independently selected from halogen, —CN, —NH$_2$, —NH(alkyl), —N(alkyl)$_2$, —OH, —CO$_2$H, —CO$_2$alkyl, —C(=O)NH$_2$, —C(=O)NH(alkyl), —C(=O)N(alkyl)$_2$, —S(=O)$_2$NH$_2$, —S(=O)$_2$NH(alkyl), —S(=O)$_2$N(alkyl)$_2$, alkyl, cycloalkyl, fluoroalkyl, heteroalkyl, alkoxy, fluoroalkoxy, heterocycloalkyl, aryl, heteroaryl, aryloxy, alkylthio, arylthio, alkylsulfoxide, arylsulfoxide, alkylsulfone, and arylsulfone. In some other embodiments, optional substituents are independently selected from halogen, —CN, —NH$_2$, —NH(CH$_3$), —N(CH$_3$)$_2$, —OH, —CO$_2$H, —CO$_2$(C$_1$-C$_4$alkyl), —C(=O)NH$_2$, —C(=O)NH(C$_1$-C$_4$alkyl), —C(=O)N(C$_1$-C$_4$alkyl)$_2$, —S(=O)$_2$NH$_2$, —S(=O)$_2$NH(C$_1$-C$_4$alkyl), —S(=O)$_2$N(C$_1$-C$_4$alkyl)$_2$, C$_1$-C$_4$alkyl, C$_3$-C$_6$cycloalkyl, C$_1$-C$_4$fluoroalkyl, C$_1$-C$_4$heteroalkyl, C$_1$-C$_4$alkoxy, C$_1$-C$_4$fluoroalkoxy, —SC$_1$-C$_4$alkyl, —S(=O)C$_1$-C$_4$alkyl, and —S(=O)$_2$C$_1$-C$_4$alkyl. In some other embodiments, optional substituents are independently selected from halogen, —CN, —NH$_2$, —NH(CH$_3$), —N(CH$_3$)$_2$, —OH, —CO$_2$H, —CO$_2$(C$_1$-C$_4$alkyl), —C(=O)NH$_2$, —C(=O)NH(C$_1$-C$_4$alkyl), —C(=O)N(C$_1$-C$_4$alkyl)$_2$, —S(=O)$_2$NH$_2$, —S(=O)$_2$NH(C$_1$-C$_4$alkyl), —S(=O)$_2$N(C$_1$-C$_4$alkyl)$_2$, C$_1$-C$_4$alkyl, C$_3$-C$_6$cycloalkyl, C$_2$-C$_6$heterocycloalkyl, C$_1$-C$_4$fluoroalkyl, C$_1$-C$_4$heteroalkyl, C$_1$-C$_4$alkoxy, C$_1$-C$_4$fluoroalkoxy, —SC$_1$-C$_4$alkyl, —S(=O)C$_1$-C$_4$alkyl, and —S(=O)$_2$C$_1$-C$_4$alkyl. In some embodiments, optional substituents are independently selected from halogen, —CN, —NH$_2$, —OH, —NH(CH$_3$), —N(CH$_3$)$_2$, —CH$_3$, —CH$_2$CH$_3$, —CF$_3$, —OCH$_3$, and —OCF$_3$. In some embodiments, substituted groups are substituted with one or two of the preceding groups. In some embodiments, an optional substituent on an aliphatic carbon atom (acyclic or cyclic) includes oxo (=O).

The term "acceptable" with respect to a formulation, composition or ingredient, as used herein, means having no persistent detrimental effect on the general health of the subject being treated.

The term "modulate" as used herein, means to interact with a target either directly or indirectly so as to alter the activity of the target, including, by way of example only, to enhance the activity of the target, to inhibit the activity of the target, to limit the activity of the target, or to extend the activity of the target.

The term "modulator" as used herein, refers to a molecule that interacts with a target either directly or indirectly. The interactions include, but are not limited to, the interactions of an agonist, partial agonist, an inverse agonist, antagonist, degrader, or combinations thereof. In some embodiments, a modulator is an agonist.

The terms "administer," "administering", "administration," and the like, as used herein, refer to the methods that may be used to enable delivery of compounds or compositions to the desired site of biological action. These methods include, but are not limited to oral routes, intraduodenal routes, parenteral injection (including intravenous, subcutaneous, intraperitoneal, intramuscular, intravascular or infusion), topical and rectal administration. Those of skill in the art are familiar with administration techniques that can be employed with the compounds and methods described herein. In some embodiments, the compounds and compositions described herein are administered orally.

The terms "co-administration" or the like, as used herein, are meant to encompass administration of the selected therapeutic agents to a single patient, and are intended to include treatment regimens in which the agents are administered by the same or different route of administration or at the same or different time.

The terms "effective amount" or "therapeutically effective amount," as used herein, refer to a sufficient amount of an agent or a compound being administered, which will relieve to some extent one or more of the symptoms of the disease or condition being treated. The result includes reduction and/or alleviation of the signs, symptoms, or causes of a disease, or any other desired alteration of a biological system. For example, an "effective amount" for therapeutic uses is the amount of the composition comprising a compound as disclosed herein required to provide a clinically significant decrease in disease symptoms. An appropriate "effective" amount in any individual case is optionally determined using techniques, such as a dose escalation study.

The terms "enhance" or "enhancing," as used herein, means to increase or prolong either in potency or duration a desired effect. Thus, in regard to enhancing the effect of therapeutic agents, the term "enhancing" refers to the ability to increase or prolong, either in potency or duration, the effect of other therapeutic agents on a system. An "enhancing-effective amount," as used herein, refers to an amount adequate to enhance the effect of another therapeutic agent in a desired system.

The term "pharmaceutical combination" as used herein, means a product that results from the mixing or combining of more than one active ingredient and includes both fixed and non-fixed combinations of the active ingredients. The term "fixed combination" means that the active ingredients, e.g. a compound of Formula (I), or a pharmaceutically acceptable salt thereof, and a co-agent, are both administered to a patient simultaneously in the form of a single entity or dosage. The term "non-fixed combination" means that the active ingredients, e.g. a compound of Formula (I), or a pharmaceutically acceptable salt thereof, and a co-agent, are administered to a patient as separate entities either simultaneously, concurrently or sequentially with no specific intervening time limits, wherein such administration provides effective levels of the two compounds in the body of the patient. The latter also applies to cocktail therapy, e.g. the administration of three or more active ingredients.

The terms "article of manufacture" and "kit" are used as synonyms.

The term "subject" or "patient" encompasses mammals. Examples of mammals include, but are not limited to, any member of the Mammalian class: humans, non-human primates such as chimpanzees, and other apes and monkey species; farm animals such as cattle, horses, sheep, goats, swine; domestic animals such as rabbits, dogs, and cats; laboratory animals including rodents, such as rats, mice and guinea pigs, and the like. In one aspect, the mammal is a human.

The terms "treat," "treating" or "treatment," as used herein, include alleviating, abating or ameliorating at least one symptom of a disease or condition, preventing additional symptoms, inhibiting the disease or condition, e.g., arresting the development of the disease or condition, relieving the disease or condition, causing regression of the disease or condition, relieving a condition caused by the disease or condition, or stopping the symptoms of the disease or condition either prophylactically and/or therapeutically.

Pharmaceutical Compositions

In some embodiments, the compounds described herein are formulated into pharmaceutical compositions. Pharmaceutical compositions are formulated in a conventional manner using one or more pharmaceutically acceptable inactive ingredients that facilitate processing of the active compounds into preparations that are used pharmaceutically. Proper formulation is dependent upon the route of administration chosen. A summary of pharmaceutical compositions described herein is found, for example, in Remington: The Science and Practice of Pharmacy, Nineteenth Ed (Easton, Pa.: Mack Publishing Company, 1995); Hoover, John E., Remington's Pharmaceutical Sciences, Mack Publishing Co., Easton, Pennsylvania 1975; Liberman, H. A. and Lachman, L., Eds., Pharmaceutical Dosage Forms, Marcel Decker, New York, N.Y., 1980; and Pharmaceutical Dosage Forms and Drug Delivery Systems, Seventh Ed. (Lippincott Williams & Wilkins 1999), herein incorporated by reference for such disclosure.

In some embodiments, the compounds described herein are administered either alone or in combination with pharmaceutically acceptable carriers, excipients or diluents, in a pharmaceutical composition. Administration of the compounds and compositions described herein can be effected by any method that enables delivery of the compounds to the site of action. These methods include, though are not limited to delivery via enteral routes (including oral, gastric or duodenal feeding tube, rectal suppository and rectal enema), parenteral routes (injection or infusion, including intraarterial, intracardiac, intradermal, intraduodenal, intramedullary, intramuscular, intraosseous, intraperitoneal, intrathecal, intravascular, intravenous, intravitreal, epidural and subcutaneous), inhalational, transdermal, transmucosal, sublingual, buccal and topical (including epicutaneous, dermal, enema, eye drops, ear drops, intranasal, vaginal) administration, although the most suitable route may depend upon for example the condition and disorder of the recipient. By way of example only, compounds described herein can be administered locally to the area in need of treatment, by for example, local infusion during surgery, topical application such as creams or ointments, injection, catheter, or implant. The administration can also be by direct injection at the site of a diseased tissue or organ.

In some embodiments, pharmaceutical compositions suitable for oral administration are presented as discrete units such as capsules, cachets or tablets each containing a predetermined amount of the active ingredient; as a powder or granules; as a solution or a suspension in an aqueous liquid or a non-aqueous liquid; or as an oil-in-water liquid emulsion or a water-in-oil liquid emulsion. In some embodiments, the active ingredient is presented as a bolus, electuary or paste.

Pharmaceutical compositions which can be used orally include tablets, push-fit capsules made of gelatin, as well as soft, sealed capsules made of gelatin and a plasticizer, such as glycerol or sorbitol. Tablets may be made by compression or molding, optionally with one or more accessory ingredients. Compressed tablets may be prepared by compressing in a suitable machine the active ingredient in a free-flowing form such as a powder or granules, optionally mixed with binders, inert diluents, or lubricating, surface active or dispersing agents. Molded tablets may be made by molding in a suitable machine a mixture of the powdered compound moistened with an inert liquid diluent. In some embodiments, the tablets are coated or scored and are formulated so as to provide slow or controlled release of the active ingredient therein. All formulations for oral administration should be in dosages suitable for such administration. The push-fit capsules can contain the active ingredients in admixture with filler such as lactose, binders such as starches, and/or lubricants such as talc or magnesium stearate and, optionally, stabilizers. In soft capsules, the active compounds may be dissolved or suspended in suitable liquids, such as fatty oils, liquid paraffin, or liquid polyethylene glycols. In some embodiments, stabilizers are added.

Dragee cores are provided with suitable coatings. For this purpose, concentrated sugar solutions may be used, which may optionally contain gum arabic, talc, polyvinyl pyrrolidone, carbopol gel, polyethylene glycol, and/or titanium dioxide, lacquer solutions, and suitable organic solvents or solvent mixtures. Dyestuffs or pigments may be added to the tablets or Dragee coatings for identification or to characterize different combinations of active compound doses.

In some embodiments, pharmaceutical compositions are formulated for parenteral administration by injection, e.g., by bolus injection or continuous infusion. Formulations for injection may be presented in unit dosage form, e.g., in ampoules or in multi-dose containers, with an added preservative. The compositions may take such forms as suspensions, solutions or emulsions in oily or aqueous vehicles, and may contain formulatory agents such as suspending, stabilizing and/or dispersing agents. The compositions may be presented in unit-dose or multi-dose containers, for example sealed ampoules and vials, and may be stored in powder form or in a freeze-dried (lyophilized) condition requiring only the addition of the sterile liquid carrier, for example, saline or sterile pyrogen-free water, immediately prior to use. Extemporaneous injection solutions and suspensions may be prepared from sterile powders, granules and tablets of the kind previously described.

Pharmaceutical compositions for parenteral administration include aqueous and non-aqueous (oily) sterile injection solutions of the active compounds which may contain antioxidants, buffers, bacteriostats and solutes which render the formulation isotonic with the blood of the intended recipient; and aqueous and non-aqueous sterile suspensions which may include suspending agents and thickening agents. Suitable lipophilic solvents or vehicles include fatty oils such as sesame oil, or synthetic fatty acid esters, such as ethyl oleate or triglycerides, or liposomes. Aqueous injection suspensions may contain substances which increase the viscosity of the suspension, such as sodium carboxymethyl cellulose, sorbitol, or dextran. Optionally, the suspension may also contain suitable stabilizers or agents which increase the solubility of the compounds to allow for the preparation of highly concentrated solutions.

Pharmaceutical compositions may also be formulated as a depot preparation. Such long acting formulations may be administered by implantation (for example subcutaneously or intramuscularly) or by intramuscular injection. Thus, for example, the compounds may be formulated with suitable polymeric or hydrophobic materials (for example, as an emulsion in an acceptable oil) or ion exchange resins, or as sparingly soluble derivatives, for example, as a sparingly soluble salt.

For buccal or sublingual administration, the compositions may take the form of tablets, lozenges, pastilles, or gels formulated in conventional manner. Such compositions may comprise the active ingredient in a flavored basis such as sucrose and acacia or tragacanth.

Pharmaceutical compositions may be administered topically, that is by non-systemic administration. This includes the application of a compound of the present invention externally to the epidermis or the buccal cavity and the instillation of such a compound into the ear, eye and nose, such that the compound does not significantly enter the blood stream. In contrast, systemic administration refers to oral, intravenous, intraperitoneal and intramuscular administration.

Pharmaceutical compositions suitable for topical administration include liquid or semi-liquid preparations suitable for penetration through the skin to the site of inflammation such as gels, liniments, lotions, creams, ointments or pastes, and drops suitable for administration to the eye, ear or nose. The active ingredient may comprise, for topical administration, from 0.001% to 10% w/w, for instance from 1% to 2% by weight of the formulation.

Pharmaceutical compositions for administration by inhalation are conveniently delivered from an insufflator, nebulizer pressurized packs or other convenient means of delivering an aerosol spray. Pressurized packs may comprise a suitable propellant such as dichlorodifluoromethane, trichlorofluoromethane, dichlorotetrafluoroethane, carbon dioxide or other suitable gas. In the case of a pressurized aerosol, the dosage unit may be determined by providing a valve to deliver a metered amount. Alternatively, for administration by inhalation or insufflation, pharmaceutical preparations may take the form of a dry powder composition, for example a powder mix of the compound and a suitable powder base such as lactose or starch. The powder composition may be presented in unit dosage form, in for example, capsules, cartridges, gelatin or blister packs from which the powder may be administered with the aid of an inhalator or insufflator.

In addition to the ingredients particularly mentioned above, the compounds and compositions described herein may include other agents conventional in the art having regard to the type of formulation in question, for example those suitable for oral administration may include flavoring agents.

Methods of Dosing and Treatment Regimens

In one embodiment, the compounds of Formula (I), or a pharmaceutically acceptable salt thereof, are used in the preparation of medicaments for the treatment of diseases or conditions in a mammal that would benefit from modulation of melanocortin receptor activity. Methods for treating any of the diseases or conditions described herein in a mammal in need of such treatment, involves administration of pharmaceutical compositions that include at least one compound of Formula (I) or a pharmaceutically acceptable salt, active metabolite, prodrug, or pharmaceutically acceptable solvate thereof, in therapeutically effective amounts to said mammal.

In certain embodiments, the compositions containing the compound(s) described herein are administered for prophylactic and/or therapeutic treatments. In certain therapeutic applications, the compositions are administered to a patient already suffering from a disease or condition, in an amount sufficient to cure or at least partially arrest at least one of the symptoms of the disease or condition. Amounts effective for this use depend on the severity and course of the disease or condition, previous therapy, the patient's health status, weight, and response to the drugs, and the judgment of the treating physician. Therapeutically effective amounts are optionally determined by methods including, but not limited to, a dose escalation and/or dose ranging clinical trial.

In prophylactic applications, compositions containing the compounds described herein are administered to a patient susceptible to or otherwise at risk of a particular disease, disorder or condition. Such an amount is defined to be a "prophylactically effective amount or dose." In this use, the precise amounts also depend on the patient's state of health, weight, and the like. When used in patients, effective amounts for this use will depend on the severity and course of the disease, disorder or condition, previous therapy, the patient's health status and response to the drugs, and the judgment of the treating physician. In one aspect, prophylactic treatments include administering to a mammal, who previously experienced at least one symptom of the disease being treated and is currently in remission, a pharmaceutical composition comprising a compound of Formula (I), or a pharmaceutically acceptable salt thereof, in order to prevent a return of the symptoms of the disease or condition.

In certain embodiments wherein the patient's condition does not improve, upon the doctor's discretion the administration of the compounds are administered chronically, that is, for an extended period of time, including throughout the duration of the patient's life in order to ameliorate or otherwise control or limit the symptoms of the patient's disease or condition.

Once improvement of the patient's conditions has occurred, a maintenance dose is administered if necessary. Subsequently, in specific embodiments, the dosage or the frequency of administration, or both, is reduced, as a function of the symptoms, to a level at which the improved disease, disorder or condition is retained. In certain embodiments, however, the patient requires intermittent treatment on a long-term basis upon any recurrence of symptoms.

The amount of a given agent that corresponds to such an amount varies depending upon factors such as the particular compound, disease condition and its severity, the identity (e.g., weight, sex) of the subject or host in need of treatment, but nevertheless is determined according to the particular circumstances surrounding the case, including, e.g., the specific agent being administered, the route of administration, the condition being treated, and the subject or host being treated.

In general, however, doses employed for adult human treatment are typically in the range of 0.01 mg-2000 mg per day. In one embodiment, the desired dose is conveniently presented in a single dose or in divided doses administered simultaneously or at appropriate intervals, for example as two, three, four or more sub-doses per day.

In one embodiment, the daily dosages appropriate for the compound of Formula (I), or a pharmaceutically acceptable salt thereof, described herein are from about 0.01 to about 50 mg/kg per body weight. In some embodiments, the daily dosage or the amount of active in the dosage form are lower or higher than the ranges indicated herein, based on a number of variables in regard to an individual treatment regime. In various embodiments, the daily and unit dosages are altered depending on a number of variables including, but not limited to, the activity of the compound used, the disease or condition to be treated, the mode of administration, the requirements of the individual subject, the severity of the disease or condition being treated, and the judgment of the practitioner.

Toxicity and therapeutic efficacy of such therapeutic regimens are determined by standard pharmaceutical procedures in cell cultures or experimental animals, including, but not limited to, the determination of the $LD_{50}$ and the $ED_{50}$. The dose ratio between the toxic and therapeutic effects is the therapeutic index and it is expressed as the ratio between $LD_{50}$ and $ED_{50}$. In certain embodiments, the data obtained from cell culture assays and animal studies are used in formulating the therapeutically effective daily dosage range and/or the therapeutically effective unit dosage amount for use in mammals, including humans. In some embodiments, the daily dosage amount of the compounds described herein lies within a range of circulating concentrations that include the $ED_{50}$ with minimal toxicity. In certain embodiments, the daily dosage range and/or the unit dosage amount varies within this range depending upon the dosage form employed and the route of administration utilized.

In any of the aforementioned aspects are further embodiments in which the effective amount of the compound of Formula (I), or a pharmaceutically acceptable salt thereof, is: (a) systemically administered to the mammal; and/or (b) administered orally to the mammal; and/or (c) intravenously administered to the mammal; and/or (d) administered by injection to the mammal; and/or (e) administered topically to the mammal; and/or (f) administered non-systemically or locally to the mammal.

In any of the aforementioned aspects are further embodiments comprising single administrations of the effective amount of the compound, including further embodiments in which (i) the compound is administered once a day; or (ii) the compound is administered to the mammal multiple times over the span of one day.

In any of the aforementioned aspects are further embodiments comprising multiple administrations of the effective amount of the compound, including further embodiments in which (i) the compound is administered continuously or intermittently: as in a single dose; (ii) the time between multiple administrations is every 6 hours; (iii) the compound is administered to the mammal every 8 hours; (iv) the compound is administered to the mammal every 12 hours; (v) the compound is administered to the mammal every 24 hours. In further or alternative embodiments, the method comprises a drug holiday, wherein the administration of the compound is temporarily suspended or the dose of the compound being administered is temporarily reduced; at the end of the drug holiday, dosing of the compound is resumed. In one embodiment, the length of the drug holiday varies from 2 days to 1 year.

Combination Treatments

In certain instances, it is appropriate to administer at least one compound of Formula (I), or a pharmaceutically acceptable salt thereof, in combination with one or more other therapeutic agents.

In one embodiment, the therapeutic effectiveness of one of the compounds described herein is enhanced by administration of an adjuvant (i.e., by itself the adjuvant has minimal therapeutic benefit, but in combination with another therapeutic agent, the overall therapeutic benefit to the patient is enhanced). Or, in some embodiments, the benefit experienced by a patient is increased by administering one of the compounds described herein with another agent (which also includes a therapeutic regimen) that also has therapeutic benefit.

In one specific embodiment, a compound of Formula (I), or a pharmaceutically acceptable salt thereof, is co-administered with a second therapeutic agent, wherein the compound of Formula (I), or a pharmaceutically acceptable salt thereof, and the second therapeutic agent modulate different aspects of the disease, disorder or condition being treated, thereby providing a greater overall benefit than administration of either therapeutic agent alone.

In any case, regardless of the disease, disorder or condition being treated, the overall benefit experienced by the patient is simply be additive of the two therapeutic agents or the patient experiences a synergistic benefit.

For combination therapies described herein, dosages of the co-administered compounds vary depending on the type of co-drug employed, on the specific drug employed, on the disease or condition being treated and so forth. In additional embodiments, when co-administered with one or more other therapeutic agents, the compound provided herein is administered either simultaneously with the one or more other therapeutic agents, or sequentially.

In combination therapies, the multiple therapeutic agents (one of which is one of the compounds described herein) are administered in any order or even simultaneously. If administration is simultaneous, the multiple therapeutic agents are, by way of example only, provided in a single, unified form, or in multiple forms (e.g., as a single pill or as two separate pills).

The compounds of Formula (I), or a pharmaceutically acceptable salt thereof, as well as combination therapies, are administered before, during or after the occurrence of a disease or condition, and the timing of administering the composition containing a compound varies. Thus, in one embodiment, the compounds described herein are used as a prophylactic and are administered continuously to subjects with a propensity to develop conditions or diseases in order to prevent the occurrence of the disease or condition. In another embodiment, the compounds and compositions are administered to a subject during or as soon as possible after the onset of the symptoms. In specific embodiments, a compound described herein is administered as soon as is practicable after the onset of a disease or condition is detected or suspected, and for a length of time necessary for the treatment of the disease. In some embodiments, the length required for treatment varies, and the treatment length is adjusted to suit the specific needs of each subject.

Abbreviations

DIEA: N,N-diisopropylethylamine;
DMSO: dimethyl sulfoxide;
CuI: copper(I) iodide;
TBAF: tetra-n-butylammonium fluoride;
P(t-Bu)$_3$: tri-tert-buytlphosphine;
HBF$_4$: tetrafluoroboric acid;
DBU: 1,8-diazabicyclo[5.4.0]undec-7-ene;
Prep-HPLC: preparative high performance liquid chromatography;
TFA: trifluoroacetic acid;
CH$_3$CN: acetonitrile;
MeOD: deuterated methanol;
CDCl$_3$: deuterated chloroform
DME: 1,2-dimethoxyethane;
H$_2$O: water;
KOAc: potassium acetate;
NaOAc: sodium acetate;
Cs$_2$CO$_3$: cesium carbonate
P-TsOH: p-toluenesulfonic acid;
NaNO$_2$: sodium nitrate;
THF: tetrahydrofuran;
HFIP: 1,1,1,3,3,3-hexafluoro-2-propanol;
NBS: N-bromosuccinimide;
4 Å MS: 4 Å molecular sieves
DPPA: diphenyl phosphoryl azide
Br$_2$: bromine;
AgF: silver fluoride;
LiAlH$_4$: lithium aluminium hydride;
LiHMDS: lithium bis(trimethylsilyl)amide
IBX: 2-iodoxybenzoic acid;
CDI: 1,1'-carbonyldiimidazole
TEA: trimethylamine;
HOBT: hydroxybenzotriazole;
EDCI: 1-ethyl-3-(3-dimethylaminopropyl)carbodiimide;
Pd(PPh$_3$)$_4$: tetrakis(triphenylphosphine)palladium(O)
Pd(OH)$_2$: palladium hydroxide
Pd(PPh$_3$)$_2$Cl$_2$: bis(triphenylphosphine)palladium(II) dichloride;
Pd(dppf)Cl$_2$: [1,1'-Bis(diphenylphosphino)ferrocene]dichloropalladium(II);

PdAMphos or Pd (amphos)Cl$_2$ or: bis(di-tert-butyl(4-dimethylaminophenyl)phosphine)dichloropalladium (II);
Pd(DTBPF)Cl$_2$: [1,1'-bis(di-tert-butylphosphino)ferrocene]dichloropalladium(II);
Pd$_2$(dba)$_3$·CHCl$_3$: tris(dibenzylideneacetone)dipalladium (0)-chloroform adduct
XPhos: 2-dicyclohexylphosphino-2',4',6'-triisopropylbiphenyl
rt: room temperature;
h: hour or hours;
Cpd: compound.

EXAMPLES

The following examples are provided for illustrative purposes only and not to limit the scope of the claims provided herein.

Synthesis of Compounds

Example 1: 2-[1-(3-aminopropanoyl)-6-(2-ethoxypyridin-3-yl)-1,2-dihydrospiro[indole-3,4'-piperidin]-1'-yl]-5-(trifluoromethyl)benzonitrile (cpd 1-3)

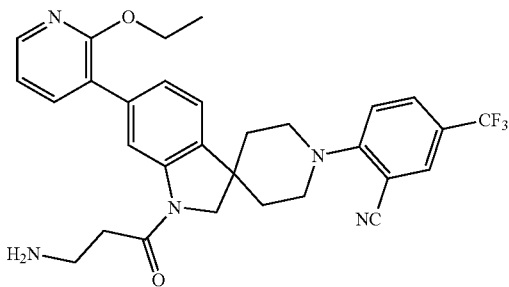 [SMILES: CCOc1ncccc1-c1ccc2c(c1)N(C(=O)CCN)CC21CCN(c2ccc(C(F)(F)F)cc2C#N)CC1]

Step 1-1, preparation of benzyl 6-bromo-1,2-dihydrospiro[indole-3,4'-piperidine]-1'-carboxylate: Into a 250-mL round-bottom flask purged, were placed benzyl 4-formylpiperidine-1-carboxylate (2.9 g, 12 mmol) and DCM (30 mL). The resulting solution was treated with (3-bromophenyl)hydrazine (2.0 g, 11 mmol) and then TFA (2.5 mL) at 0° C. The reaction mixture was stirred at 40° C. for 18 h and cooled to rt. After cooling to 0° C., the reaction was treated with NaBH$_4$ (0.82 g, 22 mmol) in several portions and stirred for 30 min. The resulting solution was diluted with water (20 mL) and added sat.-NaHCO$_3$ to adjust the pH to 8-9. The solution was extracted with CH$_2$Cl$_2$ (2×). The combined organic layers were washed with brine, dried over anhydrous sodium sulfate and concentrated. The residue was applied onto a silica gel column with ethyl acetate/petroleum ether (1:3). This resulted in the title compound (1.3 g, 30%) as yellow oil. LCMS (M+H)$^+$=401.1.

Step 1-2, preparation of benzyl 6-(2-ethoxypyridin-3-yl)-1,2-dihydrospiro[indole-3,4'-piperidine]-1'-carboxylate: Into a 100-mL round-bottom flask purged and maintained with an inert atmosphere of nitrogen, were placed benzyl 6-bromo-1,2-dihydrospiro[indole-3,4'-piperidine]-1'-carboxylate (650 mg, 1.62 mmol) and dioxane/H$_2$O (8.0 mL/0.8 mL). To the resulting solution was added (2-ethoxypyridin-3-yl)boronic acid (540 mg, 3.23 mmol), Pd(DtBPF)Cl$_2$ (63 mg, 0.06 Eq), and K$_2$CO$^3$ (675 mg, 4.88 mmol) under N$_2$. The reaction mixture was degassed with N$_2$ for 5 min and stirred at 80° C. for 1 h. The reaction was cooled to rt, and the solid ppts were filtered out. The filtrate was concentrated under vacuum. The residue was applied onto a silica gel column with ethyl acetate/petroleum ether (1:1). This resulted in the title compound (600 mg, 84%) as yellow oil. LCMS (M+H)+=444.2.

Step 1-3, preparation of 6-(2-ethoxypyridin-3-yl)-1,2-dihydrospiro[indole-3,4'-piperidine]: Into a 100-mL round-bottom flask purged and maintained with an inert atmosphere of nitrogen, were placed benzyl 6-(2-ethoxypyridin-3-yl)-1,2-dihydrospiro[indole-3,4'-piperidine]-1'-carboxylate (600 mg, 1.35 mmol), wet 10%-Pd/C (80 mg), EtOH (6 mL) and EtOAc (6 mL). Hydrogen was bubbled into the reaction. The resulting solution was stirred at rt for 4 h and then filtered through a pad of Celite. The filtrate was concentrated to afford the title compound (400 mg, 95%) as yellow solid. LCMS (M+H)+=310.2.

Step 1-4, preparation of 2-[6-(2-ethoxypyridin-3-yl)-1,2-dihydrospiro[indole-3,4'-piperidin]-1'-yl]-5-(trifluoromethyl)benzonitrile: Into a 8-mL vial, were placed 6-(2-ethoxypyridin-3-yl)-1,2-dihydrospiro[indole-3,4'-piperidine] (170 mg, 0.55 mmol), 2-fluoro5-(trifluoromethyl)benzonitrile (104 mg, 0.55 mmol), DIEA (213 mg, 1.65 mmol), and DMSO (2 mL). The resulting mixture was stirred at 50° C. for 1 h and cooled to rt. The reaction was directly purified by Prep-HPLC to afford the title compound (150 mg, 57%) as a white solid. LCMS (M+H)+=479.1.

Step 1-5, preparation of tert-butyl N-(3-{1'-[2-cyano-4-(trifluoromethyl)phenyl]-6-(2-ethoxypyridin-3-yl)-1,2-dihydrospiro[indole-3,4'-piperidin]-1'-yl}-3-oxopropyl)carbamate: To a solution of 3-[(tert-butoxycarbonyl)amino]propanoic acid (28 mg, 0.15 mmol) in DMF (1 mL) was added HATU (56 mg, 0.15 mmol) and DIEA (60 mg, 0.46 mmol). The resulting mixture was stirred at rt for 10 min and then treated with 2-[6-(2-ethoxypyridin-3-yl)-1,2-dihydrospiro[indole-3,4'-piperidin]-1'-yl]-5-(trifluoromethyl)benzonitrile (70 mg, 0.15 mmol). The resulting reaction mixture was stirred at rt for 2 h, diluted with water (20 mL), and extracted with ethyl acetate (3×). The combined organic layers were washed with brine, dried over anhydrous sodium sulfate and concentrated under vacuum. The residue was applied onto a silica gel column with ethyl acetate/petroleum ether (1:1). This resulted in the title compound (65 mg, 68%) as a white solid. LCMS (M+H)+=650.2.

Step 1-6, preparation of 2-[1-(3-aminopropanoyl)-6-(2-ethoxypyridin-3-yl)-1,2-dihydrospiro[indole-3,4'-piperidin]-1'-yl]-5-(trifluoromethyl)benzonitrile formate: To a solution of tert-butyl N-(3-{1'-[2-cyano-4-(trifluoromethyl)phenyl]-6-(2-ethoxypyridin-3-yl)-1,2-dihydrospiro[indole-3,4'-piperidin]-1'-yl}-3-oxopropyl)carbamate (65 mg, 0.1 mmol) in DCM (1 mL) was added 4M-HCl in dioxane (1 mL). The resulting solution was stirred at rt for 1 h and concentrated under vacuum. The residue was purified by Prep-HPLC to afford the title compound (21 mg, 36%) as a white solid. LCMS (M+H)+=550.3.

The following compounds were prepared similarly to Example 1 with appropriate substituting reagents and substrates at different steps.

| Compound no. | MS (M + H)+ |
| --- | --- |
| 1-1 | 536.3 |
| 1-2 | 535.3 |
| 1-4 | 549.3 |
| 1-5 | 564.3 |
| 1-6 | 564.3 |

-continued

| Compound no. | MS (M + H)+ |
|---|---|
| 1-7 | 559.2 |
| 1-8 | 550.2 |
| 1-9 | 576.3 |
| 1-10 | 576.3 |
| 1-11 | 564.3 |
| 1-19 | 551.3 |
| 1-20 | 544.3 |
| 1-22 | 559.3 |
| 1-23 | 570.4 |
| 1-24 | 551.3 |
| 1-25 | 570.3 |
| 1-26 | 564.4 |
| 1-34 | 516.2 |
| 1-35 | 535.3 |
| 1-36 | 556.4 |
| 1-43 | 513.3 |
| 1-44 | 527.3 |

Example 2: 2-[6-(2-ethoxypyridin-3-yl)-1-[(3R)-1-methylpyrrolidin-3-yl]-2-oxo-1,2-dihydrospiro[indole-3,4'-piperidin]-1'-yl]-5-(trifluoromethyl)benzonitrile (cpd 1-21)

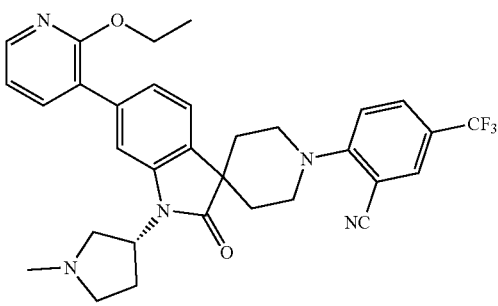 [SMILES: CCOc1ncccc1-c1ccc2c(c1)N([C@@H]1CCN(C)C1)C(=O)C21CCN(c2ccc(C(F)(F)F)cc2C#N)CC1]

Step 2-1, preparation of tert-butyl 6-(2-ethoxypyridin-3-yl)-2-oxo-1,2-dihydrospiro[indole-3,4'-piperidine]-1'-carboxylate: tert-Butyl 6-bromo-2-oxo-1,2-dihydrospiro[indole-3,4'-piperidine]-1'-carboxylate (300 mg, 0.79 mmol), (2-ethoxypyridin-3-yl)boronic acid (263 mg, 1.57 mmol), Pd(AMPhos)Cl₂ (56 mg, 0.1 eq), potassium carbonate (217 mg, 1.57 mmol) and dioxane/water (4 mL/0.4 mL) were charged into a heavy-wall tube. The resulting mixture was degassed with N₂ for 5 min, sealed, and stirred at 90° C. for 1.5 h. The reaction was cooled to rt, and concentrated. The residue was directly purified from a reverse phase C18 column chromatography to afford the title compound (290 mg, 87%). LCMS (M+H)+=424.3.

Step 2-2, preparation of 6-(2-ethoxypyridin-3-yl)-1,2-dihydrospiro[indole-3,4'-piperidin]-2-one: To a solution of tert-butyl 6-(2-ethoxypyridin-3-yl)-2-oxo-1,2-dihydrospiro[indole-3,4'-piperidine]-1'-carboxylate (190 mg, 0.45 mmol) in DCM (0.4 mL) was added TFA (0.1 mL) at rt. The resulting solution was stirred at rt for 1.5 h and then concentrated under a vacuum. The residue was dissolved in DMSO (1 mL) and neutralized with DIEA, which was used in the next step without further purification (140 mg, 96%). LCMS (M+H)+=324.4.

Step 2-3, preparation of 2-[6-(2-ethoxypyridin-3-yl)-2-oxo-1,2-dihydrospiro[indole-3,4'-piperidin]-1'-yl]-5-(trifluoromethyl)benzonitrile: 6-(2-ethoxypyridin-3-yl)-1,2-dihydrospiro[indole-3,4'-piperidin]-2-one (140 mg, 0.43 mmol), 2-fluoro-5-(trifluoromethyl)benzonitrile (164 mg, 0.87 mmol), DIEA (224 mg, 1.73 mmol), and DMSO (2 mL) were charged into a heavy-wall tube. The tube was sealed and then the resulting solution was stirred at 125° C. for 16 h. The reaction was cooled to rt, and then directly purified from a reverse phase C18 column chromatography to afford the title compound (190 mg, 89%). LCMS (M+H)+=493.3.

Step 2-4, preparation of tert-butyl (3R)-3-{1'-[2-cyano-4-(trifluoromethyl)phenyl]-6-(2-ethoxypyridin-3-yl)-2-oxo-1,2-dihydrospiro[indole-3,4'-piperidin]-1-yl}pyrrolidine-1-carboxylate: To a solution of 2-[6-(2-ethoxypyridin-3-yl)-2-oxo-1,2-dihydrospiro[indole-3,4'-piperidin]-1'-yl]-5-(trifluoromethyl)benzonitrile (30 mg, 0.061 mmol) and tert-butyl (S)-3-((methylsulfonyl)oxy)pyrrolidine-1-carboxylate (40 mg, 0.15 mmol) in DMF (1 mL) was added cesium carbonate (99 mg, 0.3 mmol) at rt. The resulting mixture was stirred at 90° C. for 3 h. The reaction was cooled to rt and filtered inorganic solids off. The filtrate was directly purified from reverse phase C18 column chromatography to afford the title compound (22 mg, 55%). LCMS (M+H)+=662.3.

Step 2-5, preparation of 2-[6-(2-ethoxypyridin-3-yl)-2-oxo-1-[(3R)-pyrrolidin-3-yl]-1,2-dihydrospiro[indole-3,4'-piperidin]-1'-yl]-5-(trifluoromethyl)benzonitrile (cpd 1-18): To a solution of tert-butyl (3R)-3-{1'-[2-cyano-4-(trifluoromethyl)phenyl]-6-(2-ethoxypyridin-3-yl)-2-oxo-1,2-dihydrospiro[indole-3,4'-piperidin]-1-yl}pyrrolidine-1-carboxylate (22 mg, 0.033 mmol) in DCM (0.4 mL) was added TFA (0.1 mL) at rt. The resulting solution was stirred at rt for 1 h and concentrated. The residue was purified from reverse phase C18 CC to afford the title compound (14 mg, 75%). LCMS (M+H)+=562.4.

Step 2-6, preparation of 2-[6-(2-ethoxypyridin-3-yl)-1-[(3R)-1-methylpyrrolidin-3-yl]-2-oxo-1,2-dihydrospiro[indole-3,4'-piperidin]-1'-yl]-5-(trifluoromethyl)benzonitrile: To a solution of 2-[6-(2-ethoxypyridin-3-yl)-2-oxo-1-[(3R)-pyrrolidin-3-yl]-1,2-dihydrospiro[indole-3,4'-piperidin]-1'-yl]-5-(trifluoromethyl)benzonitrile (11 mg, 0.02 mmol) in MeOH (1 mL) was added paraformaldehyde (12 mg, 0.39 mmol) and followed by sodium cyanotrihydroborate (12 mg, 0.2 mmol) at rt. The resulting solution was stirred at rt for 1 h. The reaction was quenched with TFA (0.1 mL) and directly purified from reverse phase C18 column chromatography to afford the title compound (6.0 mg, 53%). LCMS (M+H)+=576.5.

The following compounds were prepared similarly to Example 2 with appropriate substituting reagents and substrates at different steps.

| Compound no. | MS (M + H)+ |
|---|---|
| 1-15 | 550.5 |
| 1-16 | 536.4 |
| 1-17 | 562.4 |

Example 3: N-(2-aminoethyl)-1'-[2-cyano-4-(trifluoromethyl)phenyl]-6-(2-ethoxypyridin-3-yl)-1,2-dihydrospiro[indole-3,4'-piperidine]-1-carboxamide (cpd 1-27)

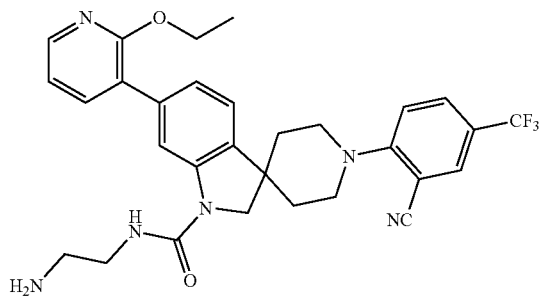 [SMILES: CCOc1ncccc1-c1ccc2c(c1)N(C(=O)NCCN)CC21CCN(c2ccc(C(F)(F)F)cc2C#N)CC1]

Step 3-1, preparation of 4-nitrophenyl 1'-[2-cyano-4-(trifluoromethyl)phenyl]-6-(2-ethoxypyridin-3-yl)-1,2-dihydrospiro[indole-3,4'-piperidine]-1-carboxylate: Into a 50-mL round-bottom flask purged, were placed 2-[6-(2-ethoxypyridin-3-yl)-1,2-dihydrospiro[indole-3,4'-piperidin]-1'-yl]-5-(trifluoromethyl)benzonitrile from step 1-4 in Example 1 (120 mg, 0.58 mmol), ACN (3.0 mL), sodium hydrogen carbonate (100 mg, 1.19 mmol), and 4-nitrophenyl carbonochloridate (120 mg, 0.60 mmol). The resulting solution was stirred at rt for 2 h, diluted with water (20 mL), and extracted with EtOAc (3×). The combined organic layers were washed with brine, dried over anhydrous sodium sulfate and concentrated. The residue was applied onto a silica gel column with ethyl acetate/petroleum ether (1:4). This resulted in the title compound (320 mg, 85%) as white solid. LCMS (M+H)$^+$=644.4.

Step 3-2, preparation of tert-butyl N-{2-[({1'-[2-cyano-4-(trifluoromethyl)phenyl]-6-(2-ethoxypyridin-3-yl)-1,2-dihydrospiro[indole-3,4'-piperidin]-1-yl}carbonyl)amino]ethyl}carbamate: To a solution of 4-nitrophenyl 1'-[2-cyano-4-(trifluoromethyl)phenyl]-6-(2-ethoxypyridin-3-yl)-1,2-dihydrospiro[indole-3,4'-piperidine]-1-carboxylate (55 mg, 0.085 mmol) in DMF (0.6 mL) was added tert-butyl (2-aminoethyl)carbamate (27 mg, 0.169 mmol) and TEA (26 mg, 0.257 mmol) under N$_2$ atmosphere. The resulting solution was stirred at 60° C. for 2 h and cooled to rt. The reaction was purified by Flash-Prep-HPLC to afford the title compound (40 mg, 70%) as yellow solid. LCMS (M+H)$^+$=665.5.

Step 3-3, preparation of N-(2-aminoethyl)-1'-[2-cyano-4-(trifluoromethyl)phenyl]-6-(2-ethoxypyridin-3-yl)-1,2-dihydrospiro[indole-3,4'-piperidine]-1-carboxamide formate: To a solution of tert-butyl N-{2-[({1'-[2-cyano-4-(trifluoromethyl)phenyl]-6-(2-ethoxypyridin-3-yl)-1,2-dihydrospiro[indole-3,4'-piperidin]-1-yl}carbonyl)amino]ethyl}carbamate (40 mg, 0.06 mmol) in DCM (2 mL) was added TFA (0.5 ml) at rt. The resulting solution was stirred at rt for 1 h and concentrated. The residue was purified by Prep-HPLC to afford the title compound (30 mg, 82%) as white solid. LCMS (M+H)$^+$=565.3.

The following compounds were prepared similarly to Example 3 with appropriate substituting reagents and substrates at different steps.

| Compound no. | MS (M + H)$^+$ |
|---|---|
| 1-30 | 579.3 |
| 1-31 | 579.3 |
| 1-32 | 591.3 |
| 1-33 | 591.3 |

Example 4: 2-[1-(2-aminoethanesulfonyl)-6-(2-ethoxypyridin-3-yl)-1,2-dihydrospiro[indole-3,4'-piperidin]-1'-yl]-5-(trifluoromethyl)benzonitrile (cpd 1-37)

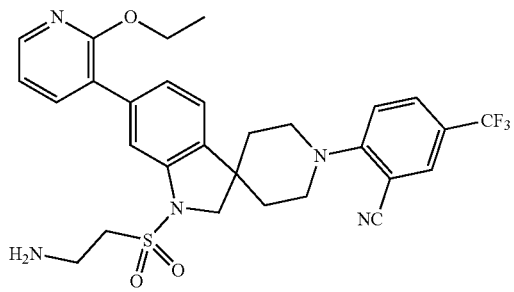 [SMILES: CCOc1ncccc1-c1ccc2c(c1)N(S(=O)(=O)CCN)CC21CCN(c2ccc(C(F)(F)F)cc2C#N)CC1]

Step 4-1, preparation of tetrabutylammonium 2-((tert-butoxycarbonyl)amino)ethane-1-sulfonate: Into a 8-mL vial, were placed 2-aminoethane-1-sulfonic acid (100 mg, 0.799 mmol) and water (1 mL). The reaction was treated with 50% aq.-tetrabutylammonium hydroxide (207 mg, 0.799 mmol), and followed by dropwise addition of di-tert-butyl dicarbonate (174 mg, 0.797 mmol) in acetone (3 mL) at rt. The resulting mixture was stirred at rt for 16 h. After removal of the volatile solvent, the aqueous phase was extracted with DCM (3×). The combined organic layers were washed with brine, dried over anhydrous sodium sulfate, and concentrated to afford the title compound (300 mg, 80%) as a yellow oil.

Step 4-2, preparation of tert-butyl N-[2-({1'-[2-cyano-4-(trifluoromethyl)phenyl]-6-(2-ethoxypyridin-3-yl)-1,2-dihydrospiro[indole-3,4'-piperidin]-1-yl}sulfonyl)ethyl]carbamate: To a solution of tetrabutylammonium 2-((tert-butoxycarbonyl)amino)ethane-1-sulfonate (50 mg, 0.11 mmol) and DMF (4.0 mg, 0.055 mmol) in DCM (2 mL) was added bis(trichloromethyl)-carbonate (12 mg, 0.040 mmol) at rt. The resulting solution was stirred at rt for 1 h and concentrated under vacuum. The crude intermediate was used in the next step without further purification. 2-[6-(2-Ethoxypyridin-3-yl)-1,2-dihydrospiro[indole-3,4'-piperidin]-1'-yl]-5-(trifluoromethyl)benzonitrile from step 1-4 in Example 1 (50 mg, 0.10 mmol), the crude intermediate described above, DCM (2 mL) and TEA (33 mg, 0.33 mmol) were placed into 8-mL vial. The resulting mixture was stirred at rt for 1 h, quenched with water (30 mL), and then extracted with EtOAc (3×). The combined organic layers were washed with brine, dried over anhydrous sodium sulfate and concentrated under vacuum. The residue was applied onto a silica gel column with ethyl acetate/petroleum ether (1:1) to afford the title compound (40 mg, 56%) as a yellow solid. LCMS (M+H)$^+$=686.2.

Step 4-3, preparation of 2-[1-(2-aminoethanesulfonyl)-6-(2-ethoxypyridin-3-yl)-1,2-dihydrospiro[indole-3,4'-piperidin]-1'-yl]-5-(trifluoromethyl)benzonitrile formate: To a solution of tert-butyl N-[2-({1'-[2-cyano-4-(trifluoromethyl)

phenyl]-6-(2-ethoxypyridin-3-yl)-1,2-dihydrospiro[indole-3,4'-piperidin]-1-yl}sulfonyl)ethyl]carbamate (40 mg, 0.058 mmol) in DCM (1 mL) was added TFA (0.2 mL) at rt. The resulting solution was stirred at rt for 1 h and then concentrated under vacuum. The residue was purified by Prep-HPLC to afford the title compound (17.6 mg, 48%) as white solid. LCMS (M+H)$^+$=586.2.

Example 5: 2-[1'-(2-aminoethyl)-6'-(2-ethoxypyridin-3-yl)-1',2'-dihydrospiro[piperidine-4,3'-pyrrolo[2,3-b]pyridin]-1-yl]-5-(trifluoromethyl)benzonitrile (cpd 1-29)

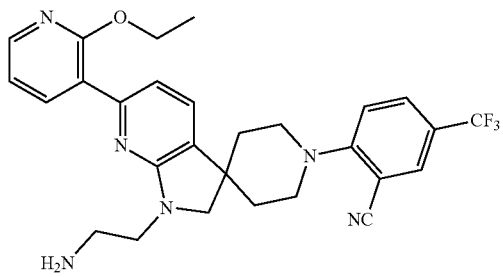 [SMILES: CCOc1ncccc1-c1ccc2c(n1)N(CCN)CC21CCN(c2ccc(C(F)(F)F)cc2C#N)CC1]

Step 5-1, preparation of (2,6-dichloropyridin-3-yl)methyl methanesulfonate: To a solution of (2,6-dichloropyridine-3-yl)methanol (3 g, 16.9 mmol) in DCM (40 mL) in 250 mL flask was added TEA (5.1 g, 50 mmol) and MsCl (3.1 g, 27 mmol) at 0° C. The resulting solution was stirred at rt for 1 h, and washed with sat. NaHCO$_3$ and brine. The organic layer was dried over anhydrous sodium sulfate, filtered and concentrated in vacuo. This resulted in the title compound (4.1 g, 100%), which is used in the next step without further purification. LCMS (M+H)$^+$=255.9.

Step 5-2, preparation of 2-(2,6-dichloropyridin-3-yl)acetonitrile: To a solution of (2,6-dichloropyridin-3-yl)methyl methanesulfonate (4.1 g, 16 mmol) in EtOH (90 mL) and water (10 mL) was added sodium cyanide (2.1 g, 43 mmol). The resulting mixture was stirred at 80° C. for 2 h, cooled to rt, diluted with water (20 mL), and extracted with EtOAc (3×). The combined organic layers were washed with brine, dried over anhydrous sodium sulfate, and concentrated in vacuo. The residue was applied onto a silica gel column with ethyl acetate/petroleum ether (EA: 0~30%) to afford the title compound (1.9 g, 63%) as a yellow solid. LCMS (M+H)$^+$=187.0.

Step 5-3, preparation of 1-benzyl-4-(2,6-dichloropyridin-3-yl)piperidine-4-carbonitrile: The mixture of 2-(2,6-dichloropyridin-3-yl)acetonitrile (1.3 g, 7.0 mmol), KOH (1.5 g, 27 mmol), and N-benzyl-2-bromo-N-(2-bromoethyl)ethan-1-amine (3.1 g, 9.7 mmol) in DMSO (20 mL) was stirred at 30° C. for 1 h. The reaction was diluted with water (20 mL) and extracted with EtOAc (3×). The combined organic layers were washed with brine, dried over anhydrous sodium sulfate, filtered and concentrated in vacuo. The residue was applied onto a silica gel column with ethyl acetate/petroleum ether (EA: 0~50%) to afford the title compound (1.2 g, 50%) as a dark green oil. LCMS (M+H)$^+$=346.0.

Step 5-4, preparation of 1-benzyl-6'-chloro-1',2'-dihydrospiro[piperidine-4,3'-pyrrolo[2,3-b]pyridine]: The mixture of 1-benzyl-4-(2,6-dichloropyridin-3-yl)piperidine-4-carbonitrile (1.2 g, 3.5 mmol) and aluminum(III) lithium tris(2-methylpropan-2-olate) hydride (3.0 g, 12 mmol) in dioxane (10 mL) was stirred at 100° C. for 15 h. The reaction was cooled to 0° C., quenched with 1N NaOH (20 mL), diluted with EtOAc (30 mL), and then filtered. The filtered cake was washed with EtOAc, and then the organic layer from the filtrate was separated. The organic layer was dried over anhydrous sodium sulfate, filtered and concentrated in vacuo. The residue was applied onto a silica gel column with ethyl acetate/petroleum ether (EA: 0~50%) to afford the title compound (0.7 g, 64%) as a light yellow solid. LCMS (M+H)$^+$=314.0.

Step 5-5, preparation of 1-benzyl-6'-(2-ethoxypyridin-3-yl)-1',2'-dihydrospiro[piperidine-4,3'-pyrrolo[2,3-b]pyridine]: 1-Benzyl-6'-chloro-1',2'-dihydrospiro[piperidine-4,3'-pyrrolo[2,3-b]pyridine] (0.4 g, 1.0 mmol), (2-ethoxypyridin-3-yl)boronic acid (0.46 g, 2.8 mmol), PdAMphos (90 mg, 0.1 eq.), potassium carbonate (0.63 g, 4.6 mmol) and dioxane (4 mL)/water (0.4 mL) were charged into a heavy-wall tube. The reaction mixture was degassed for 5 min with N$_2$, sealed, stirred at 100° C. for 1 h, and cooled to rt. The reaction was filtered through a pad of Celite, and the filtrate was concentrated in vacuo. The residue was applied onto a silica gel column with ethyl acetate/petroleum ether (EA: 0~55%) to afford the title compound (0.27 g, 54%) as a light yellow solid. LCMS (M+H)$^+$=401.1.

Step 5-6, preparation of 6'-(2-ethoxypyridin-3-yl)-1',2'-dihydrospiro[piperidine-4,3'-pyrrolo[2,3-b]pyridine]: The mixture of 1-benzyl-6'-(2-ethoxypyridin-3-yl)-1',2'-dihydrospiro[piperidine-4,3'-pyrrolo[2,3-b]pyridine] (0.27 g, 0.67 mmol), 10%-Pd/C (50 mg), and PdOH$_2$ (50 mg, 0.36 mmol) in MeOH (10 mL) was stirred at 30° C. for 0.5 h under H$_2$ (3 bar). The reaction mixture was filtered through a pad of Celite, and the filtrate was concentrated in vacuo to afford the title compound (0.21 g, 100%) as a brown oil, which was used in the next step without further purification. LCMS (M+H)$^+$=311.3.

Step 5-7, preparation of 2-[6'-(2-ethoxypyridin-3-yl)-1',2'-dihydrospiro[piperidine-4,3'-pyrrolo[2,3-b]pyridin]-1-yl]-5-(trifluoromethyl)benzonitrile: The mixture of 6'-(2-ethoxypyridin-3-yl)-1',2'-dihydrospiro[piperidine-4,3'-pyrrolo[2,3-b]pyridine] (0.21 g, 0.68 mmol), 2-fluoro-5-(trifluoromethyl)benzonitrile (0.28 g, 1.5 mmol), and DIEA (0.3 g, 2 mmol) in DMSO (3 mL) was stirred at 50° C. for 1 h. The reaction was cooled to rt and directly purified by Prep-HPLC to afford the title compound (0.16 g, 49%) as a light brown solid. LCMS (M+H)$^+$=480.2.

Step 5-8, preparation of tert-butyl N-(2-{1-[2-cyano-4-(trifluoromethyl)phenyl]-6'-(2-ethoxypyridin-3-yl)-1',2'-dihydrospiro[piperidine-4,3'-pyrrolo[2,3-b]pyridin]-1'-yl}ethyl)carbamate: The mixture of 2-[6'-(2-ethoxypyridin-3-yl)-1',2'-dihydrospiro[piperidine-4,3'-pyrrolo[2,3-b]pyridin]-1-yl]-5-(trifluoromethyl)benzonitrile (80 mg, 0.17 mmol), tert-butyl (2-oxoethyl)carbamate (62 mg, 0.39 mmol), acetic acid (195 mg, 3.25 mmol), and NaCNBH$_3$ (51 mg, 0.81 mmol) in DCE (0.6 mL) and MeOH (0.6 mL) was stirred at rt for 15 h. After removal of the volatile solvent, the residue was purified by Prep-HPLC to afford the title compound (73 mg, 70%) as a light brown solid. LCMS (M+H)$^+$=623.3.

Step 5-9, preparation of 2-[1'-(2-aminoethyl)-6'-(2-ethoxypyridin-3-yl)-1'2'-dihydrospiro[piperidine-4,3'-pyrrolo[2,3-b]pyridin]-1-yl]-5-(trifluoromethyl)benzonitrile formate: To a solution of tert-butyl N-(2-{1-[2-cyano-4-(trifluoromethyl)phenyl]-6'-(2-ethoxypyridin-3-yl)-1',2'-dihydrospiro[piperidine-4,3'-pyrrolo[2,3-b]pyridin]-1'-yl}ethyl)carbamate (73 mg, 0.12 mmol) in DCM (1 mL) was added TFA (0.25 mL) at rt. The reaction was stirred at rt for 1 h and then concentrated in vacuo. The residue was purified by prep-HPLC to afford the title compound (49 mg, 74%) as a white solid. LCMS (M+H)+=523.3.

The following compounds were prepared similarly to Example 5 with appropriate substituting reagents and substrates at different steps.

| Compound no. | MS (M + H)+ |
|---|---|
| 1-12 | 522.3 |
| 1-13 | 536.3 |
| 1-14 | 536.3 |
| 1-38 | 548.3 |
| 1-39 | 548.3 |
| 1-40 | 536.3 |
| 1-41 | 536.3 |
| 1-42 | 521.3 |
| 1-45 | 527.3 |
| 1-46 | 537.3 |
| 1-51 | 553.3 |
| 1-52 | 549.3 |
| 1-53 | 549.3 |
| 1-54 | 537.3 |

Example 6: 2-[6'-(2-ethoxypyridin-3-yl)-1'-[3-(methylamino)propanoyl]-1',2'-dihydrospiro[piperidine-4,3'-pyrrolo[2,3-b]pyridin]-1-yl]-5-(trifluoromethyl)benzonitrile (cpd 1-50)

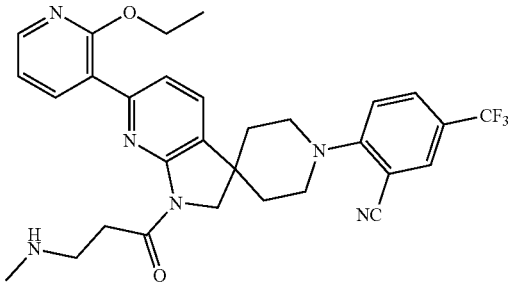 [SMILES: CCOc1ncccc1-c1ccc2c(n1)N(C(=O)CCNC)CC21CCN(c2ccc(C(F)(F)F)cc2C#N)CC1]

Step 6-1, preparation of tert-butyl N-(3-{1-[2-cyano-4-(trifluoromethyl)phenyl]-6'-(2-ethoxypyridin-3-yl)-1',2'-dihydrospiro[piperidine-4,3'-pyrrolo[2,3-b]pyridin]-1'-yl}-3-oxopropyl)-N-methylcarbamate: Into a 8-mL vial, were placed 3-[(tert-butoxycarbonyl) (methyl)amino]propanoic acid (55 mg, 0.27 mmol), HATU (61 mg, 0.16 mmol), DIEA (74 mg, 0.57 mmol) and DMF (1 mL). After stirring at rt for 5 min, the reaction was treated with 2-[6'-(2-ethoxypyridin-3-yl)-1',2'-dihydrospiro[piperidine-4,3'-pyrrolo[2,3-b]pyridin]-1-yl]-5-(trifluoromethyl)benzonitrile (60 mg, 0.13 mmol) from step 5-7 in Example 5. The resulting solution was stirred at rt for 1 h and then directly purified by Prep-HPLC to afford the title compound (56 mg, 67%) as a light yellow oil. LCMS (M+H)+=665.3.

Step 6-2, preparation of 2-[6'-(2-ethoxypyridin-3-yl)-1'-[3-(methylamino)propanoyl]-1',2'-dihydrospiro[piperidine-4,3'-pyrrolo[2,3-b]pyridin]-1-yl]-5-(trifluoromethyl)benzonitrile formate: To a solution of tert-butyl N-(3-{1-[2-cyano-4-(trifluoromethyl)phenyl]-6'-(2-ethoxypyridin-3-yl)-1',2'-dihydrospiro[piperidine-4,3'-pyrrolo[2,3-b]pyridin]-1'-yl}-3-oxopropyl)-N-methylcarbamate (56 mg, 0.084 mmol) in DCM (2 mL) was added TFA (0.4 mL) at rt. The resulting solution was stirred at rt for 1 h and concentrated. The residue was purified by prep-HPLC to afford the title compound (33.8 mg, 66%) as a white solid. LCMS (M+H)+=565.3.

The following compounds were prepared similarly to Example 6 with appropriate substituting reagents and substrates at different steps.

| Compound no. | MS (M + H)+ |
|---|---|
| 1-28 | 551.3 |
| 1-47 | 551.3 |
| 1-48 | 551.3 |
| 1-49 | 577.2 |
| 1-58 | 579.3 |

Example 7: 1-[2-cyano-4-(trifluoromethyl)phenyl]-6'-(2-ethoxypyridin-3-yl)-N-[2-(methylamino)ethyl]-1',2'-dihydrospiro[piperidine-4,3'-pyrrolo[2,3-b]pyridine]-1'-carboxamide (cpd 1-59)

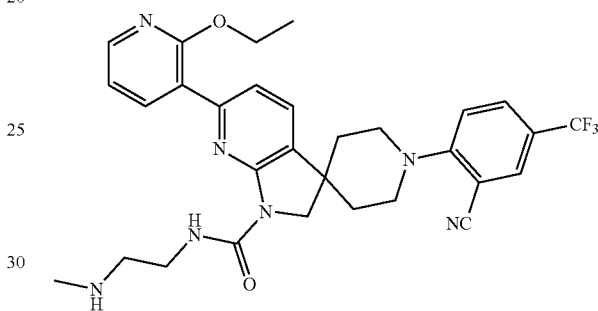

Step 7-1, preparation of 4-nitrophenyl 1-[2-cyano-4-(trifluoromethyl)phenyl]-6'-(2-ethoxypyridin-3-yl)-1',2'-dihydrospiro[piperidine-4,3'-pyrrolo[2,3-b]pyridine]-1'-carboxylate: To a solution of 2-[6'-(2-ethoxypyridin-3-yl)-1',2'-dihydrospiro[piperidine-4,3'-pyrrolo[2,3-b]pyridin]-1-yl]-5-(trifluoromethyl)benzonitrile (350 mg, 0.73 mmol) from step 5-7 in Example 5 in ACN (4 mL) was added sodium hydrogen carbonate (184 mg, 2.19 mmol) and 4-nitrophenyl carbonochloride (191 mg, 0.95 mmol) under $N_2$ atmosphere. The resulting solution was stirred at rt for 16 h, diluted with water (20 mL), and extracted with EtOAc (3×). The combined organic layers were washed with brine, dried over anhydrous sodium sulfate and concentrated. This resulted in the title compound (475 mg, 86%) as yellow solid, which is used in the next step without further purification. LCMS (M+H)+=645.3.

Step 7-2, preparation of tert-butyl N-{2-[({1-[2-cyano-4-(trifluoromethyl)phenyl]-6'-(2-ethoxypyridin-3-yl)-1',2'-dihydrospiro[piperidine-4,3'-pyrrolo[2,3-b]pyridin]-1'-yl}carbonyl)amino]ethyl}-N-methylcarbamate: Into a 8-mL vial, were placed 4-nitrophenyl 1-[2-cyano-4-(trifluoromethyl)phenyl]-6'-(2-ethoxypyridin-3-yl)-1',2'-dihydrospiro[piperidine-4,3'-pyrrolo[2,3-b]pyridine]-1'-carboxylate (100 mg, 0.15 mmol), TEA (48 mg, 0.47 mmol), tert-butyl (2-aminoethyl)(methyl)carbamate (27 mg, 0.15 mmol) and DMF (2 mL). The resulting mixture was stirred at 80° C. for 2 h and cooled to rt. The reaction was directly purified by Prep-HPLC to afford the title compound (60 mg, 57%) as a yellow oil. LCMS (M+H)+=680.3.

Step 7-3, preparation of 1-[2-cyano-4-(trifluoromethyl)phenyl]-6'-(2-ethoxypyridin-3-yl)-N-[2-(methylamino)ethyl]-1',2'-dihydrospiro[piperidine-4,3'-pyrrolo[2,3-b]pyridine]-1'-carboxamide formate: To a solution of tert-butyl N-{2-[({1-[2-cyano-4-(trifluoromethyl)phenyl]-6'-(2- ethoxypyridin-3-yl)-1',2'-dihydrospiro[piperidine-4,3'-pyrrolo[2,3-b]pyridin]-1'-yl}carbonyl)amino]ethyl}-N-methylcarbamate (60 mg, 0.088 mmol) in DCM (2 mL) was added TFA (0.4 mL) at rt. The resulting solution was stirred at rt for 1 h and concentrated. The residue was purified by Prep-HPLC to afford the title compound (42 mg, 76%) as a white solid. LCMS (M+H)+=580.3.

The following compounds were prepared similarly to Example 7 with appropriate substituting reagents and substrates at different steps.

| Compound no. | MS (M + H)+ |
|---|---|
| 1-55 | 566.3 |
| 1-56 | 580.3 |
| 1-57 | 592.3 |

Example 8: 2-[1'-(2-aminoethyl)-6'-(2-ethoxypyridin-3-yl)-2'-oxo-1',2'-dihydrospiro[piperidine-4,3'-pyrrolo[2,3-b]pyridin]-1-yl]-5-(trifluoromethyl)benzonitrile (cpd 1-60)

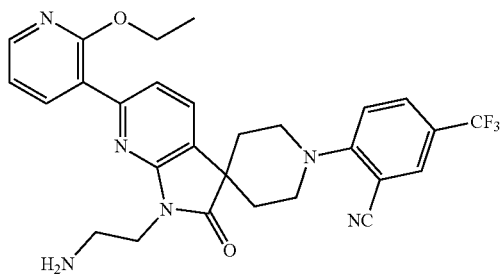 [SMILES: CCOc1ncccc1-c1ccc2c(n1)N(CCN)C(=O)C21CCN(c2ccc(C(F)(F)F)cc2C#N)CC1]

Step 8-1, preparation of 1-benzyl-4-(2,6-dichloropyridin-3-yl)piperidine-4-carboxamide: Into a 50-mL round-bottom flask. were placed 1-benzyl-4-(2,6-dichloropyridin-3-yl)piperidine-4-carbonitrile (1.0 g, 2.9 mmol) from step 5-3 in Example 5, DMSO (10 mL), 25% aq-NaOH (5.0 g, 31 mmol), and 30%-hydrogen peroxide (3.0 g, 26 mmol). The resulting mixture was stirred at 25° C. for 1 h and then quenched with water (100 mL). The resulting solution was extracted with ethyl acetate (3×). The combined organic layers were washed with brine, dried over anhydrous sodium sulfate and concentrated under vacuum. This resulted in the title compound (1.0 g, 90%) as a yellow solid. LCMS (M+H)+=364.2.

Step 8-2, preparation of 1-benzyl-6'-chloro-1',2'-dihydrospiro[piperidine-4,3'-pyrrolo[2,3-b]pyridin]-2'-one: Into a 50-mL round-bottom flask. were placed 1-benzyl-4-(2,6-dichloropyridin-3-yl)piperidine-4-carboxamide (1.0 g, 2.7 mmol), KOH (0.6 g, 10.7 mmol), and DMSO (10 mL). The resulting mixture was stirred at 25° C. for 2 h, quenched with water (100 mL), and extracted with ethyl acetate (3×). The combined organic layers were washed with brine, dried over anhydrous sodium sulfate and concentrated to afford the title compound (650 mg, 72%) as a yellow solid. LCMS (M+H)+=328.1.

Step 8-3, preparation of 1-benzyl-6'-(2-ethoxypyridin-3-yl)-1',2'-dihydrospiro[piperidine-4,3'-pyrrolo[2,3-b]pyridin]-2'-one: Into a heavy-wall tube, purged and maintained with an inert atmosphere of nitrogen, were added 1-benzyl-6'-chloro-1',2'-dihydrospiro[piperidine-4,3'-pyrrolo[2,3-b]pyridin]-2'-one (650 mg, 1.98 mmol), (2-ethoxypyridin-3-yl)boronic acid (331 mg, 1.98 mmol), Pd(DTBPF)Cl2 (129 mg, 0.1 eq), K2CO3 (822 mg, 5.95 mmol) and dioxane (7 mL)/H2O (0.7 mL). The resulting mixture was degassed with N2 for 5 min, sealed, and stirred at 80° C. for 1 h and cooled to rt. The reaction was diluted with water (50 mL) and extracted with ethyl acetate (3×). The combined organic layers were dried over anhydrous sodium sulfate and concentrated under vacuum. The residue was applied onto a silica gel column with ethyl acetate/petroleum ether (1:1). This resulted in the title compound (600 mg, 73%) as light yellow solid. LCMS (M+H)+=415.2.

Step 8-4, preparation of 6'-(2-ethoxypyridin-3-yl)-1',2'-dihydrospiro[piperidine-4,3'-pyrrolo[2,3-b]pyridin]-2'-one: To a solution of 1-benzyl-6'-(2-ethoxypyridin-3-yl)-1',2'-dihydrospiro[piperidine-4,3'-pyrrolo[2,3-b]pyridin]-2'-one (550 mg, 1.33 mmol) in MeOH (10 mL) was added 10%-Pd/C (140 mg) and Pd(OH)2 (186 mg, 1.32 mmol). The reaction flask was evacuated and flushed three times with nitrogen, followed by flushing with hydrogen. The mixture was stirred at rt for 2 h under hydrogen (balloon). The reaction was diluted with MeOH, and filtered through a pad of Celite. The filtrate was concentrated under vacuum to afford the title compound (300 mg, 70%) as a white oil. LCMS (M+H)+=325.2.

Step 8-5, preparation of 2-[6'-(2-ethoxypyridin-3-yl)-2'-oxo-1',2'-dihydrospiro[piperidine-4,3'-pyrrolo[2,3-b]pyridin]-1-yl]-5-(trifluoromethyl)benzonitrile: A solution of 6'-(2-ethoxypyridin-3-yl)-1',2'-dihydrospiro[piperidine-4,3'-pyrrolo[2,3-b]pyridin]-2'-one (280 mg, 0.86 mmol), 2-fluoro-5-(trifluoromethyl)benzonitrile (163 mg, 0.86 mmol) and DIEA (335 mg, 2.59 mmol) in DMSO (3 mL) was stirred at 50° C. for 1 h and cooled to rt. The reaction was purified by prep-HPLC to afford the title compound (240 mg, 56%) as a yellow oil. LCMS (M+H)+=494.3.

Step 8-6, preparation of tert-butyl N-(2-{1-[2-cyano-4-(trifluoromethyl)phenyl]-6'-(2-ethoxypyridin-3-yl)-2'-oxo-1',2'-dihydrospiro[piperidine-4,3'-pyrrolo[2,3-b]pyridin]-1'-yl}ethyl)carbamate: To a solution of 2-[6'-(2-ethoxypyridin-3-yl)-2'-oxo-1',2'-dihydrospiro[piperidine-4,3'-pyrrolo[2,3-b]pyridin]-1-yl]-5-(trifluoromethyl)benzonitrile (55 mg, 0.11 mmol) and tert-butyl (2-chloroethyl)carbamate (20 mg, 0.11 mmol) in DMF (1 mL) was added potassium carbonate (45 mg, 0.33 mmol). The resulting mixture was stirred at 70° C. for 1 h and cooled to rt. The reaction was filtered, and the filtrate was concentrated under vacuum. The residue was purified by prep-HPLC to afford the title compound (40 mg, 56%) as a white oil. LCMS (M+H)+=637.7.

Step 8-7, preparation of 2-[1'-(2-aminoethyl)-6'-(2-ethoxypyridin-3-yl)-2'-oxo-1',2'-dihydrospiro[piperidine-4,3'-pyrrolo[2,3-b]pyridin]-1-yl]-5-(trifluoromethyl)benzonitrile formate: To a solution of tert-butyl N-(2-{1-[2-cyano-4-(trifluoromethyl)phenyl]-6'-(2-ethoxypyridin-3-yl)-2'-oxo-1',2'-dihydrospiro[piperidine-4,3'-pyrrolo[2,3-b]pyridin]-1'-yl}ethyl)carbamate (40 mg, 0.063 mmol) in DCM (1 mL) was added TFA (0.25 mL) at rt. The resulting solution was stirred at rt for 1 h and then concentrated. The residue was purified by Prep-HPLC to afford the title compound (21 mg, 59%) as white solid. LCMS (M+H)+=537.2.

The following compounds were prepared similarly to Example 8 with appropriate substituting reagents and substrates at different steps.

| Compound no. | MS (M + H)+ |
|---|---|
| 1-61 | 551.2 |
| 1-62 | 565.3 |
| 1-63 | 551.2 |

Example 9: 2-[1'-(2-aminoethyl)-7'-(2-ethoxypyridin-3-yl)-2'-oxo-2',3'-dihydro-1'H-spiro[piperidine-4,4'-quinazolin]-1-yl]-5-(trifluoromethyl)benzonitrile (cpd 1-64)

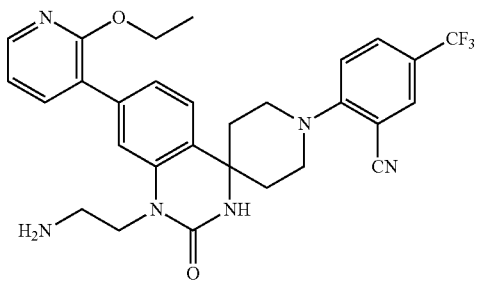 [SMILES: CCOc1ncccc1-c1ccc2c(c1)N(CCN)C(=O)NC21CCN(c2ccc(C(F)(F)F)cc2C#N)CC1]

Step 9-1, preparation of 1-benzyl-7'-bromo-1'H-spiro[piperidine-4,4'-quinazolin]-2'(3'H)-one: A mixture of 1-benzylpiperidin-4-one (2.0 g, 11 mmol) and 1-(3-bromophenyl)urea (1.8 g, 8.4 mmol) in PPA (15 mL) was heated at 120° C. for 1 h. The mixture was quenched with water (100 mL), basified with saturated NaHCO$_3$ (aq) to pH 9, and extracted with EtOAc (200 mL). The organic layer was dried over anhydrous sodium sulfate and concentrated in vacuo to dryness to give the title compound (2.3 g, 56% yield) as a light brown solid. LCMS (M+H)+=386.1.

Step 9-2, preparation of 1-benzyl-7'-(2-ethoxypyridin-3-yl)-1'H-spiro[piperidine-4,4'-quinazolin]-2'(3'H)-one: A mixture of 1-benzyl-7'-bromo-1'H-spiro[piperidine-4,4'-quinazolin]-2'(3'H)-one (2 g, 5 mmol), (2-ethoxypyridin-3-yl)boronic acid (2.1 g, 13 mmol), potassium carbonate (2.3 g, 17 mmol), and Pd(dtbpf)Cl$_2$ (0.29 g, 0.44 mmol) in 1,4-dioxane (20 mL) and water (2 mL) under nitrogen was heated at 80° C. for 1 h. The mixture was filtered through a pad of celite and concentrated in vacuo. The residue was purified by reversed-phase CC to give the title compound (0.44 g, 22% yield) as a light yellow solid. LCMS (M+H)+=429.3.

Step 9-3, preparation of 7'-(2-ethoxypyridin-3-yl)-1'H-spiro[piperidine-4,4'-quinazolin]-2'(3'H)-one: To a solution of 1-benzyl-7'-(2-ethoxypyridin-3-yl)-1'H-spiro[piperidine-4,4'-quinazolin]-2'(3'H)-one (0.44 g, 1.0 mmol) in MeOH (10 mL) was added Pd/C (80 mg, 0.8 mmol) and Pd(OH)$_2$ (90 mg, 0.6 mmol). The mixture was stirred at rt for 1.5 h under H$_2$ (3 bar). The mixture was filtered and the filtrate was concentrated in vacuo to dryness to give the title compound (0.33 g, 95% yield) as a light yellow solid. LCMS (M+H)+=339.2.

Step 9-4, preparation of 2-(7'-(2-ethoxypyridin-3-yl)-2'-oxo-2',3'-dihydro-1'H-spiro[piperidine-4,4'-quinazolin]-1-yl)-5-(trifluoromethyl)benzonitrile: A solution of 7'-(2-ethoxypyridin-3-yl)-1'H-spiro[piperidine-4,4'-quinazolin]-2'(3'H)-one (330 mg, 975 μmol), 2-fluoro-5-(trifluoromethyl)benzonitrile (410 mg, 2.17 mmol), and DIEA (0.5 mL, 3 mmol) in DMSO (3 mL) was heated at 66° C. for 3 h. The mixture was purified by reversed-phase CC to give the title compound (250 mg, 50.5% yield) as a yellow solid. LCMS (M+H)+=508.2.

Step 9-5, preparation of tert-butyl (2-(1-(2-cyano-4-(trifluoromethyl)phenyl)-7'-(2-ethoxypyridin-3-yl)-2'-oxo-2',3'-dihydro-1'H-spiro[piperidine-4,4'-quinazolin]-1'-yl)ethyl)carbamate: A mixture of 2-(7'-(2-ethoxypyridin-3-yl)-2'-oxo-2',3'-dihydro-1'H-spiro[piperidine-4,4'-quinazolin]-1-yl)-5-(trifluoromethyl)benzonitrile (100 mg, 197 μmol), tert-butyl (2-chloroethyl)carbamate (113 mg, 629 μmol), and Cs$_2$CO$_3$ (155 mg, 476 μmol) in DMF (1 mL) was heated at 125° C. for 3 h. The mixture was purified by reversed-phase CC to give the title compound (26 mg, 20% yield) as an off-white solid. LCMS (M+H)+=651.3.

Step 9-6, preparation of 2-(1'-(2-aminoethyl)-7'-(2-ethoxypyridin-3-yl)-2'-oxo-2',3'-dihydro-1'H-spiro[piperidine-4,4'-quinazolin]-1-yl)-5-(trifluoromethyl)benzonitrile formate: To a solution of tert-butyl (2-(1-(2-cyano-4-(trifluoromethyl)phenyl)-7'-(2-ethoxypyridin-3-yl)-2'-oxo-2',3'-dihydro-1'H-spiro[piperidine-4,4'-quinazolin]-1'-yl)ethyl)carbamate (26 mg, 40 μmol) in DCM (4 mL) was added TFA (1 mL) and the mixture was stirred at rt for 1 h. The mixture was concentrated in vacuo and the residue was dissolved in MeOH (3 mL), basified with ammonium hydroxide (aq) to pH 9, and concentrated in vacuo. The residue was purified by reversed-phase CC to give the title compound (11.2 mg, 47% yield). LCMS (M+H)+=551.3.

Example 10: 2-[7'-(2-ethoxypyridin-3-yl)-1'-[2-(methylamino)ethyl]-2'-oxo-2',3'-dihydro-1'H-spiro[piperidine-4,4'-quinazolin]-1-yl]-5-(trifluoromethyl)benzonitrile (cpd 1-65)

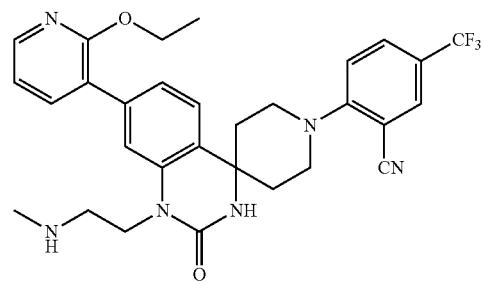 [SMILES: CCOc1ncccc1-c1ccc2c(c1)N(CCNC)C(=O)NC21CCN(c2ccc(C(F)(F)F)cc2C#N)CC1]

Step 10-1, preparation of 2-(7'-(2-ethoxypyridin-3-yl)-1'-(2-(methylamino)ethyl)-2'-oxo-2',3'-dihydro-1'H-spiro[piperidine-4,4'-quinazolin]-1-yl)-5-(trifluoromethyl)benzonitrile: A mixture of 2-(1'-(2-aminoethyl)-7'-(2-ethoxypyridin-3-yl)-2'-oxo-2',3'-dihydro-1'H-spiro[piperidine-4,4'-quinazolin]-1-yl)-5-(trifluoromethyl)benzonitrile (22 mg, 40 μmol) from Step 9-6, K$_2$CO$_3$ (10 mg, 72 μmol), and methyl trifluoromethanesulfonate (6.4 mg, 39 μmol) in HFIP (1 mL) was stirred at rt for 3 h. The mixture was purified by reversed-phase CC to give the title compound (1.6 mg, 7.1% yield) as an off-white solid. LCMS (M+H)+=565.3.

Example 11: 2-[1'-(2-aminoethyl)-7'-(2-ethoxypyridin-3-yl)-2'-oxo-2',3'-dihydro-1'H-spiro[piperidine-4,4'-quinolin]-1-yl]-5-(trifluoromethyl)benzonitrile (cpd 1-66)

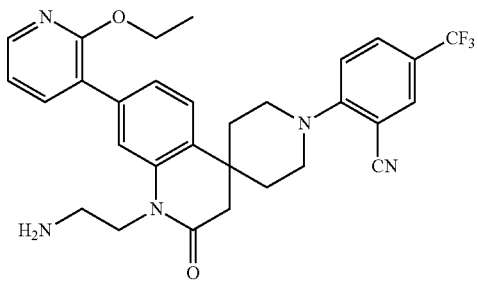 [SMILES: CCOc1ncccc1-c1ccc2c(c1)N(CCN)C(=O)CC21CCN(c2ccc(C(F)(F)F)cc2C#N)CC1]

Step 11-1, preparation of 6-bromo-2,3-dihydro-1H-inden-1-ol: To a solution of 6-bromo-2,3-dihydro-1H-inden-1-one (20 g, 95 mmol) in EtOH (200 mL) was added NaBH$_4$ (5.4 g, 0.14 mol) in portions at 0° C. The resulting solution was stirred at 0° C. for 1 h and rt for 3 h. The mixture was quenched by saturated NH$_4$Cl (aq) (10 mL) and the solid was filtered out. The filtrate was diluted with water (50 mL) and extracted with EtOAc (3×). The combined organics were washed with brine, dried over anhydrous sodium sulfate, and concentrated in vacuo. The residue was purified by silica gel CC to give the title compound (18 g, 89% yield) as a white solid. LCMS (M+H)$^+$=213.0.

Step 11-2, preparation of 5-bromo-1H-indene: To a solution of 6-bromo-2,3-dihydro-1H-inden-1-ol (18 g, 84 mmol) in THF (180 mL) was added 40% H$_2$SO$_4$ (aq) (60 mL). The resulting solution was heated at 80° C. for 16 h. The mixture was quenched by water (50 mL), neutralized with 5M NaOH (aq), and extracted with EtOAc (3×). The combined organics were washed with brine, dried over anhydrous sodium sulfate, and concentrated in vacuo. The residue was purified by silica gel CC to give the title compound (11 g, 67% yield) as a white solid. LCMS (M+H)$^+$=195.0.

Step 11-3, preparation of tert-butyl 5-bromospiro[indene-1,4'-piperidine]-1'-carboxylate: To a solution of 5-bromo-1H-indene (15.7 g, 80.5 mmol) in THF (150 mL) at 0° C. under nitrogen was added 1M lithium bis(trimethylsilyl)amide solution in THF (0.2 L, 200 mmol) dropwise and the resulting solution was stirred at 0° C. for 1 h. To this was added a solution of tert-butyl bis(2-chloroethyl)carbamate (24 g, 99 mmol) in THF (100 mL) dropwise. The resulting mixture was stirred at rt for 16 h. The reaction was quenched by saturated NH$_4$Cl (aq) (200 mL) and extracted with EtOAc (3×). The combined organics were washed with brine, dried over anhydrous sodium sulfate, and concentrated in vacuo. The residue was purified by silica gel CC to give a mixture of tert-butyl 5-bromospiro[indene-1,4'-piperidine]-1'-carboxylate and tert-butyl 6-bromospiro[indene-1,4'-piperidine]-1'-carboxylate (26 g) as yellow oil. The mixed product was then purified by Dynamic Axial Compression (Instrument Name: DAC-150, Conc. of Pump B: 85.0%, Total Flow: 400 mL/min, Phase A: water, Phase B: ACN, Column Name: HS-C18(DAC-150), 10 m) to give the title compound (8.3 g, 28% yield) as a yellow solid. LCMS (M+H)$^+$=364.1.

Step 11-4, preparation of tert-butyl 5-bromo-3-hydroxy-2,3-dihydrospiro[indene-1,4'-piperidine]-1'-carboxylate: To a solution of tert-butyl 5-bromospiro[indene-1,4'-piperidine]-1'-carboxylate (8.0 g, 22 mmol) in DCM (200 mL) at 0° C. was added 35% HBr in AcOH (100 mL). The resulting solution was stirred at 0° C. for 6 h. To this solution was added 40% NaOH (aq) to adjust pH 12 and then followed by DCM (100 mL) and di-tert-butyl dicarbonate (150 mg, 687 μmol). The resulting solution was stirred at rt for 3 h. The mixture was treated with 3N HCl (aq) to pH 8-9 and extracted with DCM (3×). The combined organics were washed with brine, dried over anhydrous sodium sulfate, and concentrated in vacuo to dryness to give the title compound (7.0 g, 83% yield) as yellow oil. LCMS (M+H)$^+$=382.1.

Step 11-5, preparation of tert-butyl 5-bromo-3-oxo-2,3-dihydrospiro[indene-1,4'-piperidine]-1'-carboxylate: To a solution of tert-butyl 5-bromo-3-hydroxy-2,3-dihydrospiro[indene-1,4'-piperidine]-1'-carboxylate (7.2 g, 19 mmol) in DCM (120 mL) was added Dess-Martin periodinane (12 g, 28 mmol). The resulting solution was stirred at rt for 3 h. The solid was filtered out and the filtrate was diluted with water (150 mL) and extracted with DCM (3×). The combined organics were washed with brine, dried over anhydrous sodium sulfate, and concentrated in vacuo. The residue was purified by silica gel CC to give the title compound (4.2 g, 59% yield) as a white solid. LCMS (M+H)$^+$=380.1.

Step 11-6, preparation of tert-butyl (Z)-5-bromo-3-(hydroximino)-2,3-dihydrospiro[indene-1,4'-piperidine]-1'-carboxylate: To a solution of tert-butyl 5-bromo-3-oxo-2,3-dihydrospiro[indene-1,4'-piperidine]-1'-carboxylate (2.0 g, 5.3 mmol) in EtOH (30 mL) was added sodium acetate (0.65 g, 7.9 mmol) and hydroxylamine hydrochloride (0.44 g, 6.3 mmol). The resulting solution was heated at 80° C. for 1 h. The reaction was quenched by water (70 mL) and extracted with DCM (3×). The combined organics were washed with brine, dried over anhydrous sodium sulfate, and concentrated in vacuo to dryness to give the title compound (2.4 g, 114% yield) as a light yellow solid. LCMS (M+H)$^+$=395.1.

Step 11-7, preparation of tert-butyl (E)-5-bromo-3-(((methylsulfonyl)oxy)imino)-2,3-dihydrospiro[indene-1,4'-piperidine]-1'-carboxylate: To a solution of tert-butyl (E)-5-bromo-3-(hydroxyimino)-2,3-dihydrospiro[indene-1,4'-piperidine]-1'-carboxylate (2.4 g, 6.1 mmol) in DCM (40 mL) at 0° C. was added triethylamine (1.2 g, 12 mmol) and methanesulfonyl chloride (1.0 g, 8.7 mmol) dropwise. The resulting solution was stirred at rt for 2 h. The reaction was quenched by water (60 mL) and extracted with DCM (3×). The combined organics were washed with brine, dried over anhydrous sodium sulfate, and concentrated in vacuo to dryness to give the title compound (2.6 g, 90% yield) as a yellow solid. LCMS (M+H)$^+$=473.1.

Step 11-8, preparation of tert-butyl 7'-bromo-2'-oxo-2',3'-dihydro-1'H-spiro[piperidine-4,4'-quinoline]-1-carboxylate: To a solution of tert-butyl (E)-5-bromo-3-(((methylsulfonyl)oxy)imino)-2,3-dihydrospiro[indene-1,4'-piperidine]-1'-carboxylate (2.1 g, 4.4 mmol) in 1,2-dichloroethane (30 mL) at 0° C. was added aluminum trichloride (1.8 g, 14 mmol) portionwise. The resulting mixture was stirred at rt for 16 h. The reaction was quenched by saturated NaHCO$_3$ (aq) to pH 9, diluted with DCM (30 mL), and triturated with di-tert-butyl dicarbonate (1.9 g, 8.7 mmol). The resulting solution was again stirred at rt for 2 h and then filtered through celite. The filtrate was diluted with water (40 mL) and extracted with DCM (3×). The combined organics were washed with brine, dried over anhydrous sodium sulfate, and concentrated in vacuo. The residue was purified by silica gel CC to give the title compound (830 mg, 47% yield) as a yellow solid. A regioisomer, tert-butyl 7-bromo-1-oxo-2,3-dihydro-1H-spiro[isoquinoline-4,4'-piperidine]-1'-carboxylate (820 mg, 47% yield) was also obtained as a yellow solid. LCMS (M+H)$^+$=395.1.

Step 11-9, preparation of 2,2,2-trifluoroacetaldehyde-7'-bromo-1'H-spiro[piperidine-4,4'-quinolin]-2'(3'H)-one (1/1): To a solution of tert-butyl 7'-bromo-2'-oxo-2',3'-dihydro-1'H-spiro[piperidine-4,4'-quinoline]-1-carboxylate (830 mg, 2.10 mmol) in DCM (10 mL) was added TFA (2 mL) and the resulting solution was stirred at rt for 1 h. The mixture was concentrated in vacuo to dryness to give the title compound (800 mg, 96.9% yield) as a yellow solid. LCMS (M+H)$^+$=295.1.

Step 11-10, preparation of 2-(7'-bromo-2'-oxo-2',3'-dihydro-1'H-spiro[piperidine-4,4'-quinolin]-1-yl)-5-(trifluoromethyl)benzonitrile: To a solution 2,2,2-trifluoroacetaldehyde-7'-bromo-1'H-spiro[piperidine-4,4'-quinolin]-2'(3'H)-one (1/1) (800 mg, 2.03 mmol) in DMSO (10 mL) was added 2-fluoro-5-(trifluoromethyl)benzonitrile (465 mg, 2.46 mmol) and DIEA (1.6 g, 12 mmol). The resulting solution was heated at 70° C. for 2 h. The mixture was quenched by water and extracted with DCM (3×). The combined organics were washed with brine, dried over anhydrous sodium sulfate, and concentrated in vacuo. The residue was purified by silica gel CC to give the title compound (800 mg, 84.7% yield) as a yellow solid. LCMS (M+H)$^+$=464.2.

Step 11-11, preparation of 2-(7'-(2-ethoxypyridin-3-yl)-2'-oxo-2',3'-dihydro-1'H-spiro[piperidine-4,4'-quinolin]-1-yl)-5-(trifluoromethyl)benzonitrile: To a mixture of 2-(7'-bromo-2'-oxo-2',3'-dihydro-1'H-spiro[piperidine-4,4'-quinolin]-1-yl)-5-(trifluoromethyl)benzonitrile (800 mg, 1.72 mmol) in 1,4-dioxane (10 mL) and water (1 mL) was added (2-ethoxypyridin-3-yl)boronic acid (450 mg, 2.70 mmol), potassium carbonate (714 mg, 5.17 mmol), and Pd(dtbpf)Cl$_2$ (60 mg, 0.092 mmol). The resulting mixture was heated at 80° C. for 1 h. The solid was filtered out and the filtrate was concentrated in vacuo. The residue was purified by silica gel CC to give the title compound (810 mg, 92.8% yield) as a yellow solid. LCMS (M+H)$^+$=507.3.

Step 11-12, preparation of tert-butyl (2-(1-(2-cyano-4-(trifluoromethyl)phenyl)-7'-(2-ethoxypyridin-3-yl)-2'-oxo-2',3'-dihydro-1'H-spiro[piperidine-4,4'-quinolin]-1'-yl)ethyl)carbamate: To a solution of 2-(7'-(2-ethoxypyridin-3-yl)-2'-oxo-2',3'-dihydro-1'H-spiro[piperidine-4,4'-quinolin]-1-yl)-5-(trifluoromethyl)benzonitrile (140 mg, 276 µmol) in DMF (2 mL) was added tert-butyl (2-chloroethyl)carbamate (100 mg, 557 µmol) and 60 wt % NaH in mineral oil (33 mg, 0.83 mmol). The resulting mixture was heated at 60° C. for 3 h. The reaction was then quenched by saturated NH$_4$Cl (aq) and extracted with DCM (3×). The combined organics were washed with brine, dried over anhydrous sodium sulfate, and concentrated in vacuo. The residue was purified by silica gel CC to give the title compound (140 mg, 78.0% yield) as a white solid. LCMS (M+H)$^+$=650.3.

Step 11-13, preparation of 2-(1'-(2-aminoethyl)-7'-(2-ethoxypyridin-3-yl)-2'-oxo-2',3'-dihydro-1'H-spiro[piperidine-4,4'-quinolin]-1-yl)-5-(trifluoromethyl)benzonitrile: To a solution of tert-butyl (2-(1-(2-cyano-4-(trifluoromethyl)phenyl)-7'-(2-ethoxypyridin-3-yl)-2'-oxo-2',3'-dihydro-1'H-spiro[piperidine-4,4'-quinolin]-1'-yl)ethyl)carbamate (90 mg, 0.14 mmol) in DCM (2 mL) was added TFA (0.5 mL). The resulting solution was stirred at rt for 1 h. The mixture was concentrated in vacuo, diluted with water (10 mL), neutralized with saturated NaHCO$_3$ (aq), and extracted with EtOAc (3×). The combined organics were washed with brine, dried over anhydrous sodium sulfate, and concentrated in vacuo to dryness to give the title compound (70 mg, 92% yield) as a yellow solid. LCMS (M+H)$^+$=550.2.

The following compounds were prepared similarly to Example 11 with appropriate substituting reagents and substrates at different steps.

| Compound no. | MS (M + H)$^+$ |
|---|---|
| 1-67 | 534.2 |
| 1-68 | 564.2 |
| 1-69 | 564.3 |
| 1-70 | 564.2 |

Example A-1: Parenteral Pharmaceutical Composition

To prepare a parenteral pharmaceutical composition suitable for administration by injection (subcutaneous, intravenous), 1-100 mg of a water-soluble salt of a compound Formula (I), or a pharmaceutically acceptable salt or solvate thereof, is dissolved in sterile water and then mixed with 10 mL of 0.9% sterile saline. A suitable buffer is optionally added as well as optional acid or base to adjust the pH. The mixture is incorporated into a dosage unit form suitable for administration by injection Example A-2: Oral Solution To prepare a pharmaceutical composition for oral delivery, a sufficient amount of a compound of Formula (I), or a pharmaceutically acceptable salt thereof, is added to water (with optional solubilizer(s), optional buffer(s) and taste masking excipients) to provide a 20 mg/mL solution.

Example A-3: Oral Tablet

A tablet is prepared by mixing 20-50% by weight of a compound of Formula (I), or a pharmaceutically acceptable salt thereof, 20-50% by weight of microcrystalline cellulose, 1-10% by weight of low-substituted hydroxypropyl celluose, and 1-10% by weight of magnesium stearate or other appropriate excipients. Tablets are prepared by direct compression. The total weight of the compressed tablets is maintained at 100-500 mg.

Example A-4: Oral Capsule

To prepare a pharmaceutical composition for oral delivery, 10-500 mg of a compound of Formula (I), or a pharmaceutically acceptable salt thereof, is mixed with starch or other suitable powder blend. The mixture is incorporated into an oral dosage unit such as a hard gelatin capsule, which is suitable for oral administration.

In another embodiment, 10-500 mg of a compound of Formula (I), or a pharmaceutically acceptable salt thereof, is placed into Size 4 capsule, or size 1 capsule (hypromellose or hard gelatin) and the capsule is closed.

Example A-5: Topical Gel Composition

To prepare a pharmaceutical topical gel composition, a compound of Formula (I), or a pharmaceutically acceptable salt thereof, is mixed with hydroxypropyl celluose, propylene glycol, isopropyl myristate and purified alcohol USP. The resulting gel mixture is then incorporated into containers, such as tubes, which are suitable for topical administration.

Example B-1: MC2R Assays

Membrane Preparation:

Crude membrane fractions are prepared from CRE-bla-CHO-K1 cells stably expressing hMC2 receptor and hMRAP accessory protein (Thermo Fisher). The cells are grown to 85-100% confluence on standard tissue culture dishes in GlutaMax DMEM growth media (Gibco) with following additives: 10% dialyzed FBS (Gemini), 0.1 mM NEAA (Gibco), 25 mM HEPES (Gibco), 5 µg/mL blasticidin (Goldbio), 100 µg/mL zeocin (Invitrogen), 600 µg/mL hygromycin (Goldbio). To prepare membranes, cells are scraped and collected in 1× Dulbecco's phosphate buffered saline (Corning) and then pelleted at 1000 RPM's. The cell pellet is reconstituted in membrane preparation buffer (20 mM HEPES, 6 mM MgCl$_2$ and 1 mM EGTA, protease inhibitor tablets (Pierce) adjusted to pH 7.4), homogenized using a dounce homogenizer, and the resulting membrane fraction is pelleted by centrifugation at 12,000 RPM's. The membrane pellet is resuspended in membrane preparation buffer, snap freezed and stored at −80° C. for later use.

Binding Assay for hMC2 Antagonists Protocol:

The hMC2 membrane binding assay utilizes the following components: radiolabel [$^{125}$I]ACTH (1-39) Tyr23 (PerkinElmer), wheatgerm agglutinin coated PVT SPA beads (PerkinElmer), crude hMC2R membranes, and compounds. Briefly hMC2R membranes are incubated with SPA beads in binding assay buffer (50 mM HEPES, 5 mM MgCl$_2$, 1 mM CaCl$_2$), 0.2% BSA, protease inhibitor tablets (Pierce) adjusted to pH7.4) prior to assay initiation. A dose response of compound (the final concentration of compound are typically 0-10,000 nM), SPA membranes, and [$^{125}$I]ACTH (1-39) Tyr23 at a final concentration of 0.2 nM is plated in a 96-well assay plate and allowed to incubate 1.5 hours at room temperature. Assay plates are read using a Top Count NXT and K$_i$ values for compounds are determined using a GraphPad Prism 6 non-linear regression analysis.

Illustrative binding affinities of selective compounds are described in Table A. The potencies are divided into four criteria: + means that K$_i$ is between 1,000 nM and 10,000 nM; ++ means that K$_i$ is between 100 nM and 1,000 nM; +++ means K$_i$ is between 10 nM and 100 nM; ++++ means K$_i$ is below 10 nM.

TABLE A

| Compound No. | MC2R binding potency |
| --- | --- |
| 1-1 | +++ |
| 1-2 | +++ |
| 1-3 | +++ |
| 1-5 | +++ |
| 1-6 | +++ |
| 1-7 | +++ |
| 1-8 | + |
| 1-9 | +++ |
| 1-10 | +++ |
| 1-11 | +++ |
| 1-12 | +++ |
| 1-13 | ++++ |
| 1-14 | +++ |
| 1-15 | ++++ |
| 1-16 | ++++ |
| 1-17 | +++ |
| 1-18 | ++++ |
| 1-19 | + |
| 1-20 | + |
| 1-21 | +++ |
| 1-22 | +++ |
| 1-23 | +++ |
| 1-24 | + |

TABLE A-continued

| Compound No. | MC2R binding potency |
| --- | --- |
| 1-25 | + |
| 1-26 | +++ |
| 1-27 | +++ |
| 1-28 | ++++ |
| 1-29 | ++++ |
| 1-30 | +++ |
| 1-31 | +++ |
| 1-32 | +++ |
| 1-33 | +++ |
| 1-34 | +++ |
| 1-35 | +++ |
| 1-36 | + |
| 1-37 | +++ |
| 1-38 | +++ |
| 1-39 | +++ |
| 1-40 | ++++ |
| 1-41 | +++ |
| 1-42 | +++ |
| 1-43 | +++ |
| 1-44 | +++ |
| 1-45 | +++ |
| 1-46 | ++++ |
| 1-47 | +++ |
| 1-48 | ++++ |
| 1-49 | ++++ |
| 1-50 | ++++ |
| 1-51 | ++++ |
| 1-52 | ++++ |
| 1-53 | +++ |
| 1-54 | ++++ |
| 1-55 | ++++ |
| 1-56 | +++ |
| 1-57 | +++ |
| 1-58 | ++++ |
| 1-59 | ++++ |
| 1-60 | ++++ |
| 1-61 | ++++ |
| 1-62 | ++++ |
| 1-63 | ++++ |
| 1-64 | ++++ |
| 1-65 | ++++ |
| 1-66 | +++ |
| 1-67 | +++ |
| 1-68 | +++ |
| 1-69 | +++ |
| 1-70 | +++ |

The examples and embodiments described herein are for illustrative purposes only and various modifications or changes suggested to persons skilled in the art are to be included within the spirit and purview of this application and scope of the appended claims.

What is claimed is:

1. A compound of Formula (I), or a pharmaceutically acceptable salt thereof:

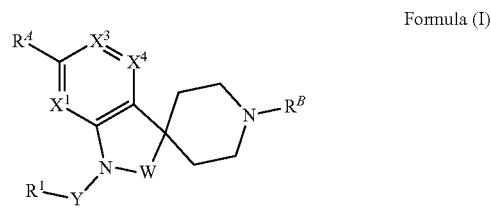

Formula (I)

wherein:

R$^A$ is unsubstituted or substituted phenyl, unsubstituted or substituted monocyclic 6-membered heteroaryl, or unsubstituted or substituted monocyclic 5-membered heteroaryl, wherein if $R^A$ is substituted then $R^A$ is substituted with 1, 2, 3 or 4 groups selected from $R^a$, $R^b$, and $R^c$;

$R^a$, $R^b$, and $R^c$ are independently selected from the group consisting of hydrogen, halogen, —OR$^4$, —CN, —N(R$^4$)$_2$, —C(=O)R$^7$, unsubstituted or substituted C$_1$-C$_6$ alkyl, unsubstituted or substituted C$_1$-C$_6$ fluoroalkyl, unsubstituted or substituted C$_1$-C$_6$ heteroalkyl, unsubstituted or substituted C$_3$-C$_6$ cycloalkyl, unsubstituted or substituted C$_2$-C$_7$ heterocycloalkyl, unsubstituted or substituted phenyl, and unsubstituted or substituted heteroaryl, wherein any substituted group of $R^a$, $R^b$, and $R^c$ is substituted with one or more $R^6$ groups;

wherein, if $R^a$, $R^b$, or $R^c$ is attached to the N atom of a heteroaryl, then it is hydrogen, —C(=O)R$^7$, unsubstituted or substituted C$_1$-C$_6$ alkyl, unsubstituted or substituted C$_1$-C$_6$ fluoroalkyl, unsubstituted or substituted C$_1$-C$_6$ heteroalkyl, unsubstituted or substituted C$_3$-C$_6$ cycloalkyl, or unsubstituted or substituted C$_2$-C$_7$ heterocycloalkyl;

$R^B$ is an unsubstituted or substituted phenyl, unsubstituted or substituted monocyclic 6-membered heteroaryl, or unsubstituted or substituted monocyclic 5-membered heteroaryl, wherein if $R^B$ is substituted then $R^B$ is substituted with 1, 2, 3 or 4 groups selected from $R^d$, $R^e$, and $R^f$;

$R^d$, $R^e$, and $R^f$ are independently selected from the group consisting of hydrogen, halogen, —OR$^4$, —CN, —N(R$^4$)$_2$, —C(=O)R$^7$, —C(=O)N(R$^4$)$_2$, unsubstituted or substituted C$_1$-C$_6$ alkyl, unsubstituted or substituted C$_1$-C$_6$ fluoroalkyl, unsubstituted or substituted C$_1$-C$_6$ heteroalkyl, unsubstituted or substituted C$_3$-C$_6$ cycloalkyl, unsubstituted or substituted C$_2$-C$_7$ heterocycloalkyl, unsubstituted or substituted phenyl, and unsubstituted or substituted heteroaryl, wherein any substituted group of $R^d$, $R^e$, and $R^f$ is substituted with one or more $R^6$ groups;

wherein, if $R^d$, $R^e$, or $R^f$ is attached to the N atom of a heteroaryl, then it is hydrogen, —C(=O)R$^7$, unsubstituted or substituted C$_1$-C$_6$ alkyl, unsubstituted or substituted C$_1$-C$_6$ fluoroalkyl, unsubstituted or substituted C$_1$-C$_6$ heteroalkyl, unsubstituted or substituted C$_3$-C$_6$ cycloalkyl, or unsubstituted or substituted C$_2$-C$_7$ heterocycloalkyl;

$X^1$ is CR$^{11}$ or N;
$X^3$ is CR$^{13}$ or N;
$X^4$ is CR$^{14}$ or N;
$R^{11}$, $R^{13}$, and $R^{14}$ are each independently hydrogen, halogen, unsubstituted or substituted C$_1$-C$_6$ alkyl, unsubstituted or substituted C$_1$-C$_6$ fluoroalkyl, unsubstituted or substituted C$_1$-C$_6$ heteroalkyl, unsubstituted or substituted C$_3$-C$_6$ cycloalkyl, —CN, —OR$^4$, —SR$^4$, —CO$_2$R$^4$, —C(=O)N(R$^4$)$_2$, or —N(R$^4$)$_2$;

W is absent, —C(R$^3$)$_2$—, —C(R$^3$)$_2$—C(R$^3$)$_2$—, —C(=O)—, #—C(=O)—O—, #—C(=O)—C(R$^3$)$_2$—, or #—C(=O) NR$^2$—; wherein # indicates the attachment point to the N atom of the ring;

Y is absent, —(C=O)—, *—O(C=O)—, *—NR$_2$—(C=O)—, —(SO$_2$)—, or *—NR$_2$—(SO$_2$)—; wherein * indicates the attachment point to R$^1$;

R$^1$ is unsubstituted or substituted C$_1$-C$_6$ alkyl, unsubstituted or substituted C$_1$-C$_6$ fluoroalkyl, unsubstituted or substituted C$_1$-C$_6$ heteroalkyl, unsubstituted or substituted C$_3$-C$_6$ cycloalkyl, unsubstituted or substituted C$_2$-C$_7$ heterocycloalkyl, unsubstituted or substituted —(C$_1$-C$_6$ alkyl)-(C$_3$-C$_6$ cycloalkyl), unsubstituted or substituted —(C$_1$-C$_6$ alkyl)-(C$_2$-C$_7$ heterocycloalkyl), wherein any substituted group of R$^1$ is substituted with one or more halogen, unsubstituted or substituted C$_1$-C$_6$ alkyl, unsubstituted or substituted monocyclic heterocycle, —N(R$^4$)$_2$, —OR$^5$, —CN, —CO$_2$R$^5$, —C(=O)N(R$^4$)$_2$, —SR$^5$, —S(=O)R$^7$, —S(=O)$_2$R$^7$, —NR$_4$C(=O)R$^5$, —NR$_4$SO$_2$R$^7$, —SO$_2$R$^7$, or —SO$_2$N(R$^4$)$_2$;

each R$^2$ is independently hydrogen, unsubstituted or substituted C$_1$-C$_6$ alkyl, unsubstituted or substituted C$_3$-C$_6$ cycloalkyl, or unsubstituted or substituted C$_2$-C$_7$ heterocycloalkyl;

each R$^3$ is independently hydrogen, halogen, unsubstituted or substituted C$_1$-C$_6$ alkyl, unsubstituted or substituted C$_3$-C$_6$ cycloalkyl, or unsubstituted or substituted C$_2$-C$_7$ heterocycloalkyl;

each R$^4$ is independently selected from the group consisting of hydrogen, unsubstituted or substituted C$_1$-C$_6$ alkyl, unsubstituted or substituted C$_3$-C$_6$ cycloalkyl, unsubstituted or substituted C$_1$-C$_6$ fluoroalkyl, unsubstituted or substituted aryl, and unsubstituted or substituted heteroaryl;

or two R$^4$ are taken together with the nitrogen atom to which they are attached to form an unsubstituted or substituted 3- to 6-membered monocyclic heterocycle;

each R$^5$ is independently selected from the group consisting of hydrogen, substituted C$_1$-C$_6$ alkyl, unsubstituted or substituted C$_3$-C$_6$ cycloalkyl, unsubstituted or substituted C$_1$-C$_6$ fluoroalkyl, unsubstituted or substituted aryl, and unsubstituted or substituted heteroaryl;

each R$^6$ is independently hydrogen, halogen, unsubstituted or substituted C$_1$-C$_4$alkyl, unsubstituted or substituted C$_1$-C$_4$alkoxy, unsubstituted or substituted C$_1$-C$_4$fluoroalkyl, unsubstituted or substituted C$_1$-C$_4$fluoroalkoxy, unsubstituted or substituted monocyclic carbocycle, unsubstituted or substituted monocyclic heterocycle, —CN, —OH, —CO$_2$R$^5$, —CH$_2$CO$_2$R$^5$, —C(=O)N(R$^4$)$_2$, —C(=O)N(R$^4$)OR$^5$, —CH$_2$C(=O)N(R$^4$)$_2$, —N(R$^4$)$_2$, —CH$_2$N(R$^4$)$_2$, —C(R$^5$)$_2$N(R$^4$)$_2$, —NR$_4$C(=O)R$^5$, —CH$_2$NR$_4$C(=O)R$^3$, —NR$_4$C(=O)N(R$^5$)$_2$, —NR$_4$C(=O)N(R$^4$)$_2$, C(R$^5$)=N(R$^4$)—OR$^3$, —SR$^3$, —S(=O)R$^7$, —SO$_2$R$^7$, or —SO$_2$N(R$^4$)$_2$; and each R$^7$ is independently selected from the group consisting substituted C$_1$-C$_6$ alkyl, unsubstituted or substituted C$_3$-C$_6$ cycloalkyl, unsubstituted or substituted C$_1$-C$_6$fluoroalkyl, unsubstituted or substituted phenyl, and unsubstituted or substituted heteroaryl.

2. The compound of claim 1, or a pharmaceutically acceptable salt thereof, wherein:

W is —C(R$^3$)$_2$— or —C(=O)—;
Y is absent, —(C=O)—, *—NR$_2$—(C=O)—, or —(SO$_2$)—; wherein * indicates the attachment point to R$^1$;
each R$^2$ is independently hydrogen, —CH$_3$, —CH$_2$CH$_3$, —CH$_2$CH$_2$CH$_3$, or —CH(CH$_3$)$_2$; and
each R$^3$ is independently hydrogen, —CH$_3$, —CH$_2$CH$_3$, —CH$_2$CH$_2$CH$_3$, or —CH(CH$_3$)$_2$.

3. The compound of claim 1, or a pharmaceutically acceptable salt thereof, wherein:

R$^A$ is

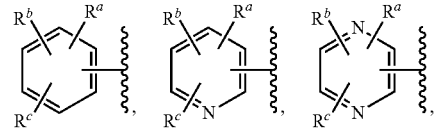

-continued

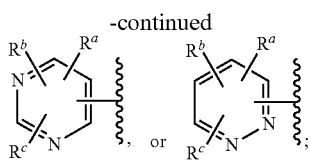, or and
$R^B$ is

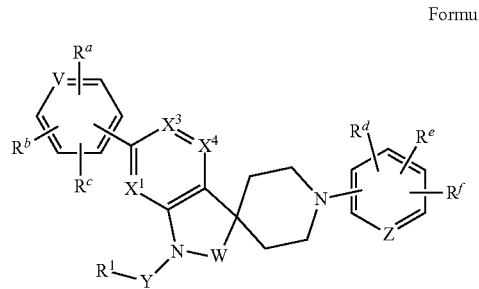, or

4. The compound of claim 1, or a pharmaceutically acceptable salt thereof, wherein the compound has the structure of Formula (IV), or a pharmaceutically acceptable salt thereof:

Formula (IV)

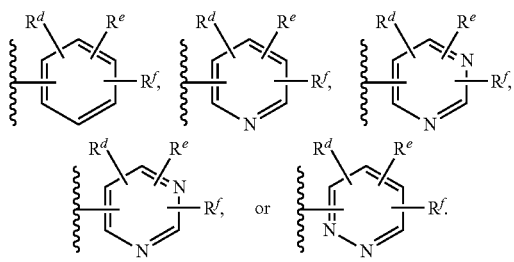

wherein:
V is CH, $CR^a$, $CR^b$, or N;
Z is CH, $CR^d$, $CR^e$, or N;
$R^a$ is selected from the group consisting of hydrogen, halogen, —$OR^4$, —CN, —$N(R^4)_2$, —C(=O)$R^7$, unsubstituted or substituted $C_1$-$C_6$ alkyl, unsubstituted or substituted $C_1$-$C_6$ fluoroalkyl, unsubstituted or substituted $C_1$-$C_6$ heteroalkyl, and unsubstituted or substituted $C_3$-$C_6$ cycloalkyl, wherein any substituted group of $R^a$ is substituted with one or more $R^6$ groups;
$R^b$ and $R^c$ are independently selected from the group consisting of hydrogen, halogen, —$OR^4$, —CN, —$N(R^4)_2$, unsubstituted or substituted $C_1$-$C_6$ alkyl, unsubstituted or substituted $C_1$-$C_6$ fluoroalkyl, and unsubstituted or substituted $C_1$-$C_6$ heteroalkyl, wherein any substituted group of $R^b$ and Reis substituted with one or more $R^6$ groups;
$R^d$ is selected from the group consisting of hydrogen, halogen, —$OR^4$, —CN, —$N(R^4)_2$, unsubstituted or substituted $C_1$-$C_6$ alkyl, unsubstituted or substituted $C_1$-$C_6$ fluoroalkyl, unsubstituted or substituted $C_1$-$C_6$ heteroalkyl, unsubstituted or substituted $C_3$-$C_6$ cycloalkyl, unsubstituted or substituted $C_2$-$C_7$ heterocycloalkyl, unsubstituted or substituted phenyl, unsubstituted or substituted monocyclic heteroaryl, and unsubstituted or substituted bicyclic heteroaryl, wherein any substituted group of $R^d$ is substituted with one or more $R^6$ groups; and
$R^e$ and $R^f$ are independently selected from the group consisting of hydrogen, halogen, —$OR^4$, —CN, —$N(R^4)_2$, unsubstituted or substituted $C_1$-$C_6$ alkyl, unsubstituted or substituted $C_1$-$C_6$ fluoroalkyl, and unsubstituted or substituted $C_1$-$C_6$ heteroalkyl.

5. The compound of claim 4, or a pharmaceutically acceptable salt thereof, wherein the compound has the structure of Formula (VIa), Formula (VIb), Formula (VIIa), or Formula (VIIb), or a pharmaceutically acceptable salt thereof:

Formula (VIa)

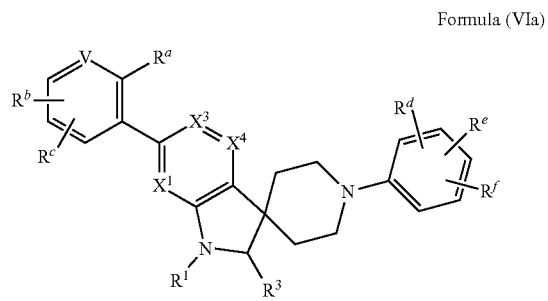

Formula (VIb)

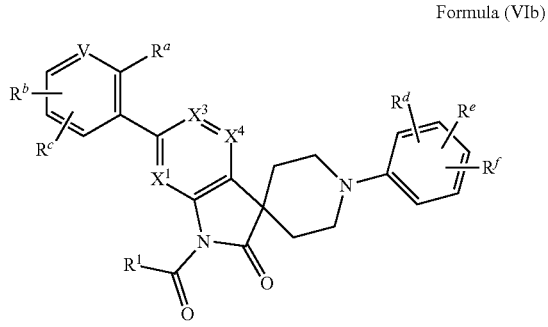

Formula (VIIc)

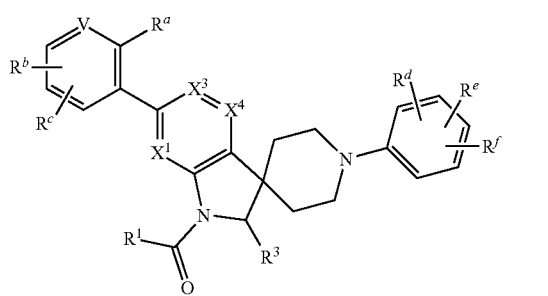

Formula (VIIb)

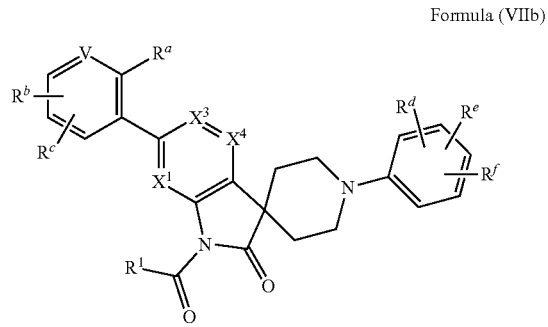

wherein:

V is CH, CR$^a$, CR$^b$, or N;

R$^a$ is selected from the group consisting of hydrogen, Cl, Br, —CN, —OH, —OCH$_3$, —OCH$_2$CH$_3$, —C(O)CH$_3$, —C(O)CH$_2$CH$_3$, —CH$_3$, —CH$_2$CH$_3$, —CH$_2$CH$_2$CH$_3$, —CH(CH$_3$)$_2$, —CH$_2$CH$_2$CH$_2$CH$_3$, —CH$_2$CH(CH$_3$)$_2$, —CH(CH$_3$)(CH$_2$CH$_3$), —C(CH$_3$)$_3$, —CH$_2$OH, —CH$_2$CN, —CH$_2$F, —CHF$_2$, —CF$_3$, —CH$_2$CH$_2$OH, —CH$_2$CH$_2$CN, —CH$_2$CH$_2$F, —CH$_2$CHF$_2$, —CH$_2$CF$_3$, —CH$_2$OCH$_3$, —CH$_2$CH$_2$OCH$_3$, —CH$_2$NH$_2$, —CH$_2$NHCH$_3$, —CH$_2$N(CH$_3$)$_2$, —CH$_2$CH$_2$NH$_2$, —CH$_2$CH$_2$NHCH$_3$, —CH$_2$CH$_2$N(CH$_3$)$_2$, cyclopropyl, cyclobutyl, cyclopentyl, and cyclohexyl;

R$^b$ and R$^c$ are independently selected from the group consisting of hydrogen, Cl, Br, —CN, —OH, —OCH$_3$, —OCH$_2$CH$_3$, —CH$_3$, —CH$_2$CH$_3$, —CH$_2$CH$_2$CH$_3$, —CH(CH$_3$)$_2$, —CH$_2$CH$_2$CH$_2$CH$_3$, —CH$_2$CH(CH$_3$)$_2$, —CH(CH$_3$)(CH$_2$CH$_3$), —C(CH$_3$)$_3$, —CH$_2$OH, —CH$_2$CN, —CH$_2$F, —CHF$_2$, —CF$_3$, —CH$_2$CH$_2$OH, —CH$_2$CH$_2$CN, —CH$_2$CH$_2$F, —CH$_2$CHF$_2$, —CH$_2$CF$_3$, —CH$_2$OCH$_3$, —CH$_2$CH$_2$OCH$_3$, —CH$_2$NH$_2$, —CH$_2$NHCH$_3$, —CH$_2$N(CH$_3$)$_2$, —CH$_2$CH$_2$NH$_2$, —CH$_2$CH$_2$NHCH$_3$, and —CH$_2$CH$_2$N(CH$_3$)$_2$;

R$^d$ is selected from the group consisting of hydrogen, C$_1$, Br, —CN, —OH, —OCH$_3$, —OCH$_2$CH$_3$, —CH$_3$, —CH$_2$CH$_3$, —CH$_2$CH$_2$CH$_3$, —CH(CH$_3$)$_2$, —CH$_2$CH$_2$CH$_2$CH$_3$, —CH$_2$CH(CH$_3$)$_2$, —CH(CH$_3$)(CH$_2$CH$_3$), —C(CH$_3$)$_3$, —CH$_2$OH, —CH$_2$CN, —CH$_2$F, —CHF$_2$, —CF$_3$, —CH$_2$CH$_2$OH, —CH$_2$CH$_2$CN, —CH$_2$CH$_2$F, —CH$_2$CHF$_2$, —CH$_2$CF$_3$, —CH$_2$OCH$_3$, —CH$_2$CH$_2$OCH$_3$, —CH$_2$NH$_2$, —CH$_2$NHCH$_3$, —CH$_2$N(CH$_3$)$_2$, —CH$_2$CH$_2$NH$_2$, —CH$_2$CH$_2$NHCH$_3$, —CH$_2$CH$_2$N(CH$_3$)$_2$, unsubstituted or substituted cyclopropyl, unsubstituted or substituted cyclobutyl, unsubstituted or substituted cyclopentyl, unsubstituted or substituted cyclohexyl, unsubstituted or substituted C$_2$-C$_7$ heterocycloalkyl, unsubstituted or substituted phenyl, unsubstituted or substituted monocyclic heteroaryl, and unsubstituted or substituted bicyclic heteroaryl, wherein any substituted group of R$^d$ is substituted with one or more R$^6$ groups; and R$^e$ and R$^f$ are independently selected from the group consisting of F, Cl, Br, —CH$_3$, —CH$_2$CH$_3$, —CH$_2$CH$_2$CH$_3$, —CH(CH$_3$)$_2$, —CH$_2$CH$_2$CH$_2$CH$_3$, —CH$_2$CH(CH$_3$)$_2$, —CH(CH$_3$)(CH$_2$CH$_3$), —C(CH$_3$)$_3$, —CH$_2$OH, —CH$_2$CN, —CH$_2$F, —CHF$_2$, —CF$_3$, —CN, —OH, —OCH$_3$, and —OCH$_2$CH$_3$.

6. The compound of claim 1, or a pharmaceutically acceptable salt thereof, wherein:

R$^1$ is unsubstituted or substituted C$_1$-C$_6$ alkyl, unsubstituted or substituted C$_1$-C$_6$ heteroalkyl containing 1 N atom, wherein any substituted group of R$^1$ is substituted with one or more halogen, unsubstituted or substituted C$_1$-C$_6$ alkyl, unsubstituted or substituted monocyclic heterocycle, —N(R$^4$)$_2$, —OR$^5$, —CN, —CO$_2$R$^5$, —C(=O)N(R$^4$)$_2$, —SR$^5$, —S(=O)R$^7$, —S(=O)$_2$R$^7$, —NR$_4$C(=O)R$^5$, —NR$_4$SO$_2$R$^7$, —SO$_2$R$^7$, or —SO$_2$N(R$^4$)$_2$;

or R$^1$ is unsubstituted or substituted monocyclic 4-, 5- or 6-membered heterocycle containing 1-4 N atoms and 0 or 1 O or S atoms;

or R$^1$ is unsubstituted or substituted bridged C$_2$-C$_7$ heterocycloalkyl containing 1-2 N atoms;

or R$^1$ is unsubstituted or substituted —(C$_1$-C$_6$ alkyl)-(C$_2$-C$_7$ heterocycloalkyl), wherein the heterocycloalkyl is an unsubstituted or substituted monocyclic 4-, 5- or 6-membered heterocycloalkyl containing 1-4 N atoms and 0 or 1 O or S atoms.

7. The compound of claim 6, or a pharmaceutically acceptable salt thereof, wherein:

R$^1$ is unsubstituted or substituted C$_1$-C$_6$ heteroalkyl containing 1 N atom;

or R$^1$ is unsubstituted or substituted monocyclic 4-, 5- or 6-membered heterocycle containing 1-4 N atoms and 0 or 1 O or S atoms;

or R$^1$ is unsubstituted or substituted —(C$_1$-C$_6$ alkyl)-(C$_2$-C$_7$ heterocycloalkyl), wherein the heterocycloalkyl is an unsubstituted or substituted monocyclic 4-, 5- or 6-membered heterocycloalkyl containing 1-4 N atoms and 0 or 1 O or S atoms.

8. The compound of claim 4, or a pharmaceutically acceptable salt thereof, wherein the compound has the structure of Formula (XIIa), (XIIb), (XIIc), or (XIId), or a pharmaceutically acceptable salt thereof:

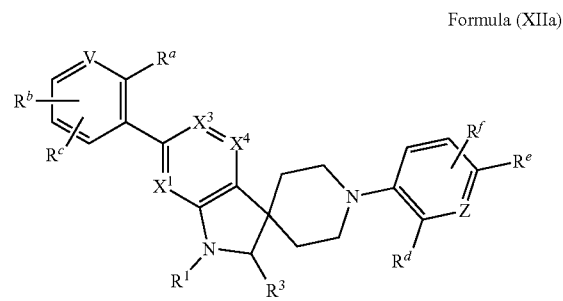

Formula (XIIa)

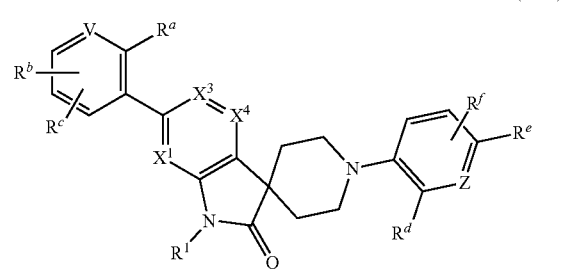

Formula (XIIb)

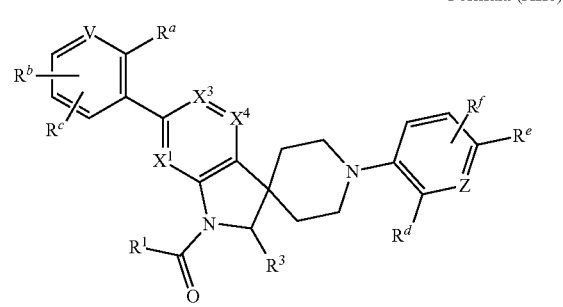

Formula (XIIc)

-continued

Formula (XIId)

wherein:
V is CH, CR$^a$, CR$^b$, or N;
Z is CH, CR$^d$, CR$^e$, or N;
X$^1$ is CR$^{11}$; X$^3$ is CR$^{13}$; and X$^4$ is CR$^{14}$;
or X$^1$ is N; X$^3$ is CR$^{13}$; and X$^4$ is CR$^{14}$;
R$^a$ is selected from the group consisting of hydrogen, halogen, —OR$^4$, —CN, unsubstituted or substituted C$_1$-C$_6$ alkyl, unsubstituted or substituted C$_1$-C$_6$ fluoroalkyl, and unsubstituted or substituted C$_3$-C$_6$ cycloalkyl;
R$^b$ and R$^c$ are independently selected from the group consisting of hydrogen, halogen, —OR$^4$, —CN, unsubstituted or substituted C$_1$-C$_6$ alkyl, and unsubstituted or substituted C$_1$-C$_6$ fluoroalkyl;
R$^d$ is selected from the group consisting of hydrogen, halogen, —OR$^4$, —CN, unsubstituted or substituted C$_1$-C$_6$ alkyl, unsubstituted or substituted C$_1$-C$_6$ fluoroalkyl, and unsubstituted or substituted C$_3$-C$_6$ cycloalkyl; and
R$^e$ and R$^f$ are independently selected from the group consisting of hydrogen, halogen, —OR$^4$, —CN, unsubstituted or substituted C$_1$-C$_6$ alkyl, and unsubstituted or substituted C$_1$-C$_6$ fluoroalkyl.

9. The compound of claim 1, or a pharmaceutically acceptable salt thereof, wherein:
X$^1$ is CR$^{11}$; X$^3$ is CR$^{13}$; and X$^4$ is CR$^{14}$;
or X$^1$ is N; X$^3$ is CR$^{13}$; and X$^4$ is CR$^{14}$.

10. The compound of claim 1, or a pharmaceutically acceptable salt thereof, wherein the compound has the structure of Formula (XV), or a pharmaceutically acceptable salt thereof:

Formula (XV)

wherein,
R$^A$ is unsubstituted or substituted 5- or 6-membered heteroaryl containing 1 or 2 N atoms or unsubstituted or substituted phenyl, wherein if R$^A$ is substituted then R$^A$ is substituted with 1 or 2 groups selected from R$^a$, R$^b$, and R$^c$;
R$^a$ is selected from the group consisting of hydrogen, halogen, —OR$^4$, —CN, —N(R$^4$)$_2$, —C(=O)R$^7$, unsubstituted or substituted C$_1$-C$_6$ alkyl, unsubstituted or substituted C$_1$-C$_6$ fluoroalkyl, unsubstituted or substituted C$_1$-C$_6$ heteroalkyl, and unsubstituted or substituted C$_3$-C$_6$ cycloalkyl, wherein any substituted group of R$^a$ is substituted with one or more R$^6$ groups; and
R$^b$ and R$^c$ are independently selected from the group consisting of hydrogen, halogen, —OR$^4$, —CN, —N(R$^4$)$_2$, —C(=O)R$^7$, unsubstituted or substituted C$_1$-C$_6$ alkyl, unsubstituted or substituted C$_1$-C$_6$ fluoroalkyl, and unsubstituted or substituted C$_1$-C$_6$ heteroalkyl, wherein any substituted group of R$^b$ and R$^c$ is substituted with one or more R$^6$ groups;
wherein, if R$^a$, R$^b$, or R$^c$ is attached to the N atom of a heteroaryl, then it is hydrogen, —C(=O)R$^7$, or unsubstituted or substituted C$_1$-C$_6$ alkyl;
R$^B$ is unsubstituted or substituted phenyl or unsubstituted or substituted 5- or 6-membered heteroaryl containing 1 or 2 N atoms, wherein if R$^B$ is substituted then R$^B$ is substituted with 1, 2, or 3 groups selected from R$^d$, R$^e$, and R$^f$;
R$^d$ is selected from the group consisting of hydrogen, halogen, —OR$^4$, —CN, —N(R$^4$)$_2$, unsubstituted or substituted C$_1$-C$_6$ alkyl, unsubstituted or substituted C$_1$-C$_6$ fluoroalkyl, unsubstituted or substituted C$_1$-C$_6$ heteroalkyl, unsubstituted or substituted C$_3$-C$_6$ cycloalkyl, unsubstituted or substituted C$_2$-C$_7$ heterocycloalkyl, unsubstituted or substituted phenyl, unsubstituted or substituted monocyclic heteroaryl, and unsubstituted or substituted bicyclic heteroaryl, wherein any substituted group of R$^d$ is substituted with one or more R$^6$ groups; and
R$^e$ and R$^f$ are independently selected from the group consisting of hydrogen, halogen, —OR$^4$, —CN, —N(R$^4$)$_2$, unsubstituted or substituted C$_1$-C$_6$ alkyl, unsubstituted or substituted C$_1$-C$_6$ fluoroalkyl, and unsubstituted or substituted C$_1$-C$_6$ heteroalkyl;
wherein, if R$^d$, R$^e$, or R$^f$ is attached to the N atom of a heteroaryl, then it is hydrogen, —C(=O)R$^7$, or unsubstituted or substituted C$_1$-C$_6$ alkyl;
X$^1$ is CR$^{11}$ or N;
R$^{11}$ is hydrogen, halogen, C$_1$-C$_6$ alkyl, C$_1$-C$_6$ fluoroalkyl, or C$_1$-C$_6$ heteroalkyl, —CN, —OR$^4$, or —N(R$^4$)$_2$;
W is —C(R$^3$)$_2$— or —C(=O)—;
Y is absent, —(C=O)—, *—NR$_2$—(C=O)—, or —(SO$_2$)—; wherein * indicates the attachment point to R$^1$; and
R$^1$ is unsubstituted or substituted C$_1$-C$_6$ alkyl, unsubstituted or substituted C$_1$-C$_6$ heteroalkyl containing 1 N atom, wherein any substituted group of R$^1$ is substituted with one or more halogen, unsubstituted or substituted C$_1$-C$_6$ alkyl, unsubstituted or substituted monocyclic heterocycle, —N(R$^4$)$_2$, —OR$^5$, —CN, —CO$_2$R$^5$, —C(=O)N(R$^4$)$_2$, —SR$^5$, —S(=O)R$^7$, —S(=O)$_2$R$^7$, —NR$_4$C(=O)R$^5$, —NR$_4$SO$_2$R$^7$, —SO$_2$R$^7$, or —SO$_2$N(R$^4$)$_2$;
or R$^1$ is unsubstituted or substituted monocyclic 4-, 5- or 6-membered heterocycle containing 1-4 N atoms and 0 or 1 O or S atoms;
or R$^1$ is unsubstituted or substituted bridged C$_2$-C$_7$ heterocycloalkyl containing 1-2 N atoms;
or R$^1$ is unsubstituted or substituted —(C$_1$-C$_6$ alkyl)-(C$_2$-C$_7$ heterocycloalkyl), wherein the heterocycloalkyl is an unsubstituted or substituted monocyclic 4-, 5- or 6-membered heterocycloalkyl containing 1-2 N atoms.

11. The compound of claim 10, or a pharmaceutically acceptable salt thereof, wherein:
- $R^A$ is unsubstituted or substituted pyridinyl or unsubstituted or substituted phenyl, wherein if $R^A$ is substituted then $R^A$ is substituted with 1 or 2 groups selected from $R^a$, $R^b$, and $R^c$;
- $R^B$ is unsubstituted or substituted phenyl or unsubstituted or substituted pyridinyl, wherein if $R^B$ is substituted then $R^B$ is substituted with 1, 2, or 3 groups selected from $R^d$, $R^e$, and $R^f$;
- $X^1$ is $CR^{11}$ or N;
- $R^{11}$ is hydrogen, F, Cl, —$CH_3$, $CF_3$, —CN, —$OR^4$, or —$N(R^4)_2$; and
- $R^1$ is unsubstituted or substituted $C_1$-$C_6$ heteroalkyl containing 1 N atom, wherein any substituted group of $R^1$ is substituted with one or more halogen, $C_1$-$C_4$ alkyl, —$N(R^4)_2$, or —$OR^5$;
- or $R^1$ is unsubstituted or substituted azetidinyl, unsubstituted or substituted pyrrolidinyl, or unsubstituted or substituted piperidinyl;
- or $R^1$ is unsubstituted or substituted bridged $C_2$-$C_7$ heterocycloalkyl containing 1-2 N atoms;
- or $R^1$ is unsubstituted or substituted —($C_1$-$C_6$ alkyl)-($C_2$-$C_7$ heterocycloalkyl), wherein the heterocycloalkyl is an unsubstituted or substituted monocyclic 4-, 5- or 6-membered heterocycloalkyl containing 1-2 N atoms.

12. The compound of claim 10, or a pharmaceutically acceptable salt thereof, wherein:
$R^A$ is

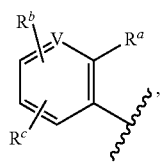

where V is CH or N;
$R^B$ is

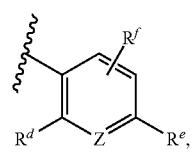

where Z is CH or N.

13. The compound of claim 10, or a pharmaceutically acceptable salt thereof, wherein the compound has the structure of Formula (XVIa) or (XVIb), or a pharmaceutically acceptable salt thereof:

Formula (XVIa)

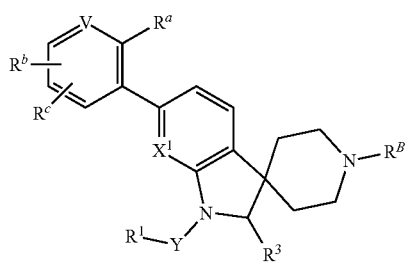

Formula (XVIb)

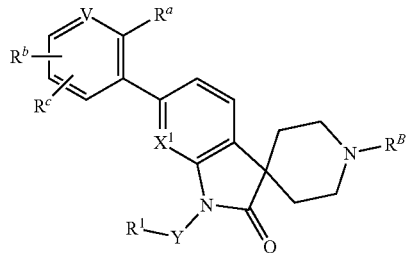

wherein:
- $R^a$ is selected from the group consisting of hydrogen, halogen, —$OR^4$, —CN, unsubstituted or substituted $C_1$-$C_6$ alkyl, unsubstituted or substituted $C_1$-$C_6$ fluoroalkyl, and unsubstituted or substituted $C_3$-$C_6$ cycloalkyl;
- $R^b$ and $R^c$ are independently selected from the group consisting of hydrogen, halogen, —$OR^4$, —CN, unsubstituted or substituted $C_1$-$C_6$ alkyl, and unsubstituted or substituted $C_1$-$C_6$ fluoroalkyl; and
- V is CH or N.

14. The compound of claim 13, or a pharmaceutically acceptable salt thereof, wherein the compound has the structure of Formula (XVIc) or (XVId), or a pharmaceutically acceptable salt thereof:

Formula (XVIc)

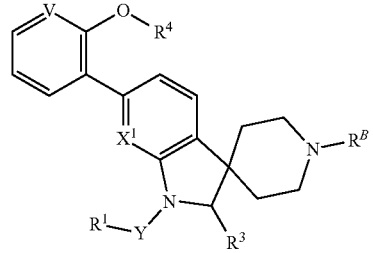

Formula (XVId)

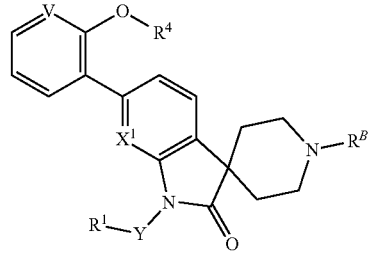

wherein V is CH or N; and $X^1$ is N.

15. The compound of claim 13, or a pharmaceutically acceptable salt thereof, wherein:
- $R^1$ is unsubstituted or substituted $C_1$-$C_6$ heteroalkyl containing 1 N atom, wherein any substituted group of R' is substituted with one or more halogen, $C_1$-$C_4$ alkyl, —$N(R^4)_2$, or —$OR^5$;
- or $R^1$ is unsubstituted or substituted azetidinyl, unsubstituted or substituted pyrrolidinyl, or unsubstituted or substituted piperidinyl;
- or $R^1$ is unsubstituted or substituted —($C_1$-$C_6$ alkyl)-($C_2$-$C_7$ heterocycloalkyl), wherein the heterocycloalkyl is an unsubstituted or substituted azetidinyl, unsubstituted or substituted pyrrolidinyl, or unsubstituted or substituted piperidinyl.

16. The compound of claim 1, wherein the compound is:

2-[1-(2-aminoacetyl)-6-(2-ethoxypyridin-3-yl)-1,2-dihydrospiro[indole-3,4'-piperidin]-1'-yl]-5-(trifluoromethyl)benzonitrile;

2-[1-(2-aminoacetyl)-6-(2-ethoxyphenyl)-1,2-dihydrospiro[indole-3,4'-piperidin]-1'-yl]-5-(trifluoromethyl)benzonitrile;

2-[1-(3-aminopropanoyl)-6-(2-ethoxypyridin-3-yl)-1,2-dihydrospiro[indole-3,4'-piperidin]-1'-yl]-5-(trifluoromethyl)benzonitrile;

2-[1-(3-aminopropanoyl)-6-(2-ethoxyphenyl)-1,2-dihydrospiro[indole-3,4'-piperidin]-1'-yl]-5-(trifluoromethyl)benzonitrile;

2-{1-[(3S)-3-aminobutanoyl]-6-(2-ethoxypyridin-3-yl)-1,2-dihydrospiro[indole-3,4'-piperidin]-1'-yl}-5-(trifluoromethyl)benzonitrile;

2-{1-[(3R)-3-aminobutanoyl]-6-(2-ethoxypyridin-3-yl)-1,2-dihydrospiro[indole-3,4'-piperidin]-1'-yl}-5-(trifluoromethyl)benzonitrile;

3-amino-1-{1'-[2-chloro-4-(trifluoromethyl)phenyl]-6-(2-ethoxypyridin-3-yl)-1,2-dihydrospiro[indole-3,4'-piperidin]-1-yl}propan-1-one;

3-[1-(3-aminopropanoyl)-6-(2-ethoxypyridin-3-yl)-1,2-dihydrospiro[indole-3,4'-piperidin]-1'-yl]-5-(trifluoromethyl)benzonitrile;

2-[6-(2-ethoxypyridin-3-yl)-1-[(3R)-pyrrolidine-3-carbonyl]-1,2-dihydrospiro[indole-3,4'-piperidin]-1'-yl]-5-(trifluoromethyl)benzonitrile;

2-[6-(2-ethoxypyridin-3-yl)-1-[(3S)-pyrrolidine-3-carbonyl]-1,2-dihydrospiro[indole-3,4'-piperidin]-1'-yl]-5-(trifluoromethyl)benzonitrile;

2-[1-(4-aminobutanoyl)-6-(2-ethoxypyridin-3-yl)-1,2-dihydrospiro[indole-3,4'-piperidin]-1'-yl]-5-(trifluoromethyl)benzonitrile;

2-[1-(2-aminoethyl)-6-(2-ethoxypyridin-3-y)-1,2-dihydrospiro[indole-3,4'-piperidin]-1'-yl]-5-(trifluoromethyl)benzonitrile;

2-{1-[(2R)-2-aminopropyl]-6-(2-ethoxypyridin-3-yl)-1,2-dihydrospiro[indole-3,4'-piperidin]-1'-yl}-5-(trifluoromethyl)benzonitrile;

2-{1-[(2S)-2-aminopropyl]-6-(2-ethoxypyridin-3-yl)-1,2-dihydrospiro[indole-3,4'-piperidin]-1'-yl}-5-(trifluoromethyl)benzonitrile;

2-{6-(2-ethoxypyridin-3-yl)-1-[2-(methylamino)ethyl]-2-oxospiro[indoline-3,4'-piperidin]-1'-yl}-5-(trifluoromethyl)benzonitrile;

2-[1-(2-aminoethyl)-6-(2-ethoxypyridin-3-yl)-2-oxo-1,2-dihydrospiro[indole-3,4'-piperidin]-1'-yl]-5-(trifluoromethyl)benzonitrile;

2-[6-(2-ethoxypyridin-3-yl)-2-oxo-1-[(3S)-pyrrolidin-3-yl]-1,2-dihydrospiro[indole-3,4'-piperidin]-1'-yl]-5-(trifluoromethyl)benzonitrile;

2-[6-(2-ethoxypyridin-3-yl)-2-oxo-1-[(3R)-pyrrolidin-3-yl]-1,2-dihydrospiro[indole-3,4'-piperidin]-1'-yl]-5-(trifluoromethyl)benzonitrile;

2-[1-(3-aminopropanoyl)-6-(2-ethoxypyridin-3-yl)-1,2-dihydrospiro[indole-3,4'-piperidin]-1'-yl]-6-(trifluoromethyl)pyridine-4-carbonitrile;

3-amino-1-[6-(2-ethoxypyridin-3-yl)-1'-[5-fluoro-6-(trifluoromethyl)pyridin-2-yl]-1,2-dihydrospiro[indole-3,4'-piperidin]-1-yl]propan-1-one;

2-[6-(2-ethoxypyridin-3-yl)-1-[(3R)-1-methylpyrrolidin-3-yl]-2-oxo-1,2-dihydrospiro[indole-3,4'-piperidin]-1'-yl]-5-(trifluoromethyl)benzonitrile;

3-amino-1-{1'-[4-chloro-2-(trifluoromethyl)phenyl]-6-(2-ethoxypyridin-3-yl)-1,2-dihydrospiro[indole-3,4'-piperidin]-1-yl}propan-1-one;

3-amino-1-{1'-[6-ethoxy-2-(trifluoromethyl)pyridin-3-yl]-6-(2-ethoxypyridin-3-yl)-1,2-dihydrospiro[indole-3,4'-piperidin]-1-yl}propan-1-one;

6-[1-(3-aminopropanoyl)-6-(2-ethoxypyridin-3-yl)-1,2-dihydrospiro[indole-3,4'-piperidin]-1'-yl]-4-(trifluoromethyl)pyridine-2-carbonitrile;

3-amino-1-{1'-[5-ethoxy-6-(trifluoromethyl)pyridin-2-yl]-6-(2-ethoxypyridin-3-yl)-1,2-dihydrospiro[indole-3,4'-piperidin]-1-yl}propan-1-one;

2-[1-(3-aminopropanoyl)-6-(2-ethoxypyridin-3-yl)-2-methyl-1,2-dihydrospiro[indole-3,4'-piperidin]-1'-yl]-5-(trifluoromethyl)benzonitrile;

N-(2-aminoethyl)-1'-[2-cyano-4-(trifluoromethyl)phenyl]-6-(2-ethoxypyridin-3-yl)-1,2-dihydrospiro[indole-3,4'-piperidine]-1-carboxamide;

2-[1'-(3-aminopropanoyl)-6'-(2-ethoxypyridin-3-yl)-1',2'-dihydrospiro[piperidine-4,3'-pyrrolo[2,3-b]pyridin]-1-y]-5-(trifluoromethyl)benzonitrile;

2-[1'-(2-aminoethyl)-6'-(2-ethoxypyridin-3-yl)-1',2'-dihydrospiro[piperidine-4,3'-pyrrolo[2,3-b]pyridin]-1-yl]-5-(trifluoromethyl)benzonitrile;

N-[(2R)-2-aminopropyl]-1'-[2-cyano-4-(trifluoromethyl)phenyl]-6-(2-ethoxypyridin-3-yl)-1,2-dihydrospiro[indole-3,4'-piperidine]-1-carboxamide;

N-[(2S)-2-aminopropyl]-1'-[2-cyano-4-(trifluoromethyl)phenyl]-6-(2-ethoxypyridin-3-yl)-1,2-dihydrospiro[indole-3,4'-piperidine]-1-carboxamide;

1'-[2-cyano-4-(trifluoromethyl)phenyl]-6-(2-ethoxypyridin-3-yl)-N-[(3R)-pyrrolidin-3-yl]-1,2-dihydrospiro[indole-3,4'-piperidine]-1-carboxamide;

1'-[2-cyano-4-(trifluoromethyl)phenyl]-6-(2-ethoxypyridin-3-yl)-N-[(3S)-pyrrolidin-3-yl]-1,2-dihydrospiro[indole-3,4'-piperidine]-1-carboxamide;

2-[1-(3-aminopropanoyl)-6-(2-ethoxypyridin-3-yl)-1,2-dihydrospiro[indole-3,4'-piperidin]-1'-yl]-5-chlorobenzonitrile;

2-[1-(3-aminopropanoyl)-6-[2-(hydroxymethyl)phenyl]-1,2-dihydrospiro[indole-3,4'-piperidin]-1'-yl]-5-(trifluoromethyl)benzonitrile;

3-amino-1-[6-(2-ethoxypyridin-3-yl)-1'-[4-methoxy-6-(trifluoromethyl)pyridin-2-yl]-1,2-dihydrospiro[indole-3,4'-piperidin]-1-yl]propan-1-one;

2-[1-(2-aminoethanesulfonyl)-6-(2-ethoxypyridin-3-yl)-1,2-dihydrospiro[indole-3,4'-piperidin]-1'-yl]-5-(trifluoromethyl)benzonitrile;

2-(1-([(2R)-azetidin-2-yl]methyl)-6-(2-ethoxypyridin-3-yl)-1,2-dihydrospiro[indole-3,4'-piperidin]-1'-yl)-5-(trifluoromethyl)benzonitrile;

2-(1-{[(2S)-azetidin-2-yl]methyl}-6-(2-ethoxypyridin-3-yl)-1,2-dihydrospiro[indole-3,4'-piperidin]-1'-yl)-5-(trifluoromethyl)benzonitrile;

2-{1-[(2R)-1-aminopropan-2-yl]-6-(2-ethoxypyridin-3-yl)-1,2-dihydrospiro[indole-3,4'-piperidin]-1'-yl}-5-(trifluoromethyl)benzonitrile;

2-{1-[(2S)-1-aminopropan-2-yl]-6-(2-ethoxypyridin-3-yl)-1,2-dihydrospiro[indole-3,4'-piperidin]-1'-yl}-5-(trifluoromethyl)benzonitrile;

2-{1-[(2R)-2-aminopropyl]-6-[2-(hydroxymethyl)phenyl]-1,2-dihydrospiro[indole-3,4'-piperidin]-1'-yl}-5-(trifluoromethyl)benzonitrile;

3-[1-(3-aminopropanoyl)-6-(2-ethoxypyridin-3-yl)-1,2-dihydrospiro[indole-3,4'-piperidin]-1'-yl]-6-methoxypyridine-2-carbonitrile;

3-[1-(3-aminopropanoyl)-6-(2-ethoxypyridin-3-yl)-1,2-dihydrospiro[indole-3,4'-piperidin]-1'-yl]-6-ethoxypyridine-2-carbonitrile;

(2R)-1-{1'-[4-chloro-2-(difluoromethyl)phenyl]-6-(2-ethoxypyridin-3-yl)-1,2-dihydrospiro[indole-3,4'-piperidin]-1-yl}propan-2-amine;

2-{1'-[(2R)-2-aminopropyl]-6'-(2-ethoxypyridin-3-yl)-1',2'-dihydrospiro[piperidine-4,3'-pyrrolo[2,3-b]pyridin]-1-yl}-5-(trifluoromethyl)benzonitrile;

2-{1'-[(2R)-2-aminopropanoyl]-6'-(2-ethoxypyridin-3-yl)-1',2'-dihydrospiro[piperidine-4,3'-pyrrolo[2,3-b]pyridin]-1-yl}-5-(trifluoromethyl)benzonitrile;

2-{1'-[(2S)-2-aminopropanoyl]-6'-(2-ethoxypyridin-3-yl)-1',2'-dihydrospiro[piperidine-4,3'-pyrrolo[2,3-b]pyridin]-1-yl}-5-(trifluoromethyl)benzonitrile;

2-[6'-(2-ethoxypyridin-3-yl)-1'-[(3R)-pyrrolidine-3-carbonyl]-1',2'-dihydrospiro[piperidine-4,3'-pyrrolo[2,3-b]pyridin]-1-yl]-5-(trifluoromethyl)benzonitrile;

2-[6'-(2-ethoxypyridin-3-yl)-1'-[3-(methylamino)propanoyl]-1',2'-dihydrospiro[piperidine-4,3'-pyrrolo[2,3-b]pyridin]-1-yl]-5-(trifluoromethyl)benzonitrile;

2-{1'-[(2S)-2-amino-3-hydroxypropyl]-6'-(2-ethoxypyridin-3-yl)-1',2'-dihydrospiro[piperidine-4,3'-pyrrolo[2,3-b]pyridin]-1-yl}-5-(trifluoromethyl)benzonitrile;

2-[6'-(2-ethoxypyridin-3-yl)-1'-[(3R)-pyrrolidin-3-yl]-1',2'-dihydrospiro[piperidine-4,3'-pyrrolo[2,3-b]pyridin]-1-yl]-5-(trifluoromethyl)benzonitrile;

2-[6'-(2-ethoxypyridin-3-yl)-1'-[(3S)-pyrrolidin-3-yl]-1',2'-dihydrospiro[piperidine-4,3'-pyrrolo[2,3-b]pyridin]-1-yl]-5-(trifluoromethyl)benzonitrile;

2-[1'-(3-aminopropyl)-6'-(2-ethoxypyridin-3-yl)-1',2'-dihydrospiro[piperidine-4,3'-pyrrolo[2,3-b]pyridin]-1-yl]-5-(trifluoromethyl)benzonitrile;

N-(2-aminoethyl)-1-[2-cyano-4-(trifluoromethyl)phenyl]-6'-(2-ethoxypyridin-3-yl)-1',2'-dihydrospiro[piperidine-4,3'-pyrrolo[2,3-b]pyridine]-1'-carboxamide;

N-[(2S)-2-aminopropyl]-1-[2-cyano-4-(trifluoromethyl)phenyl]-6'-(2-ethoxypyridin-3-yl)-1',2'-dihydrospiro[piperidine-4,3'-pyrrolo[2,3-b]pyridine]-1'-carboxamide;

1-[2-cyano-4-(trifluoromethyl)phenyl]-6'-(2-ethoxypyridin-3-yl)-N-[(3R)-pyrrolidin-3-yl]-1',2'-dihydrospiro[piperidine-4,3'-pyrrolo[2,3-b]pyridine]-1'-carboxamide;

2-{1'-[3-(dimethylamino)propanoyl]-6'-(2-ethoxypyridin-3-yl)-1',2'-dihydrospiro[piperidine-4,3'-pyrrolo[2,3-b]pyridin]-1-yl}-5-(trifluoromethyl)benzonitrile;

1-[2-cyano-4-(trifluoromethyl)phenyl]-6'-(2-ethoxypyridin-3-yl)-N-[2-(methylamino)ethyl]-1',2'-dihydrospiro[piperidine-4,3'-pyrrolo[2,3-b]pyridine]-1'-carboxamide;

2-[1'-(2-aminoethyl)-6'-(2-ethoxypyridin-3-yl)-2'-oxo-1',2'-dihydrospiro[piperidine-4,3'-pyrrolo[2,3-b]pyridin]-1-yl]-5-(trifluoromethyl)benzonitrile;

2-{1'-[(2R)-2-aminopropyl]-6'-(2-ethoxypyridin-3-yl)-2'-oxo-1',2'-dihydrospiro[piperidine-4,3'-pyrrolo[2,3-b]pyridin]-1-yl}-5-(trifluoromethyl)benzonitrile;

2-{1'-[2-(dimethylamino)ethyl]-6'-(2-ethoxy pyridin-3-yl)-2'-oxo-1',2'-dihydrospiro[piperidine-4,3'-pyrrolo[2,3-b]pyridin]-1-yl}-5-(trifluoromethyl)benzonitrile;

2-[6'-(2-ethoxypyridin-3-yl)-1'-[2-(methylamino)ethyl]-2'-oxo-1',2'-dihydrospiro[piperidine-4,3'-pyrrolo[2,3-b]pyridin]-1-y]-5-(trifluoromethyl)benzonitrile;

2-[1'-(2-aminoethyl)-7'-(2-ethoxypyridin-3-yl)-2'-oxo-2',3'-dihydro-1'H-spiro[piperidine-4,4'-quinazolin]-1-yl]-5-(trifluoromethyl)benzonitrile;

2-[7'-(2-ethoxypyridin-3-yl)-1'-[2-(methylamino)ethyl]-2'-oxo-2',3'-dihydro-1'H-spiro[piperidine-4,4'-quinazolin]-1-yl]-5-(trifluoromethyl)benzonitrile;

2-[1'-(2-aminoethyl)-7'-(2-ethoxypyridin-3-yl)-2'-oxo-2',3'-dihydro-1'H-spiro[piperidine-4,4'-quinolin]-1-yl]-5-(trifluoromethyl)benzonitrile;

2-[1'-(3-aminopropyl)-7'-(2-ethoxypyridin-3-yl)-2'-oxo-2',3'-dihydro-1'H-spiro[piperidine-4,4'-quinolin]-1-yl]-5-(trifluoromethyl)benzonitrile;

2-{1'-[(2S)-2-aminopropyl]-7-(2-ethoxypyridin-3-yl)-2'-oxo-2',3'-dihydro-1'H-spiro[piperidine-4,4'-quinolin]-1-yl}-5-(trifluoromethyl)benzonitrile;

2-[7'-(2-ethoxy pyridin-3-yl)-1'-[2-(methylamino)ethyl]-2'-oxo-2',3'-dihydro-1'H-spiro[piperidine-4,4'-quinolin]-1-yl]-5-(trifluoromethyl)benzonitrile;

2-{1'-[(2R)-2-aminopropyl]-7'-(2-ethoxypyridin-3-yl)-2'-oxo-2',3'-dihydro-1'H-spiro[piperidine-4,4'-quinolin]-1-yl}-5-(trifluoromethyl)benzonitrile;

or a pharmaceutically acceptable salt thereof.

17. A pharmaceutical composition comprising a compound of claim 1, or a pharmaceutically acceptable salt thereof, and at least one pharmaceutically acceptable excipient.

18. A method of treating Cushing's syndrome, ectopic Cushing's syndrome, or congenital adrenal hyperplasia (CAH) in a mammal comprising administering a compound of claim 1, or a pharmaceutically acceptable salt thereof, to the mammal in need thereof.

19. A method of reducing the secretion of adrenocorticotropic hormone (ACTH) in a mammal comprising administering a compound of claim 1, or a pharmaceutically acceptable salt thereof to the mammal in need thereof.

* * * * *